(12) United States Patent
Rouse et al.

(10) Patent No.: US 11,113,064 B2
(45) Date of Patent: Sep. 7, 2021

(54) AUTOMATED CONCURRENCY AND REPETITION WITH MINIMAL SYNTAX

(71) Applicant: SAS Institute Inc., Cary, NC (US)

(72) Inventors: Jack Joseph Rouse, Cary, NC (US); Robert William Pratt, Apex, NC (US); Jared Carl Erickson, Durham, NC (US); Manoj Keshavmurthi Chari, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/105,695

(22) Filed: Nov. 27, 2020

(65) Prior Publication Data

US 2021/0157595 A1 May 27, 2021

Related U.S. Application Data

(60) Provisional application No. 62/958,097, filed on Jan. 7, 2020, provisional application No. 62/941,309, filed on Nov. 27, 2019.

(51) Int. Cl.
*G06F 9/38* (2018.01)

(52) U.S. Cl.
CPC .......... *G06F 9/3836* (2013.01); *G06F 9/3877* (2013.01)

(58) Field of Classification Search
CPC ...... G06F 9/463; G06F 9/5072; G06F 9/5066; G06F 8/451; G06F 8/453; G06F 8/456
See application file for complete search history.

(56) References Cited

U.S. PATENT DOCUMENTS

| | | | | |
|---|---|---|---|---|
| 6,021,274 A | * | 2/2000 | Reed | G06F 8/45 717/149 |
| 6,681,388 B1 | * | 1/2004 | Sato | G06F 8/453 717/149 |
| 7,987,227 B1 | * | 7/2011 | Anderson | G06F 9/4806 709/201 |

(Continued)

OTHER PUBLICATIONS

"By Statement :: SAS/OR(R) 14.1 User's Guide: Mathematical Programming Legacy Procedures"—SAS—retrieved Jan. 7, 2020.

(Continued)

*Primary Examiner* — Keith E Vicary
(74) *Attorney, Agent, or Firm* — Kacvinsky Daisak Bluni PLLC

(57) ABSTRACT

A processor core receives a request to execute application code including a trigger instruction and an instruction block that reads a row of data values from a data structure and outputs a data value from a function using the row as input. The data structure is divided into multiple portions and the trigger instruction indicates that multiple instances of the instruction block are to be executed concurrently. In response to the request and to identification of the instruction block and trigger instruction, the processor core generates multiple instances of a support block that causes independent repetitive execution of each instance of the instruction block until all rows of the corresponding portion of the data structure are used as input. The processor core assigns instances of the instruction and support blocks to multiple processor cores, and provides each instance of the instruction block with the corresponding portion of the data structure.

30 Claims, 33 Drawing Sheets

(56) References Cited

U.S. PATENT DOCUMENTS

| | | | |
|---|---|---|---|
| 9,135,065 B1* | 9/2015 | Stefansson | G06F 15/8023 |
| 9,582,256 B2 | 2/2017 | Rouse et al. | |
| 10,387,214 B1* | 8/2019 | Christian | G06N 20/00 |
| 10,691,464 B1* | 6/2020 | Drego | G06F 9/5061 |
| 2009/0089560 A1* | 4/2009 | Liu | G06F 8/45 |
| | | | 712/226 |
| 2010/0031003 A1* | 2/2010 | Chen | G06F 9/3891 |
| | | | 712/30 |
| 2010/0281489 A1* | 11/2010 | Lee | G06F 9/50 |
| | | | 718/106 |
| 2012/0011347 A1* | 1/2012 | Little | G06F 8/453 |
| | | | 712/220 |
| 2013/0055225 A1* | 2/2013 | Ravi | G06F 8/4441 |
| | | | 717/150 |
| 2014/0156971 A1* | 6/2014 | Kunze | G06F 9/30036 |
| | | | 712/42 |
| 2014/0297997 A1* | 10/2014 | Rouse | G06F 8/45 |
| | | | 712/241 |
| 2015/0205637 A1* | 7/2015 | Lee | G06F 9/5066 |
| | | | 718/105 |
| 2015/0347149 A1* | 12/2015 | Galati | G06F 9/30007 |
| | | | 712/201 |
| 2016/0077833 A1* | 3/2016 | Galati | G06F 9/30007 |
| | | | 712/221 |
| 2017/0277562 A1* | 9/2017 | Christian | G06F 8/76 |

OTHER PUBLICATIONS

"SAS Help Center: Programming Statements"—SAS—retrieved Jan. 7, 2020.

"SAS Help Center: Merge Statement"—SAS—retrieved Jan. 7, 2020.

* cited by examiner

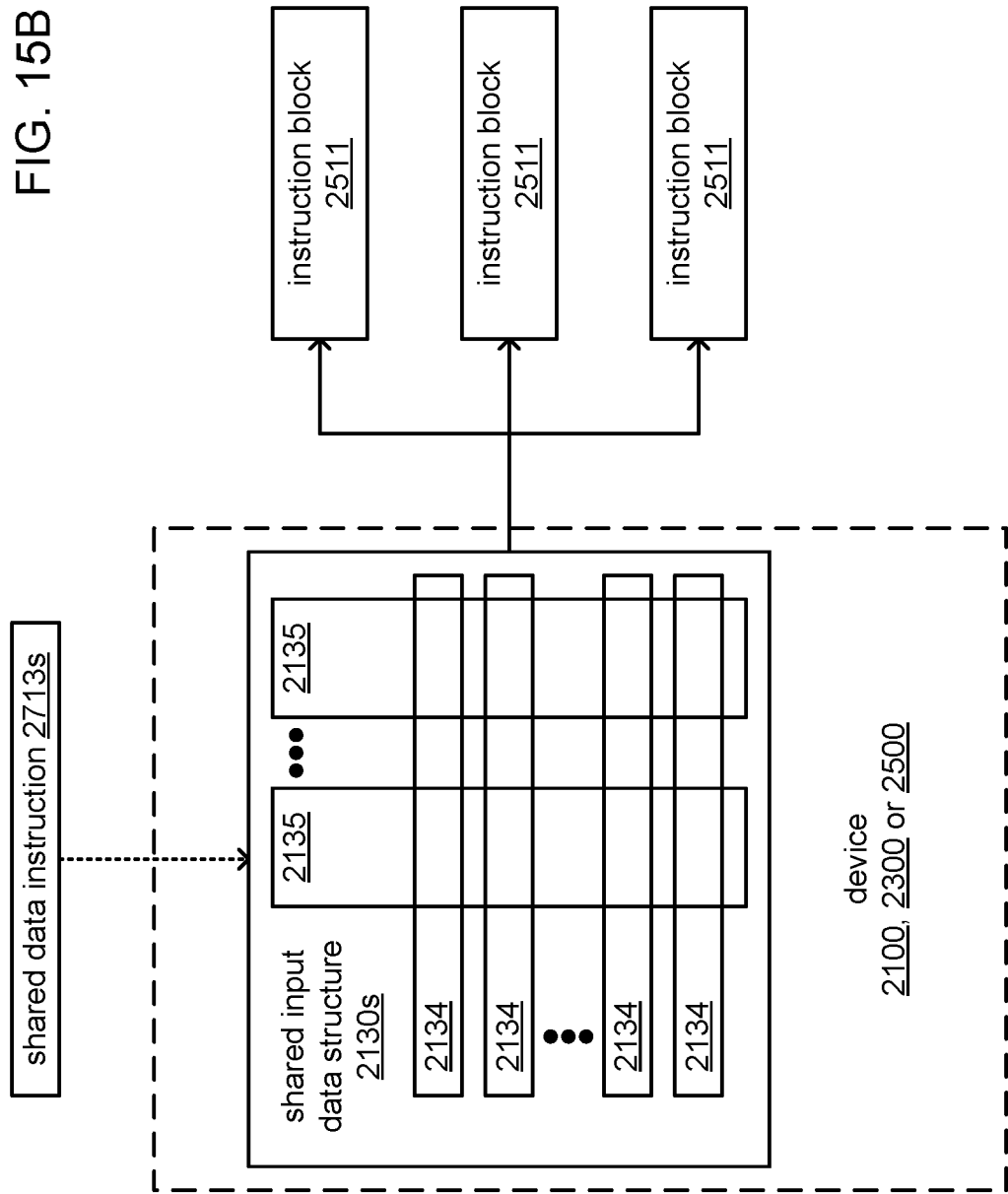

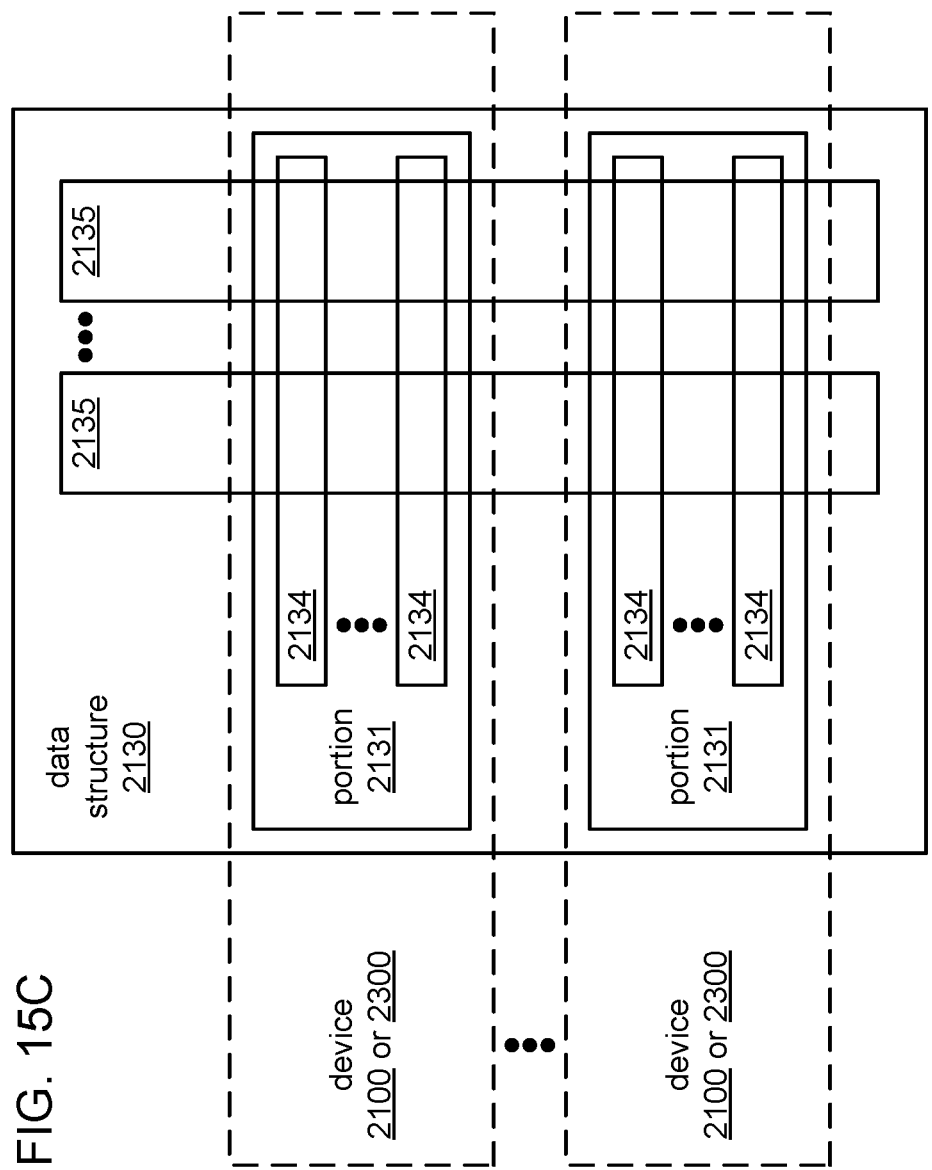

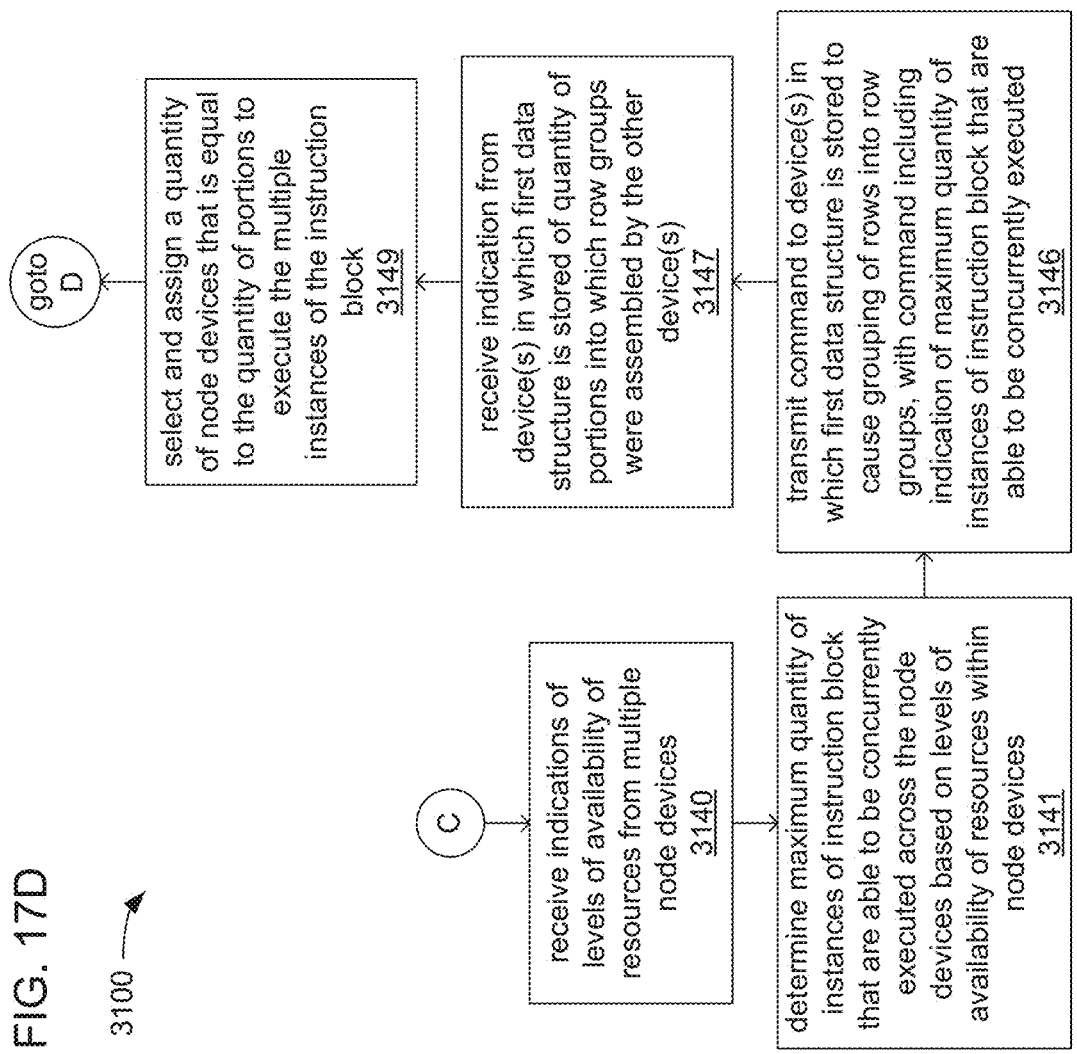

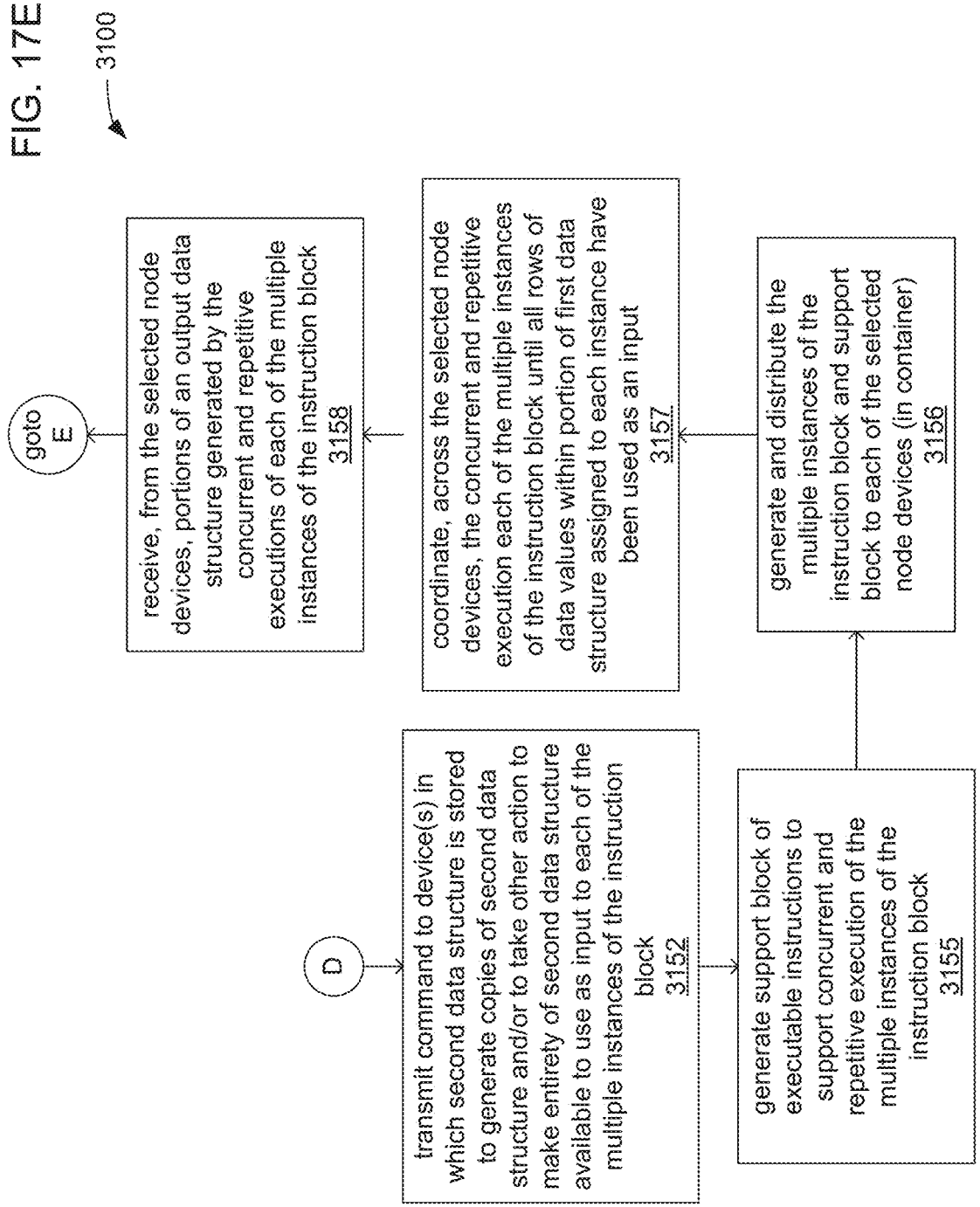

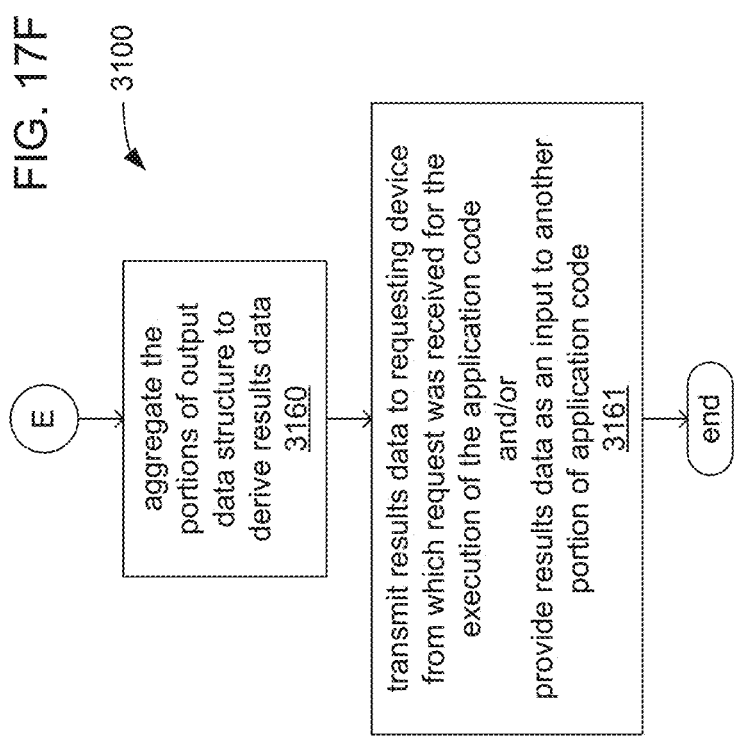

AUTOMATED CONCURRENCY AND REPETITION WITH MINIMAL SYNTAX

CROSS-REFERENCE TO RELATED APPLICATION

This application claims the benefit of priority under 35 U.S.C. § 119(e) to U.S. Provisional Application Ser. No. 62/941,309 filed Nov. 27, 2019, and to U.S. Provisional Application Ser. No. 62/958,097 filed Jan. 7, 2020, both of which are incorporated herein by reference in their respective entireties for all purposes.

BACKGROUND

It has become commonplace to solve large scale problems in such areas as optimization and simulation through concurrent execution of numerous iterations of at least a portion of a routine in which a calculation and/or search process is performed. Such problems often entail working with very large data sets as inputs such that it is often deemed highly desirable to employ such concurrency whenever possible to greatly reduce the amount of time required to reach a solution. However, many programmers who have a thorough understanding of the details of the problems, themselves, often don't have as thorough an understanding of how to write application code to use available processing, storage and/or other resources of a processing system to effectuate such concurrency. As a result, despite having access to processing systems that have the ability to support such use of concurrency to achieve such improvements, those abilities are all too often not utilized.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus a first processor core and a storage to store instructions that, when executed by the first processor core, cause the first processor core to perform operations including receive a request to execute executable instructions of application code that comprises an instruction block and a trigger instruction, wherein: the instruction block comprises executable instructions operable to cause a second processor core to perform operations including read a single row of data values from a first data structure, and output at least one data value generated by a performance of a function using the single row as an input; the first data structure is divided into multiple portions that each comprise multiple rows; and the trigger instruction serves to provide an indication that multiple instances of the instruction block that correspond to the multiple portions of the first data structure are to be executed concurrently, and each instance of the instruction block is to be executed repetitively until all rows of the corresponding portion of the first data set are used as input to the function, wherein the repetitive execution of each instance commences and completes independently of the other instances. The first core is also caused to, in response to the request, and in response to identification of the instruction block and the trigger instruction as present within the application code, perform operations including: generate multiple instances of a support block corresponding to the multiple instances of the instruction block, wherein each instance of the support block comprises executable instructions operable to cause the second processor core to execute a corresponding instance of the instruction block repetitively until all rows of the corresponding portion of the first data structure are used as input to the function; assign each instance of the instruction block and corresponding support block to be executed by a processor core of a set of processor cores; and provide each instance of the instruction block with access to the corresponding portion of the first data structure.

The first data structure may be stored within at least one storage device accessible via a network, and the first processor core may be caused to perform operations including: parse the executable instructions of the application code to identify a distributed data instruction within the application code, wherein the distributed data instruction serves to indicate that the rows of the first data structure are to be grouped by data values present within at least one column within each of the rows; and in response to identifying the distributed data instruction within the application code, transmit a command to the at least one storage device to reorganize the rows of the first data structure into multiple row groups based on the data values present within the at least one column within each of the rows, wherein the multiple row groups are distributed among the multiple portions of the first data structure.

The trigger instruction may include the distributed data instruction such that the trigger instruction serves to also indicate that the rows of the first data structure are to be grouped by data values present within the at least one column; and the first processor core may be caused to parse the executable instructions of the application code to identify the trigger instruction to thereby identify the distributed data instruction.

The apparatus may further include a set of node devices accessible to the control device via a network, wherein each node device of the set of node devices may include one of the processor cores of the set of processor cores, and the first processor core may be caused to perform operations including: receive, from the set of node devices via the network, indications of availability of each processor core of the set of processor cores; determine a quantity of processor cores of the set of processor cores that are available to execute the multiple instances of the instruction block; select a subset of the set of node devices among which to distribute the multiple instances of the instruction block and the multiple instances of the support block based at least on the quantity of available processor cores; and distribute the multiple instances of the instruction block and the multiple instances of the support block among the subset of the set of node devices.

A second data structure may be stored within at least one storage device accessible via a network, and the first processor core may be caused to perform operations including: parse the executable instructions of the application code to identify a shared data instruction within the application code, wherein the shared data instruction serves to indicate that the second data structure is to be provided in its entirety as another input to each of the multiple instances of the instruction block; and in response to identifying the shared data instruction within the application code, transmit a command to the at least one storage device to generate multiple copies of the second data structure for distribution among the multiple instances of the instruction block.

An input instruction that is executable to read at least a portion of the second data structure may include the shared data instruction such that the input instruction serves to indicate that the second data structure is to be provided in its entirety as another input to each of the multiple instances of the instruction block.

For each instance of the instruction block, during each iteration of execution, the at least one data value that is output may be added to a portion of multiple portions of an output data structure, and the first processor core is caused to perform operations including: aggregate the multiple portions of the output data structure to generate a results data; and provide the results data as an input to another function associated with the application code that the first processor core executes, or transmit the results data, via a network, to a requesting device from which the request was received to execute the application code.

The apparatus may include a control device that includes the set of processor cores, wherein the first data structure is stored within the control device, and the first processor core may be caused to perform operations including: monitor a level of availability of each processor core of the set of processor cores; determine a quantity of processor cores of the set of processor cores that are available to execute the multiple instances of the instruction block; and parse the executable instructions of the application code to identify a distributed data instruction within the application code, wherein the distributed data instruction serves to indicate that the rows of the first data structure are to be grouped by data values present within at least one column within each of the rows. The first processor core may also be caused to, in response to identifying the distributed data instruction within the application code, perform operations including: reorganize the rows of the first data structure into multiple row groups based on the data values present within the at least one column within each of the rows; select a quantity of the multiple portions of the first data structure, the multiple instances of the instruction block and the multiple instances of the support block to match the quantity of available processor cores; and organize the row groups into the multiple portions of the first data structure.

A second data structure may be stored within the control device, and the first processor core may be caused to perform operations including: parse the executable instructions of the application code to identify a shared data instruction within the application code, wherein the shared data instruction serves to indicate that the second data structure is to be provided in its entirety as another input to each of the multiple instances of the instruction block; and in response to identifying the shared data instruction within the application code, generate multiple copies of the second data structure for distribution among the multiple instances of the instruction block.

The instruction block may be marked within the application code by at least a start marker that marks a start of the instruction block; the start marker may serve to provide the instruction block with an identifier; the trigger instruction may include the identifier to refer to the instruction block; and the first processor core may be caused to perform operations including parse the application code to identify the instruction block via the start marker, and use the identifier to associate the trigger instruction with the instruction block.

A computer-program product tangibly embodied in a non-transitory machine-readable storage medium includes instructions operable to cause a first processor core to perform operations including receive a request to execute executable instructions of application code that comprises an instruction block and a trigger instruction, wherein: the instruction block comprises executable instructions operable to cause a second processor core to perform operations including read a single row of data values from a first data structure, and output at least one data value generated by a performance of a function using the single row as an input; the first data structure is divided into multiple portions that each comprise multiple rows; and the trigger instruction serves to provide an indication that multiple instances of the instruction block that correspond to the multiple portions of the first data structure are to be executed concurrently, and each instance of the instruction block is to be executed repetitively until all rows of the corresponding portion of the first data set are used as input to the function, wherein the repetitive execution of each instance commences and completes independently of the other instances. The first processor core is also caused to, in response to the request, and in response to identification of the instruction block and the trigger instruction as present within the application code, perform operations including: generate multiple instances of a support block corresponding to the multiple instances of the instruction block, wherein each instance of the support block comprises executable instructions operable to cause the second processor core to execute a corresponding instance of the instruction block repetitively until all rows of the corresponding portion of the first data structure are used as input to the function; assign each instance of the instruction block and corresponding support block to be executed by a processor core of a set of processor cores; and provide each instance of the instruction block with access to the corresponding portion of the first data structure.

The first data structure may be stored within at least one storage device accessible via a network, and the first processor core may be caused to perform operations including: parse the executable instructions of the application code to identify a distributed data instruction within the application code, wherein the distributed data instruction serves to indicate that the rows of the first data structure are to be grouped by data values present within at least one column within each of the rows; and in response to identifying the distributed data instruction within the application code, transmit a command to the at least one storage device to reorganize the rows of the first data structure into multiple row groups based on the data values present within the at least one column within each of the rows, wherein the multiple row groups are distributed among the multiple portions of the first data structure.

The trigger instruction may include the distributed data instruction such that the trigger instruction serves to also indicate that the rows of the first data structure are to be grouped by data values present within the at least one column; and the first processor core may be caused to parse the executable instructions of the application code to identify the trigger instruction to thereby identify the distributed data instruction.

Each node device of a set of node devices may include one of the processor cores of the set of processor cores, and the first processor core is caused to perform operations including: receive, from the set of node devices via the network, indications of availability of each processor core of the set of processor cores; determine a quantity of processor cores of the set of processor cores that are available to execute the multiple instances of the instruction block; select a subset of the set of node devices among which to distribute the multiple instances of the instruction block and the multiple instances of the support block based at least on the quantity of available processor cores; and distribute the multiple instances of the instruction block and the multiple instances of the support block among the subset of the set of node devices.

A second data structure may be stored within at least one storage device accessible via a network, and the first processor core may be caused to perform operations including: parse the executable instructions of the application code to identify a shared data instruction within the application code, wherein the shared data instruction serves to indicate that the second data structure is to be provided in its entirety as another input to each of the multiple instances of the instruction block; and in response to identifying the shared data instruction within the application code, transmit a command to the at least one storage device to generate multiple copies of the second data structure for distribution among the multiple instances of the instruction block.

An input instruction that is executable to read at least a portion of the second data structure may include the shared data instruction such that the input instruction serves to indicate that the second data structure is to be provided in its entirety as another input to each of the multiple instances of the instruction block.

For each instance of the instruction block, during each iteration of execution, the at least one data value that is output may be added to a portion of multiple portions of an output data structure; and the first processor core may be caused to perform operations including: aggregate the multiple portions of the output data structure to generate a results data; and provide the results data as an input to another function associated with the application code that the first processor core executes, or transmit the results data, via a network, to a requesting device from which the request was received to execute the application code.

The first data structure is stored within a control device that comprises the set of processor cores, and the first processor core may be caused to perform operations including: monitor a level of availability of each processor core of the set of processor cores; determine a quantity of processor cores of the set of processor cores that are available to execute the multiple instances of the instruction block; and parse the executable instructions of the application code to identify a distributed data instruction within the application code, wherein the distributed data instruction serves to indicate that the rows of the first data structure are to be grouped by data values present within at least one column within each of the rows. The first processor core may also be caused to, in response to identifying the distributed data instruction within the application code, perform operations including: reorganize the rows of the first data structure into multiple row groups based on the data values present within the at least one column within each of the rows; select a quantity of the multiple portions of the first data structure, the multiple instances of the instruction block and the multiple instances of the support block to match the quantity of available processor cores; and organize the row groups into the multiple portions of the first data structure.

A second data structure may be stored within the control device, and the first processor core may be caused to perform operations including: parse the executable instructions of the application code to identify a shared data instruction within the application code, wherein the shared data instruction serves to indicate that the second data structure is to be provided in its entirety as another input to each of the multiple instances of the instruction block; and in response to identifying the shared data instruction within the application code, generate multiple copies of the second data structure for distribution among the multiple instances of the instruction block.

The instruction block may be marked within the application code by at least a start marker that marks a start of the instruction block; the start marker may serve to provide the instruction block with an identifier; the trigger instruction may include the identifier to refer to the instruction block; and the first processor core may be caused to perform operations including parse the application code to identify the instruction block via the start marker, and use the identifier to associate the trigger instruction with the instruction block.

A computer-implemented method includes receiving, by a first processor core, a request to execute executable instructions of application code that comprises an instruction block and a trigger instruction, wherein: the instruction block includes executable instructions operable to cause a second processor core to perform operations including read a single row of data values from a first data structure, and output at least one data value generated by a performance of a function using the single row as an input; the first data structure is divided into multiple portions that each comprise multiple rows; and the trigger instruction serves to provide an indication that multiple instances of the instruction block that correspond to the multiple portions of the first data structure are to be executed concurrently, and each instance of the instruction block is to be executed repetitively until all rows of the corresponding portion of the first data set are used as input to the function, wherein the repetitive execution of each instance commences and completes independently of the other instances. The method further includes, in response to the request, and in response to identification of the instruction block and the trigger instruction as present within the application code, performing operations including: generating, by the first processor core, multiple instances of a support block corresponding to the multiple instances of the instruction block, wherein each instance of the support block comprises executable instructions operable to cause the second processor core to execute a corresponding instance of the instruction block repetitively until all rows of the corresponding portion of the first data structure are used as input to the function; assigning, by the first processor core, each instance of the instruction block and corresponding support block to be executed by a processor core of a set of processor cores; and providing, by the first processor core, each instance of the instruction block with access to the corresponding portion of the first data structure.

The computer-implemented method of claim 21, wherein the first data structure may be stored within at least one storage device accessible via a network, and the method may include: parsing the executable instructions of the application code to identify a distributed data instruction within the application code, wherein the distributed data instruction serves to indicate that the rows of the first data structure are to be grouped by data values present within at least one column within each of the rows; and in response to identifying the distributed data instruction within the application code, transmitting a command to the at least one storage device to reorganize the rows of the first data structure into multiple row groups based on the data values present within the at least one column within each of the rows, wherein the multiple row groups are distributed among the multiple portions of the first data structure.

The trigger instruction may include the distributed data instruction such that the trigger instruction serves to also indicate that the rows of the first data structure are to be grouped by data values present within the at least one column; and the method may include parsing the executable instructions of the application code to identify the trigger instruction to thereby identify the distributed data instruction.

The method may include: receiving, from a set of node devices via a network, indications of availability of each processor core of the set of processor cores; determining a quantity of processor cores of the set of processor cores that are available to execute the multiple instances of the instruction block; selecting a subset of the set of node devices among which to distribute the multiple instances of the instruction block and the multiple instances of the support block based at least on the quantity of available processor cores; and distributing the multiple instances of the instruction block and the multiple instances of the support block among the subset of the set of node devices.

A second data structure may be stored within at least one storage device accessible via a network, and the method includes: parsing the executable instructions of the application code to identify a shared data instruction within the application code, wherein the shared data instruction serves to indicate that the second data structure is to be provided in its entirety as another input to each of the multiple instances of the instruction block; and in response to identifying the shared data instruction within the application code, transmitting a command to the at least one storage device to generate multiple copies of the second data structure for distribution among the multiple instances of the instruction block.

An input instruction that is executable to read at least a portion of the second data structure may include the shared data instruction such that the input instruction serves to indicate that the second data structure is to be provided in its entirety as another input to each of the multiple instances of the instruction block.

For each instance of the instruction block, during each iteration of execution, the at least one data value that is output may be added to a portion of multiple portions of an output data structure, and the method may include: aggregating the multiple portions of the output data structure to generate a results data; and providing the results data as an input to another function associated with the application code that the first processor core executes, or transmitting the results data, via a network, to a requesting device from which the request was received to execute the application code.

The first data structure may be stored within a control device that comprises the set of processor cores; and the method may include: monitoring a level of availability of each processor core of a set of processor cores; determining a quantity of processor cores of the set of processor cores that are available to execute the multiple instances of the instruction block; and parsing the executable instructions of the application code to identify a distributed data instruction within the application code, wherein the distributed data instruction serves to indicate that the rows of the first data structure are to be grouped by data values present within at least one column within each of the rows. The method may also include, in response to identifying the distributed data instruction within the application code, performing operations including: reorganizing the rows of the first data structure into multiple row groups based on the data values present within the at least one column within each of the rows; selecting a quantity of the multiple portions of the first data structure, the multiple instances of the instruction block and the multiple instances of the support block to match the quantity of available processor cores; and organizing the row groups into the multiple portions of the first data structure.

A second data structure may be stored within the control device, and the method may include: parsing the executable instructions of the application code to identify a shared data instruction within the application code, wherein the shared data instruction serves to indicate that the second data structure is to be provided in its entirety as another input to each of the multiple instances of the instruction block; and in response to identifying the shared data instruction within the application code, generating multiple copies of the second data structure for distribution among the multiple instances of the instruction block.

The instruction block may be marked within the application code by at least a start marker that marks a start of the instruction block; the start marker may serve to provide the instruction block with an identifier; the trigger instruction may include the identifier to refer to the instruction block; and the method may include parsing the application code to identify the instruction block via the start marker, and using the identifier to associate the trigger instruction with the instruction block.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 15A, 15B, 15C and 15D each illustrate an example or example state of a data structure used as an input.

FIGS. 17A, 17B, 17C, 17D, 17E and 17F, together, illustrate an example logic flow of operations by a control device in preparing and concurrently executing multiple instances of executable instructions of an instruction block.

DETAILED DESCRIPTION

Figure 1:
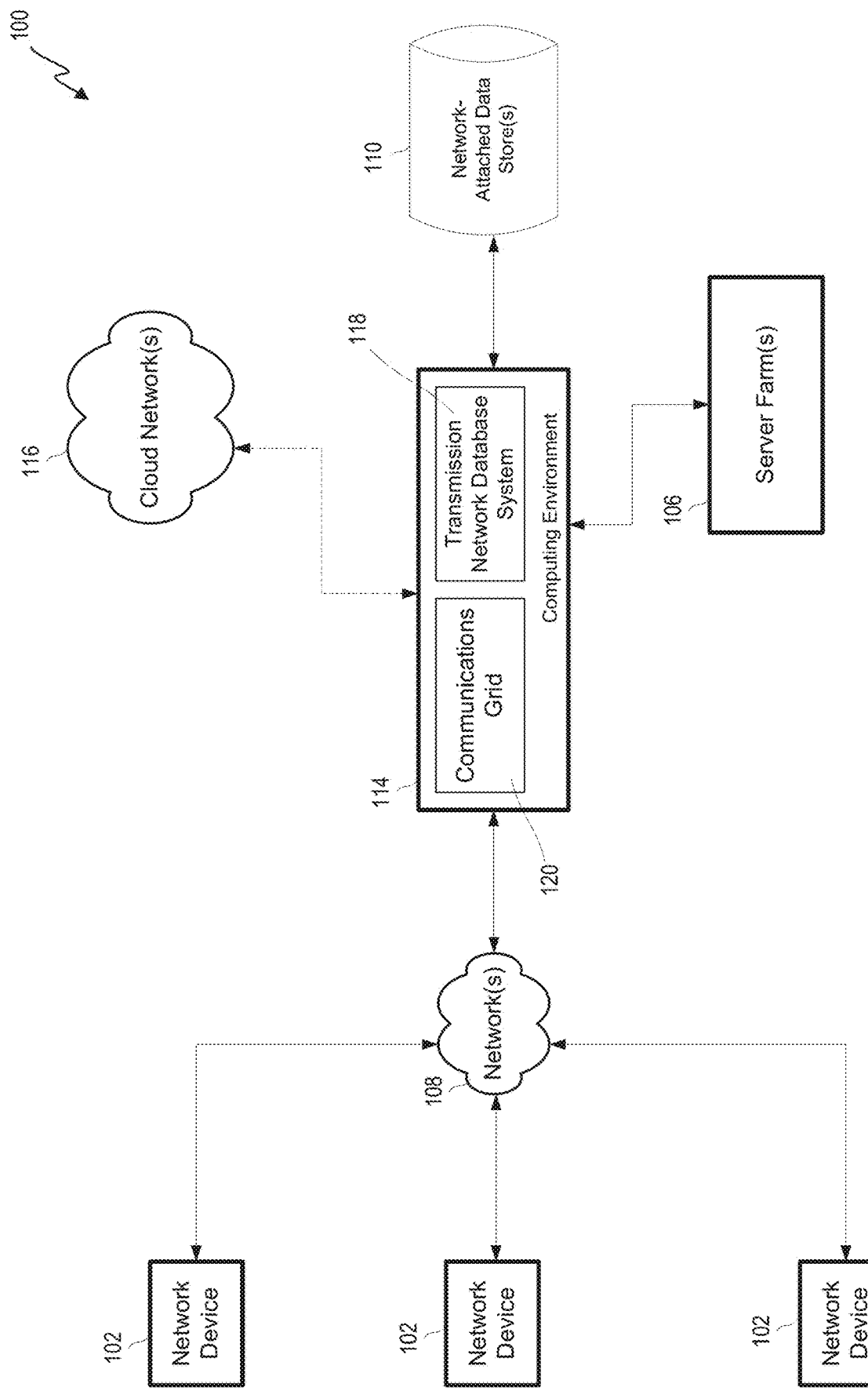
FIG. 1 illustrates a block diagram that provides an illustration of the hardware components of a computing system, according to some embodiments of the present technology.

Various embodiments are generally directed to techniques for reducing syntax requirements in application code to cause concurrent and repetitive execution of multiple instances of a block of executable instructions within the application code, thereby making use of multiple processors, processor cores and/or processing devices in performing complex analyses with large data sets as input using multiple threads of execution. Those executable instructions within that instruction block may be written as if just a single instance thereof is to be executed just once. Instead a single trigger instruction may be written to provide an interpreter or compiler with the information required to enable such concurrent and repetitive execution. As a result, there is no need for a programmer to write instructions to implement the logic of instantiating multiple threads to cause concurrent execution of multiple instances of the executable instructions within the instruction block. There is also no need to write instructions to implement the multiple instances of the logic needed to cause the repetitive execution of each of those instances independently of each of the other instances. In this way, a programmer is relieved of the need to grapple with such intricacies of how to write code that directly implements such independently concurrent and repetitive execution of multiple instances of the instruction block by multiple processor cores and/or multiple processing devices. Instead, the instruction block merely needs to be identified within the application code, and accompanied by the trigger instruction indicating that such concurrent and repetitive execution of the instruction block is to be performed. During parsing of the application code, start and end markers indicating the location of the instruction block, and the trigger instruction may be identified within the application code. In response, and as part of executing the application code, multiple instances of the instruction block may be distributed among multiple processor cores and/or processing devices, along with corresponding instances of supporting code that serve to enable the independently concurrent and repetitive execution of the multiple instances of the instruction block.

The executable instructions within the instruction block may include one or more instructions that specify one or more input data structures from which data values are to be read, and/or may include one or more instructions that specify one or more output data structures into which data values are to be written. It may be that the data values within each of such input data structures and/or output data structures are organized in a two-dimensional row-column manner. Thus, the executable instructions within the instruction block that effect the reading and writing of data may include instruction(s) to read a row of data values from the one or more of the input data structures, and/or may include instruction(s) to write a row of data values into the one or more of the output data structures. Consistent with the executable instructions within the instruction block being written as if just a single instance thereof is to be executed just once, each such read instruction may be written to cause as if just a single row of data values is to be read from an input data structure, and/or each such write instruction may be written as if just a single row of data values is to be written into an output data structure.

In some embodiments, the start marker may include an instruction that serves to both mark the start of the instruction block, and to provide an identifier for the instruction block (e.g., an instruction word "source" as a start marker followed by text that provides the instruction block with a textual identifier). It may be that such an identifier is able to be used as a label that enables the instruction block to be called from elsewhere within the application code. In such embodiments, the end marker may include a corresponding instruction word (e.g., an instruction word "endsource" as an end marker) to mark the end of the instruction block. However, in other embodiments, it may be that both the start and end markers do nothing more than to delineate the instruction block, and/or it may be that just specific punctuation characters (or specific combinations thereof) are used as the start and end markers (instead of words), such as opening and closing brackets or braces, etc.

Within the instruction block, following the instruction block, or elsewhere within the application code may be the trigger instruction that provides the indication that multiple instances of the instruction block are to be instantiated and executed concurrently and repeatedly, and that there are no dependencies among the multiple instances thereamong. In some embodiments, the trigger instruction may also serve as a distributed data instruction that indicates that at least one input data structure that is to be provided as input to those multiple instances of the instruction block in a distributed manner such that each of those multiple instances of the instruction block is to be provided with a different portion of such a distributed input data structure. Alternatively, the distributed data instruction may be separate and distinct from the trigger instruction. Also, like the trigger instruction, such a separate and distinct form of the distributed data instruction may be located within the instruction block, may follow the instruction block, or may be located elsewhere within the application code.

Regardless of whether the distributed data instruction is separate and distinct from the trigger instruction, the distributed data instruction may additionally provide an indication that the rows of data values within the at least one distributed input data structure are to be reorganized into groups of rows based on the data values present within one or more specified columns thereof. More specifically, and by way of example, the distributed data instruction may be implemented as a form of "group-by" or "groupBy" instruction that causes the rows of at least one distributed input data structure to be reorganized into row groups based on the data values present within a single column (where just a single column is specified in such an instruction), or based on the combinations of data values that are present within multiple columns (where multiple columns are specified in such an instruction). It may be that the resulting quantity of row groups serves as a factor (along with, or in lieu of, the quantity of available processor cores and/or processing devices) in determining the quantity of instances of the instruction block that are to be distributed among multiple processor cores and/or multiple processing devices for concurrent and repetitive execution. Indeed, in embodiments in which such concurrent and repetitive execution is to occur in a distributed manner across multiple processing devices, it may be that such grouping of the rows of a distributed input data structure into row groups entails an exchange of rows of values among the multiple processing devices to form one or more complete row groups within each one of multiple devices such that no row group has its rows distributed across more than one device.

In embodiments in which there are more row groups of a distributed input data structure than there are available processor cores and/or processing devices, combinations of multiple ones of those groups of rows may be assigned to each available processor core and/or processing device. Each such combination of multiple row groups of a distributed input data structure may be assigned to each processor core and/or processing device as a partition. Within each partition, the row groups may be organized into an ascending or descending order based on the data values present within the one or more columns that were specified as the basis for the grouping. Alternatively or additionally, within each row group, the rows may be organized into an ascending or descending order based on the data values present within one or more other columns that may be specified as "key" columns.

In some embodiments, there may be a separate and distinct shared data instruction that serves to explicitly identify at least one input data structure that is to be provided in its entirety as an input to each instance of the executable instructions of the instruction block such that fully complete copies of such a shared input data structure are provided to each of the multiple instances. Alternatively, the shared data instruction may be implemented as an optional modifier or other optional component of the trigger instruction (just like the distributed data instruction) or of a read instruction to explicitly identify at least one input data structure as a shared input data structure, rather than a distributed input data structure. More specifically, and by way of example, the shared data instruction may be implemented as a form of "no-group-by" or "nogroupby" instruction.

The executable instructions within the instruction block may include one or more calls to one or more procedures that may each perform any of a variety of functions. Such procedures may form part of a library of callable routines that are each written in a thread-safe manner such that each may be called and executed concurrently without resulting in improper interactions between concurrently executed instances thereof. Thus, each of such callable routines may be concurrently called from each of the instances of the instruction block as those instances are concurrently executed. Among such callable routines may be various arithmetic calculation routines or "solvers" that perform various mathematical optimization operations using one or more rows of data values as input.

During parsing of the application code, either prior to its execution or as part of its execution, start and end markers that delineate the instruction block may be identified. Such parsing may also lead to the identification of the trigger instruction indicating that the instruction block is a portion of the application code that is to be executed in multiple instances independently, concurrently and repeatedly to thereby concurrently perform one or more functions with rows from corresponding multiple portions of at least one distributed input data structure.

Further, a distributed data instruction may be identified (either incorporated into the trigger instruction, or elsewhere) that indicates that at least one input data structure is a distributed input data structure that is to be divided into such multiple portions that are each to be assigned to be provided as an input to a different one of the multiple instances of the instruction block. In response to the identification of the trigger instruction and/or of the distributed data instruction (where, again, the distributed data instruction may be a component of the trigger instruction), the rows within each of the specified distributed input data structures may be reorganized to form row groups based on the data values found within the one or more columns specified for each such data structure. As previously discussed, where the concurrent execution of multiple instances of the instruction block is to be distributed across multiple processing devices that already store portions of a distributed input data structure, such a reorganization of the rows thereof into row groups may entail an exchange of rows among those processing devices. Factors such as 1) the quantity of available processor cores and/or processing devices, 2) the quantity of processing devices that may already store a portion of a distributed input data structure, and/or 3) the quantity of row groups that are created as a result of the reorganization of rows, may be used to determine how many instances of the instruction block are to be instantiated and/or which processor cores and/or processing devices are to be assigned to execute one of those instances.

Additionally, a shared data instruction may be identified that specifies at least one other input data structure as a shared input data structure, of which complete copies are to be provided as another input to each processor core and/or processing device that is assigned to execute one of the instances of the instruction block. In response to the identification of the shared data instruction (which, again, may be implemented as a component of the trigger instruction or of a read instruction), such complete copies of each of the one or more shared input data structures may be retrieved from where each is stored, and may be so provided to each of such assigned processor cores and/or processing devices.

With the instances of the instruction block, the portions of the one or more distributed input data structures, and the complete copies of any shared input data structures so provided to each of the processor cores and/or processing devices assigned to execute one of the instances of the instruction block, each such processor core and/or processing device may also be provided with instances of a support block that includes executable instructions that support the independently concurrent execution of the multiple instances of the instruction block. As will be explained in greater detail, it may be the execution of the instances of the support block that causes the instances of the instruction block to be executed concurrently, without dependencies thereamong, and while causing each of the instances of the instruction block to be executed repeatedly for as many iterations as is needed to cause each row of data values within its corresponding portion of at least one distributed input data structure to be read and utilized as an input.

As each iteration of execution of each instance of the instruction block takes place, one or more data values may be output. In some embodiments, the one or more data values that are so output with each iteration of execution of an instance of the instruction block may form a row of a portion of an output data structure. Thus, each of the separate portions of such an output data structure may be formed, a row at a time, as each iteration of execution of the instruction block takes place within each of the processing devices, with the result that each such portion of the output data structure is formed independently of the others. The multiple portions of such an output data structure may subsequently be aggregated, and the resulting aggregated output may then become the overall output of the independently concurrent and repetitive execution of the multiple instances of the instruction block.

The particular type of aggregation that is performed may include simply concatenating the separate portions of the output data structure into a single whole data structure. Alternatively or additionally, the type of aggregation may include the performance of various numerical operations, including and not limited to, summing, averaging, derivation of mean and/or median value(s), and/or derivation of minimum and/or maximum values. It may be that the particular type of aggregation that is performed is automatically selected based on one or more characteristics of whatever instruction(s) are used in the instruction block to output data values. Alternatively or additionally, it may be that the particular type of aggregation that is performed is automatically selected based on what thread-safe "solver" routine(s) are called to from within the instruction block.

Again, through the provision of support for the use of such relatively minimal syntax, a programmer may be spared having to learn about or otherwise grapple with the intricacies of architecting and then writing code that directly implements the support logic necessary to cause the concurrent execution of multiple instances of a block of executable instructions independently of each other, and to cause each of those multiple instances to be repetitively executed until all rows within a corresponding portion of a distributed data structure have been used as input. Instead, through the use of such relatively minimal syntax, a programmer need only identify the block of executable instructions that are to be so executed, and identify the input and output data structures for such execution. In this way, the programmer is able to focus on writing the executable instructions within that instruction block to implement the logic of what is to be done during each iteration of execution of each of the multiple instances.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
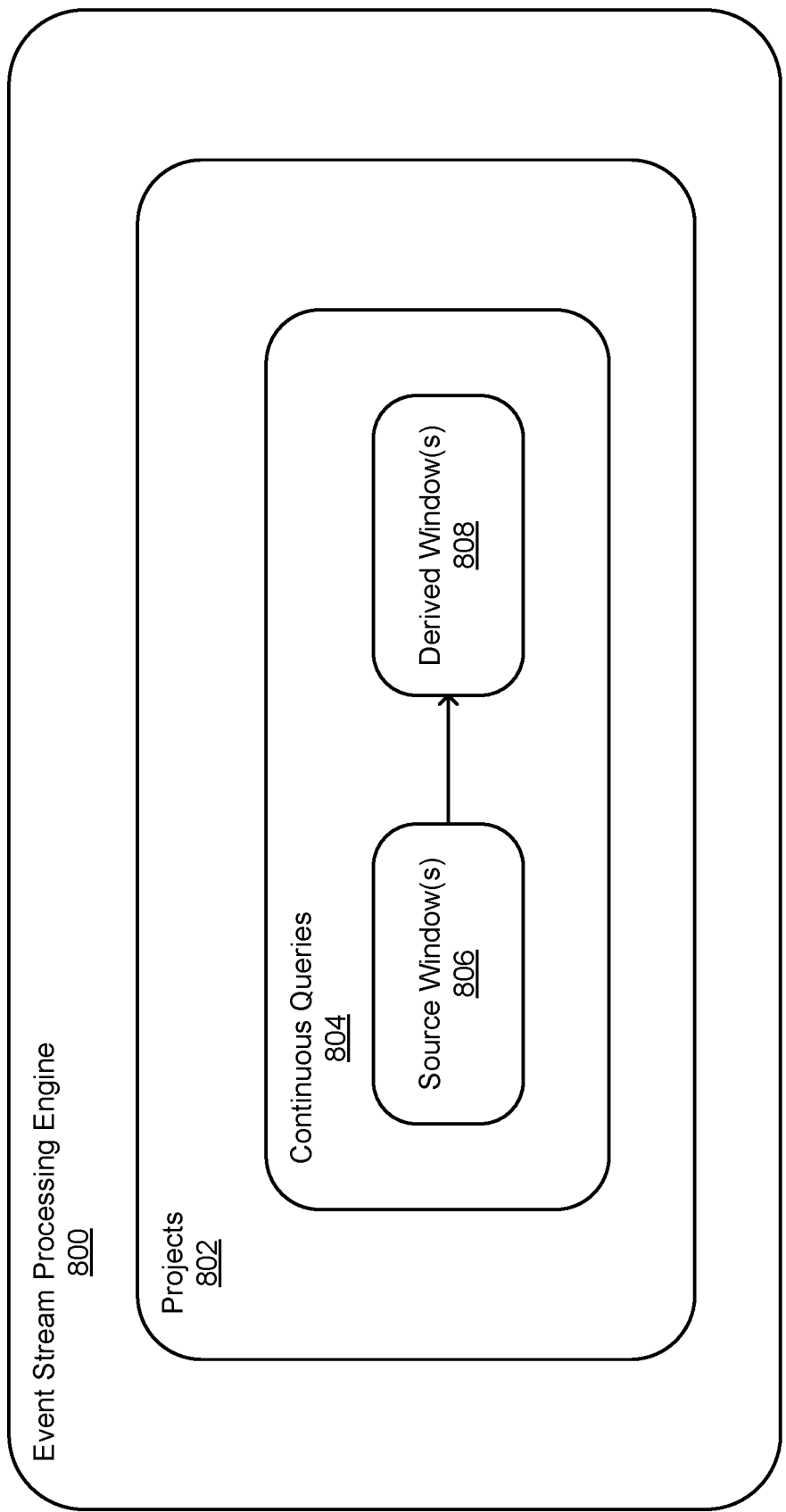
FIG. 8 illustrates a block diagram including components of an Event Stream Processing Engine (ESPE), according to embodiments of the present technology.
Figure 9:
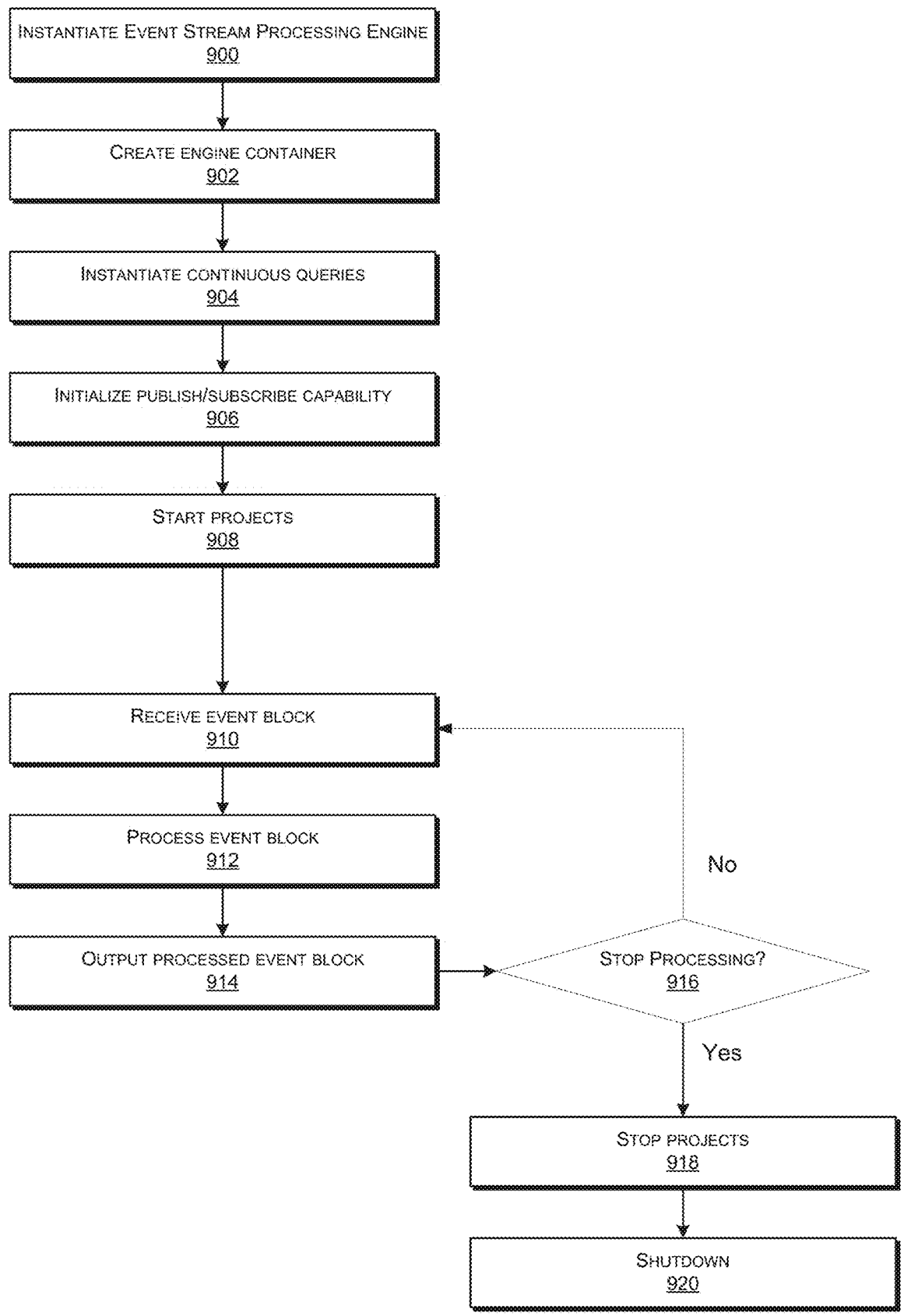
FIG. 9 illustrates a flow chart showing an example process including operations performed by an event stream processing engine, according to some embodiments of the present technology.
Figure 10:
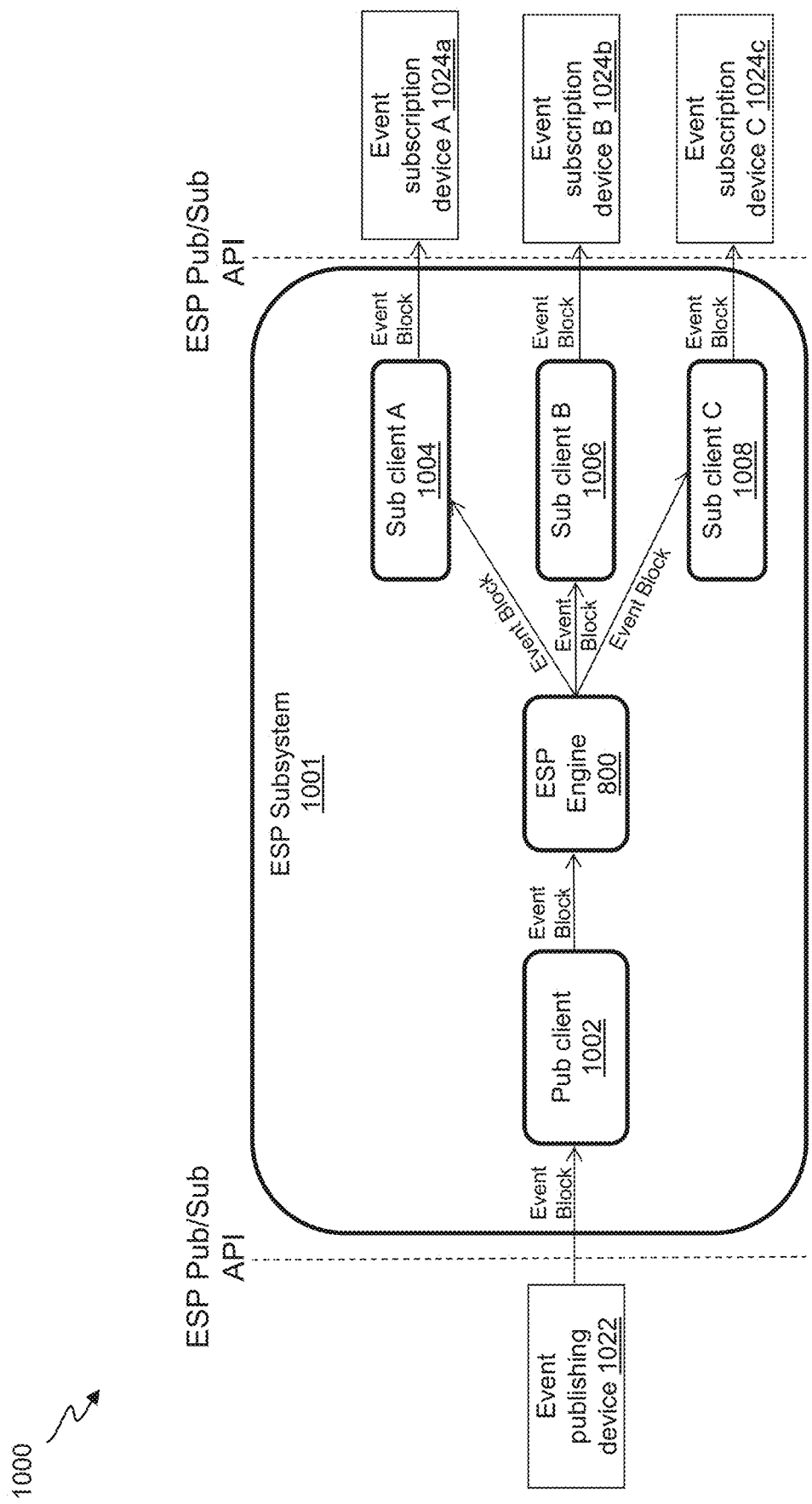
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
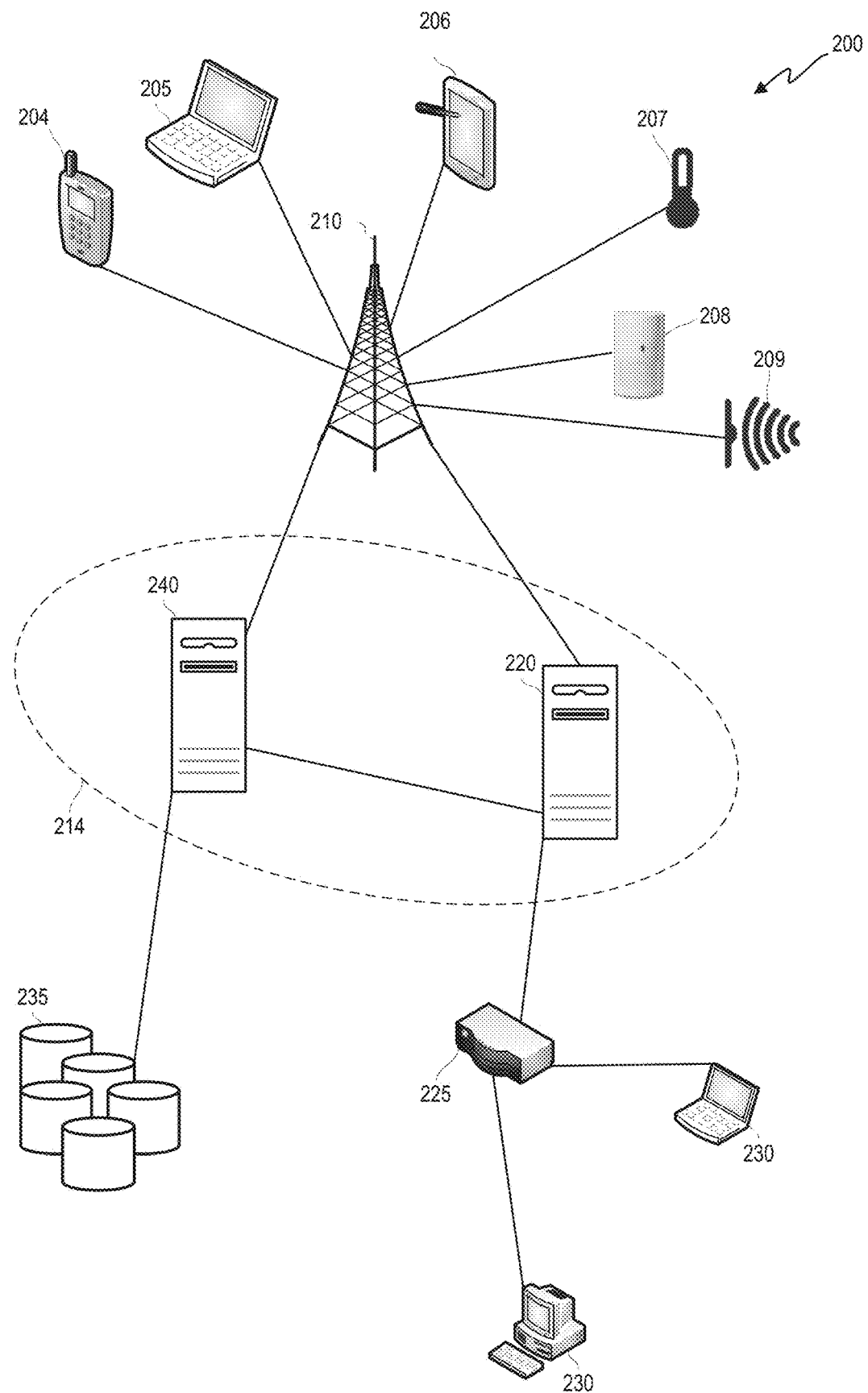
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
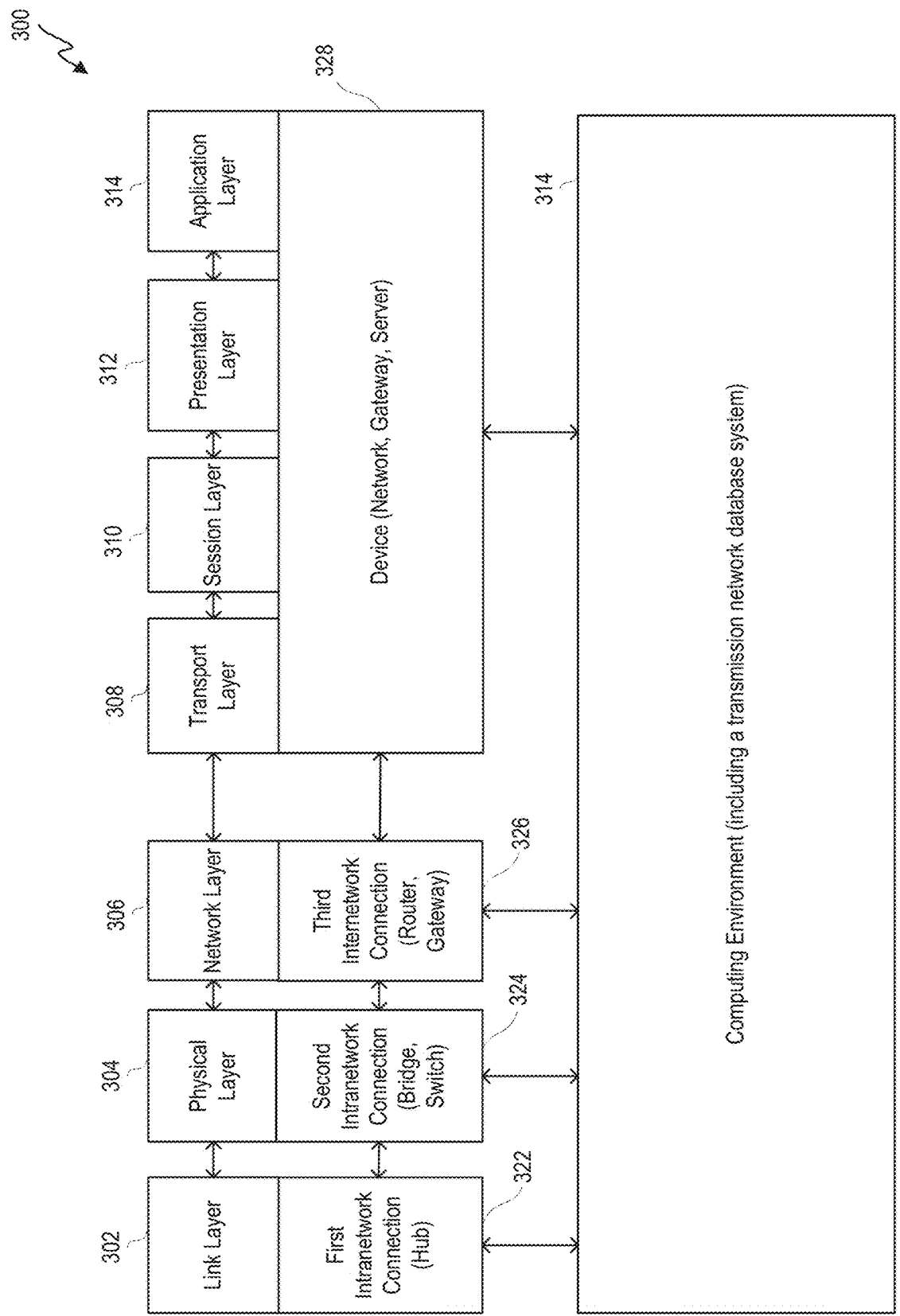
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
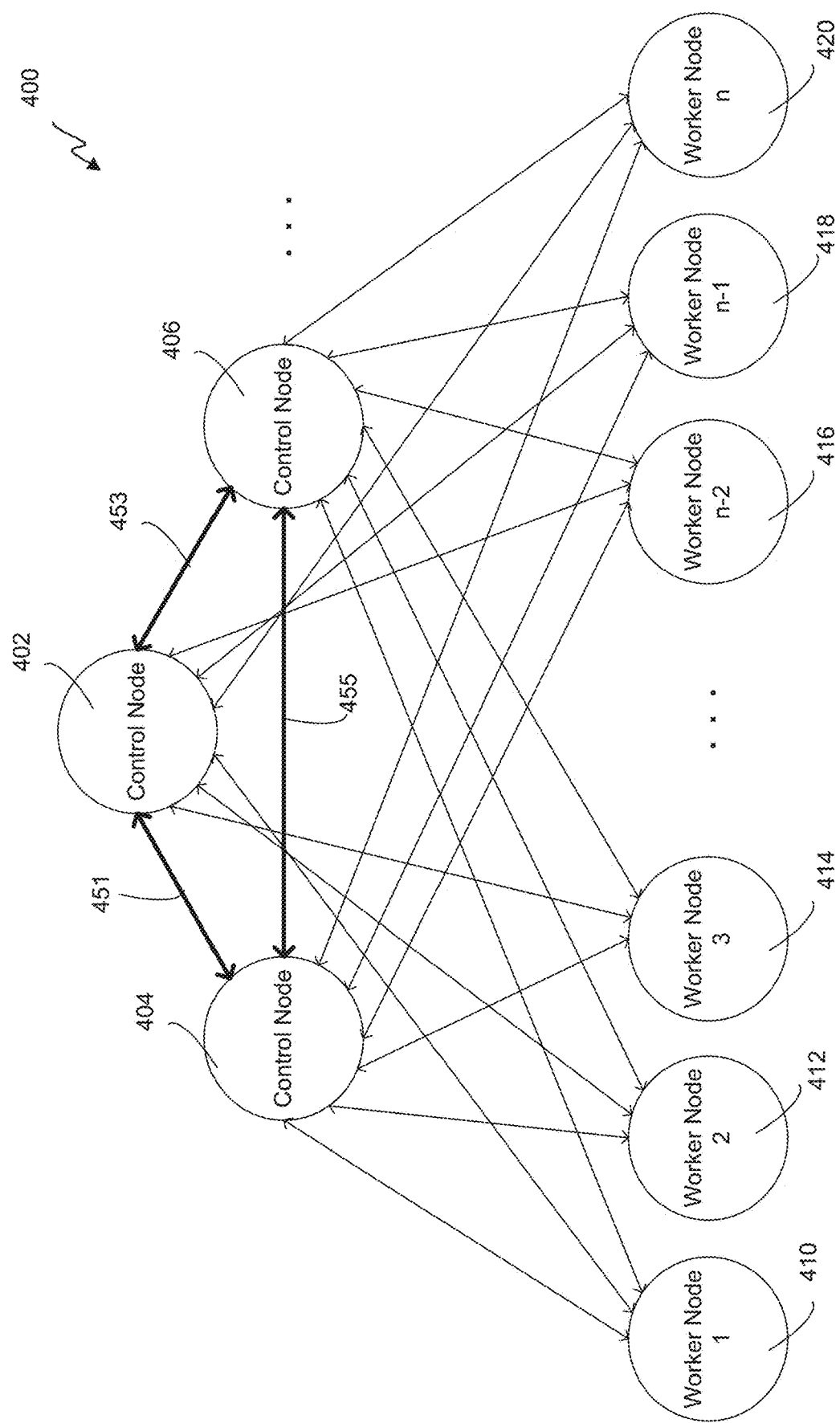
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
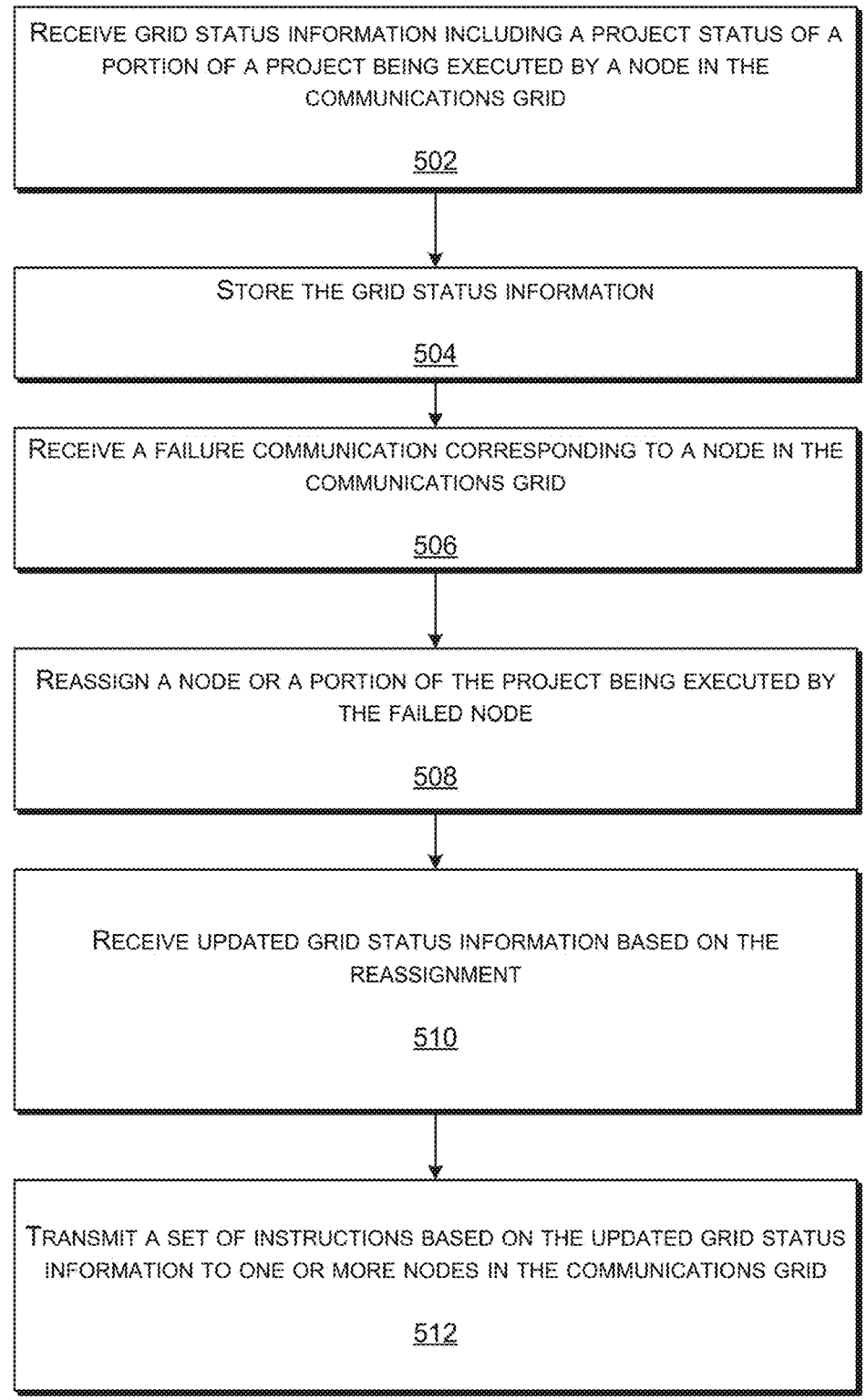
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
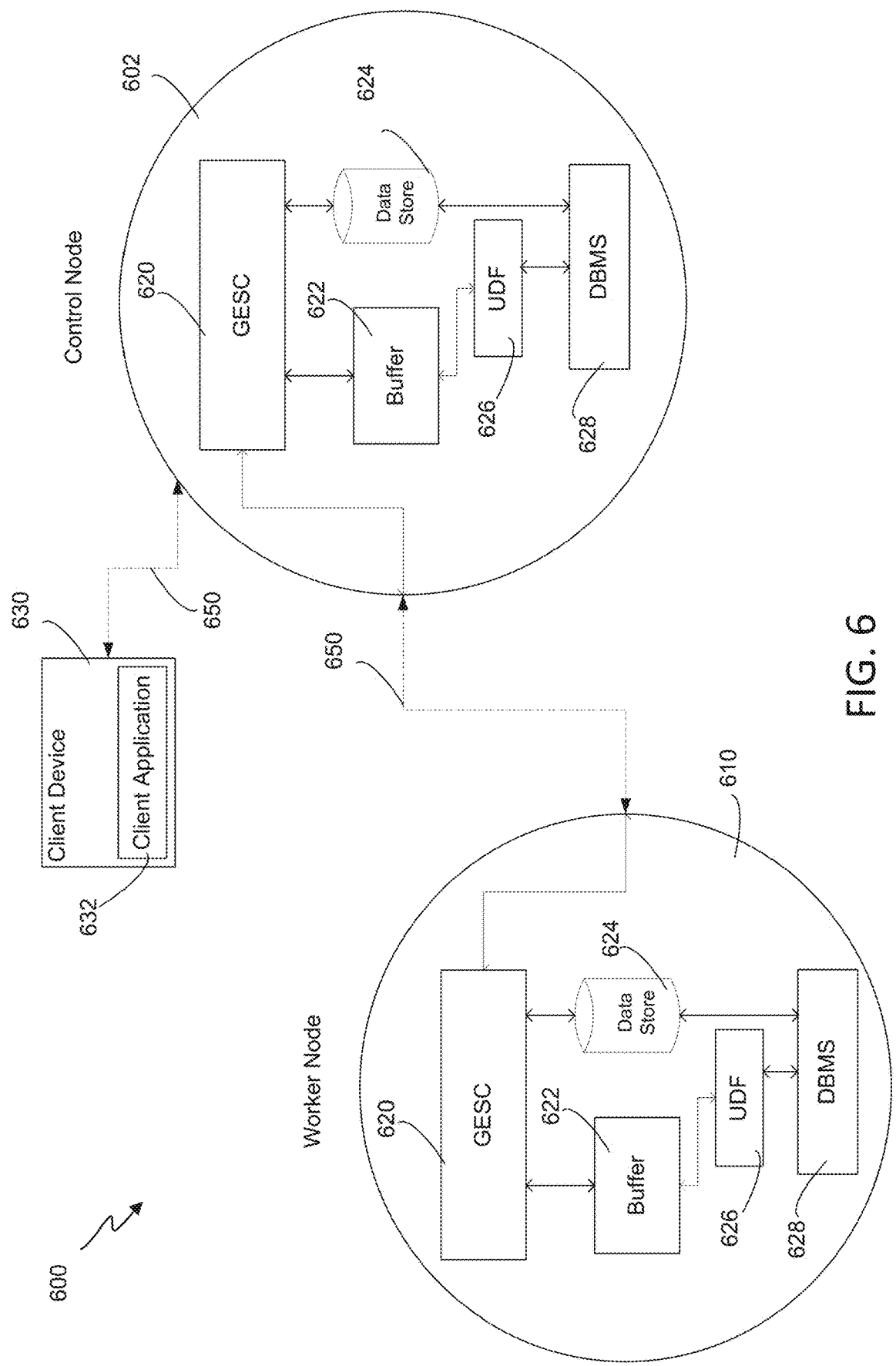
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
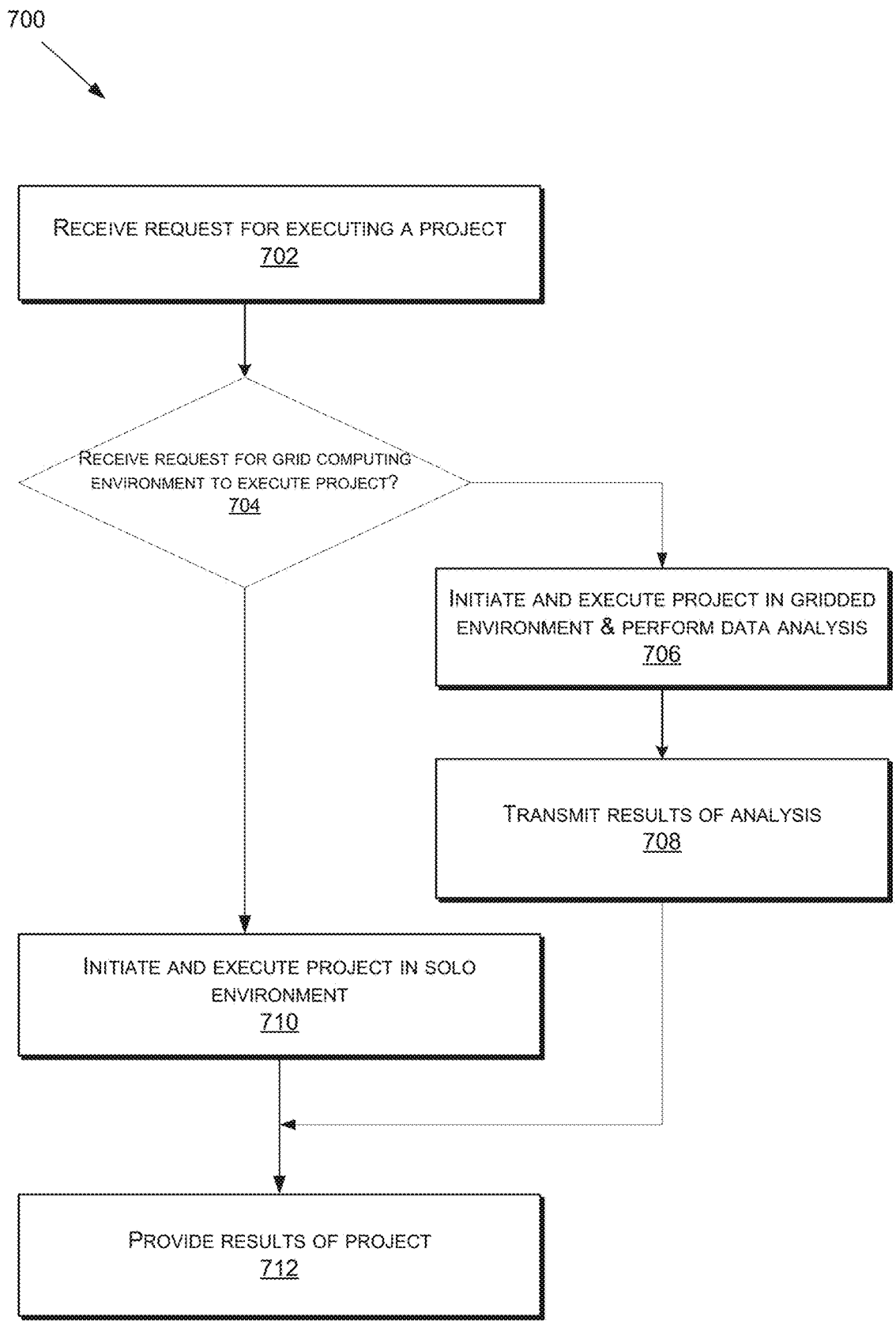
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
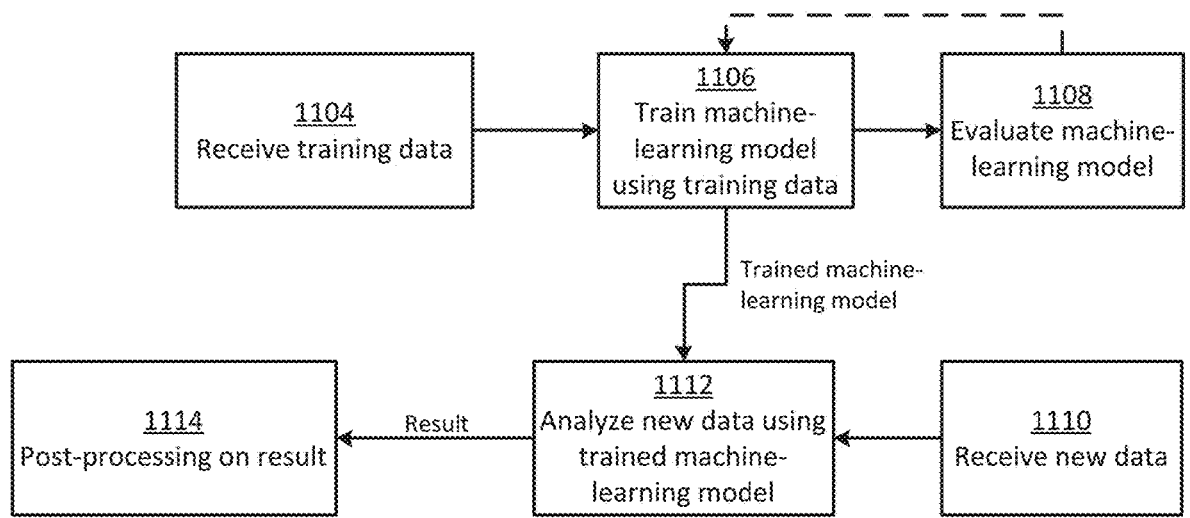
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
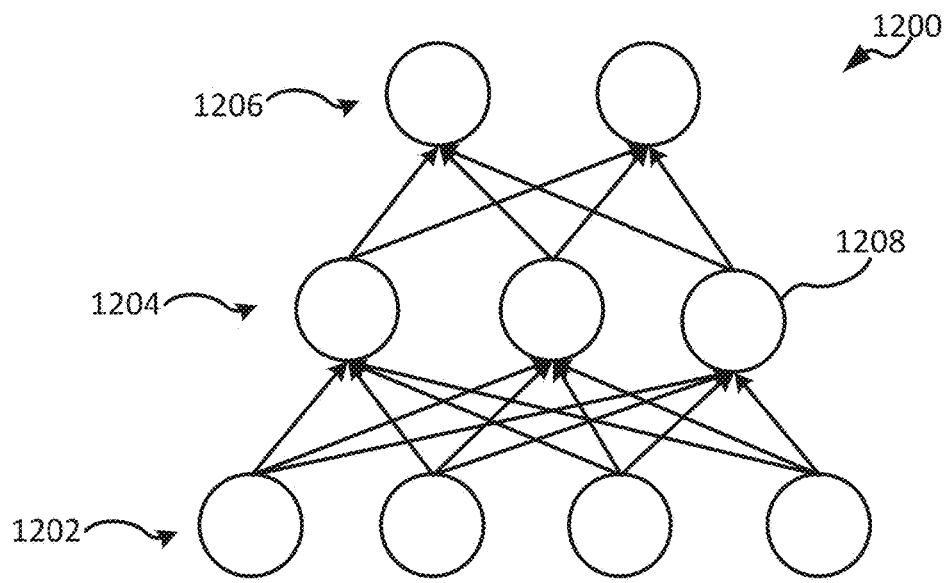
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
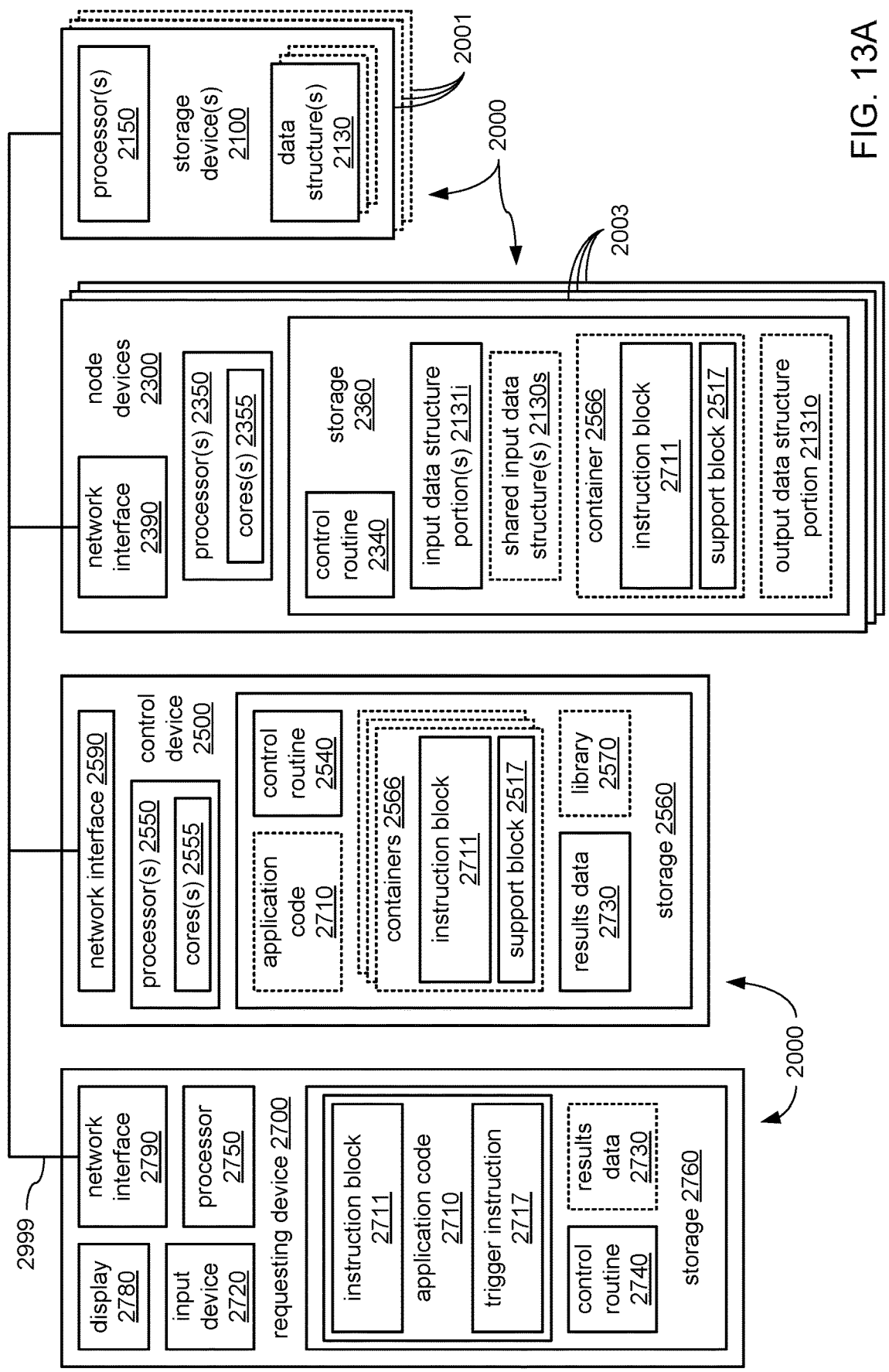
FIGS. 13A, 13B and 13C each illustrate an example embodiment of a processing system.
Figure 13B:
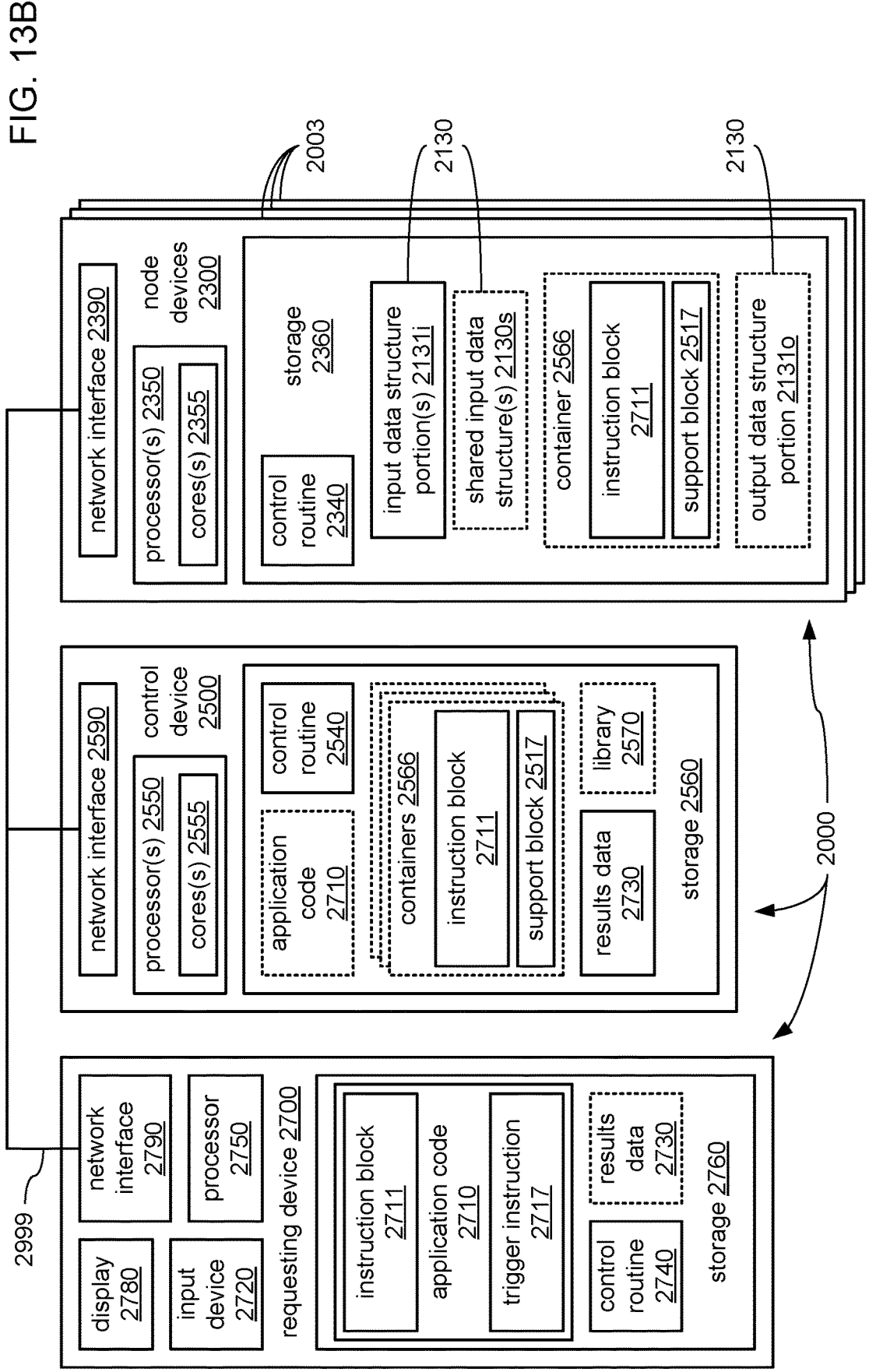
Figure 13C:
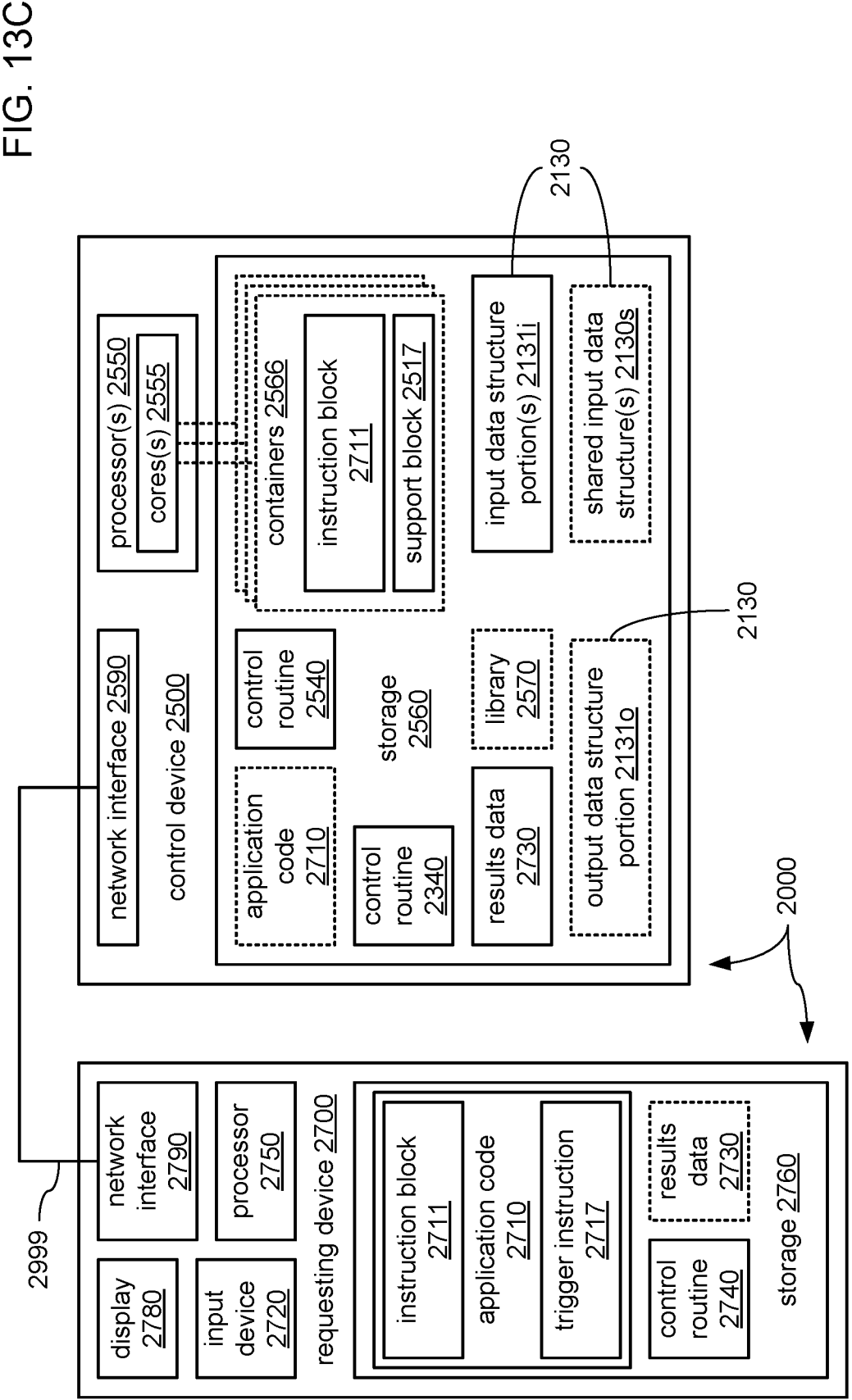

FIGS. 13A, 13B and 13C illustrate three different example embodiments of a processing system 2000. FIG. 13A illustrates a block diagram of an example embodiment of a distributed processing system 2000 incorporating one or more storage devices 2100 that may form a storage grid 2001, one or more node devices 2300 that may form of a node device grid 2003, at least one control device 2500 and/or at least one requesting device 2700 coupled by a network 2999. FIG. 13B illustrates a block diagram of an alternate example embodiment of the distributed processing system 2000 in which the storage functionality of the one or more storage devices 2100 is incorporated into the one or more node devices 2300. FIG. 13C illustrates an example embodiment of a non-distributed processing system in which the storage functionality of the one or more storage devices 2100 and the processing functionality of the one or more node devices 2300 are incorporated into the control device 2500.

Turning to FIG. 13A, the storage device(s) 2100 may store one or more data structures 2130. As will later be explained in greater detail, where there are multiple storage devices 2100, at least a subset of the one or more data structures 2130 may be stored in a distributed manner in which different portions thereof are stored within different ones of the storage devices 2100. Each of the one or more data structures 2130 may be so stored within or retrieved from the storage device(s) 2100 by the one or more node devices 2300 under the control of the control device 2500. More specifically, during concurrent execution of multiple instances of an instruction block 2711 of application code 2710 across multiple node devices 2300, rows of data values from those different portions of such a data structure 2130 may be provided to the different ones of those node devices 2300 from each of the different ones of the storage devices 2100 that store one of those portions.

In support of such operations, the devices 2100, 2300, 2500 and/or 2700 may exchange portions of the one or more data structures 2130, at least portions of the application code 2710, and/or information concerning the concurrent execution of at least portion(s) of the application code 2710 through the network 2999. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

The data within each of the data structures 2130 may be any of a variety of types of data concerning any of a wide variety of subjects, including and not limited to, technical or scientific data, patient or sociological data, shipping or activity tracking data, historical or real-time event data, geological or meteorological data, etc. As will be explained in greater detail, it is envisioned that at least a subset of the data structure(s) 2130 may be sufficiently large in size such that storage and/or processing of the entirety thereof within a single device may be deemed to be at least impractical, if not impossible. Therefore, to facilitate storage and/or processing of such larger data structure(s) 2130 in a distributed manner across multiple devices, each of such larger data structure(s) 2130 may be divided into multiple portions that may be distributed among multiple storage devices 2100 and/or among multiple node devices 2300.

In some embodiments, multiple ones of the storage devices 2100 may be operated together (e.g., as a network-attached drive array, etc.) primarily for the purpose of persistently storing data, such as one or more data structures 2130. In such embodiments, the multiple storage devices 2100 may be capable of exchanging the entirety of a relatively large data structure 2130 with multiple node devices 2300 in a set of data transfers of portions thereof performed at least partially in parallel through the network 2999, and such transfers may be coordinated by the control device 2500. In some embodiments, processor(s) 2150 of the one or more storage devices 2100 may each independently implement a local file system by which at least relatively small data structures 2130 may each be stored entirely within a single one of the storage devices 2100. Alternatively or additionally, processors 2150 of multiple ones of the storage devices 2100 may cooperate through the network 2999 to implement a distributed file system to store larger data structures 2130 as multiple portions in a distributed manner across multiple ones of the storage devices 2100. As still another alternative, it may be that one or more of the storage devices 2100 store a combination of whole data structures 2130 that are of relatively small data size such that they are able to be stored entirely within a single storage device 2100, and a portion 2131 of at least one data structure 2130 that is too large in data size to be able to be stored entirely within any single one of the storage devices 2100.

In various embodiments, each of the multiple node devices 2300 may incorporate one or more of processors 2350, a storage 2360 and a network interface 2390 to couple each of the node devices 2300 to the network 2999. The processor(s) 2350 may incorporate multiple processing cores 2355 and/or other features to support the execution of multiple executable routines and/or multiple instances of executable routine(s) across multiple execution threads. The storage 2360 may store a control routine 2340, at least one instance of the instruction block 2711 of the application code 2710, one or more entire data structures 2130 (e.g., the depicted one or more shared input data structures 2130s), and/or a portion 2131 of at least one data structure 2130 (e.g., the depicted at least one input data structure portion 2131i, and/or the depicted at least one output data structure portion 2131o). As depicted, the at least one instance of the instruction block 2711 may be accompanied by a corresponding instance of a support block 2517 and/or may be stored within a corresponding container 2566.

The control routine 2340 may incorporate a sequence of instructions operative on the processor(s) 2350 to implement logic to perform various functions. In executing the control routine 2340, the processor(s) 2350 of each of the node devices 2300 may be caused to operate the network interface 2390 to, via the network 2999, recurringly transmit indications of current levels of availability of processing and/or storage resources to the control device 2500; receive instance(s) of the instruction block 2711, and/or instance(s) of the support block 2517 from the control device 2500; exchange portions 2131 of data structure(s) 2130 with the storage device(s) 2100; and/or exchange portions 2131 of data structure(s) 2130 with the control device 2500. Also, in executing the control routine 2340, a processor 2350 of one of the node devices 2300 may be caused to execute the executable instructions within an instance of the instruction block 2711 concurrently with processors 2350 of other node devices 2300. In further executing the control routine 2340, the processor(s) 2350 may be caused to operate the network interface 2390 to coordinate such concurrent executions of multiple instances of the instruction block 2711 with the control device 2500 via the network 2999.

As will be explained in greater detail, such concurrent execution of multiple instances of the instruction block 2711 may additionally entail the concurrent execution of multiple corresponding instances of the support block 2517, which may include additional instructions to support the executions of the multiple instances of the instruction block 2711. Alternatively or additionally, such concurrent execution of multiple instances of the instruction block 2711 may additionally entail the use of corresponding ones of the containers 2566 to provide an execution environment in which the execution of each of the instances of the instruction block 2711 and/or of the support block 2517 may take place.

Again, within each node device 2300, the execution of an instance of the instruction block 2711 therein may entail the receipt, by each node device 2300, of a different one of multiple input data structure portions 2131i from the storage device(s) 2100. As will be explained in greater detail, within each node device 2300, there may be numerous iterations of execution of the instance of the instruction block 2711 therein, and with each iteration, a row of data values from within the input data structure portion 2131i received by that node device 2300 may be used as an input. Thus, the quantity of iterations of execution may be determined by the quantities of rows of data values that are present within the input data structure portion 2131i. Also, with each iteration of execution, a row of data values may be output to form a corresponding output data structure portion 2131o. Following the completion of the iterations of execution, the processor(s) 2350 of each of the node devices 2300 may transmit the output data structure portion 2131o generated within that node device 2300 to the control device 2500 via the network 2999 to enable the control device 2500 to aggregate the multiple output data structure portions 2131*o* to generate the results data 2730.

In various embodiments, the control device 2500 may incorporate one or more of a processor 2550, a storage 2560 and a network interface 2590 to couple the control device 2500 to the network 2999. The processor(s) 2550 may incorporate multiple processing cores 2555 and/or other features to support the execution of multiple executable routines and/or multiple instances of executable routine(s) across multiple execution threads. The storage 2560 may store a control routine 2540; the application code 2710; the multiple containers 2566 that may each contain one of the instances of the instruction block 2711 and/or of the corresponding support block 2517; a library 2570 of thread-safe routines that may be called from within the instruction block 2711; and/or the results data 2730 that may be generated from aggregating outputs of the executions of the multiple instances of the instruction block 2711.

The control routine 2540 may incorporate a sequence of instructions operative on the processor(s) 2550 to implement logic to perform various functions. In executing the control routine 2540, the processor(s) 2550 of the control device 2500 may be caused to operate the network interface 2590 to, via the network 2999, receive the application code 2710 (including the instruction block 2711 and a trigger instruction 2717) from a requesting device 2700; and transmit multiple instances of the instruction block 2711 and/or of the corresponding support block 2517 to multiple node devices 2300 for concurrent execution. Also, in executing the control routine 2540, the processor(s) 2550 may be caused to parse the received application code 2710, and then generate the support block 2517 therefrom. In further executing the control routine 2540, the processor(s) 2550 may be caused to operate the network interface 2590 to receive the output data structure portions 2131*o* from multiple node devices 2300 in which each was generated as a result of the concurrent executions of the instruction block 2711; and/or to transmit the results data 2730 that is generated from aggregating the received output data structure portions 2131*o* to the requesting device 2700.

In various embodiments, the requesting device 2700 may incorporate one or more of a processor 2750, a storage 2760, an input device 2720, a display 2780 and a network interface 2790 to couple the requesting device 2700 to the network 2999. The storage 2760 may store a control routine 2740, the application code 2710 and/or corresponding results data 2730 derived from execution of the application code 2710.

The control routine 2740 may incorporate a sequence of instructions operative on the processor 2750 to implement logic to perform various functions. In executing the control routine 2740, the processor 2750 of the requesting device 2700 may be caused to operate the input device 2720 and/or the display 2780 to provide a user interface (UI) by which a programmer may use the requesting device 2700 to generate the application code 2710, including the instruction block 2711 and the trigger instruction 2717 that indicates that multiple instances of the executable instructions within the instruction block 2711 are to be executed concurrently and repetitively. Also in executing the control routine 2740, the processor 2750 may be caused to operate the network interface 2790 to, via the network 2999, transmit the application code 2710 to the control device 2500, and receive the results data 2730 generated from the parsing and executing of the application instructions 2710.

Alternatively, it may be that processor 2750, is caused to operate the input device 2720, the display 2780 and/or the network interface 2790 to provide a UI that provides a programmer with communications with the control device 2500 to enable remote generation of the application code 2710 within the control device 2500 through the requesting device 2700. Stated differently, the requesting device 2700 may be caused to serve as a remote terminal device.

Comparing FIGS. 13A and 13B, as an alternative to the distributed processing system 2000 of FIG. 13A including storage device(s) 2100 that are separate and distinct from the node device(s) 2300, it may instead be the case that the function of persistent storage of the one or more data structures 2130 is performed by the one or more node devices 2300, as depicted in the distributed processing system 2000 of FIG. 13B. Thus, it may be the processor(s) 2350 within each of the one or more node devices 2300 that may implement a local file system by which at least relatively small data structures 2130 may each be stored entirely within a single one of the node devices 2300. Alternatively or additionally, it may be the processors 2350 of multiple ones of the node devices 2300 that may cooperate through the network 2999 to implement a distributed file system to store larger data structures 2130 as multiple portions 2131 in a distributed manner across multiple ones of the node devices 2300.

Comparing FIGS. 13B and 13C, as an alternative to the distributed processing system 2000 of FIG. 13B including multiple node device(s) 2300 among which the concurrent executions of multiple instances of the instruction block 2711 may be distributed, it may instead be the case that such concurrent execution is to be distributed across multiple processor cores 2555 of the processor(s) 2550 of the control device 2500, as depicted in the processing system 2000 of FIG. 13C. As also depicted in FIG. 13C, it may be that the control device 2500 also directly stores one or more data structures 2130. Alternatively or additionally (and not specifically depicted), it may be that the processing system 2000 additionally includes the one or more storage devices 2100 of FIG. 13A, and that it is the control device 2500 that exchanges portions 2131 of data structures 2130 with the storage device(s) 2100 in lieu of their being separate and distinct node devices 2300 to do so.

Figure 14A:
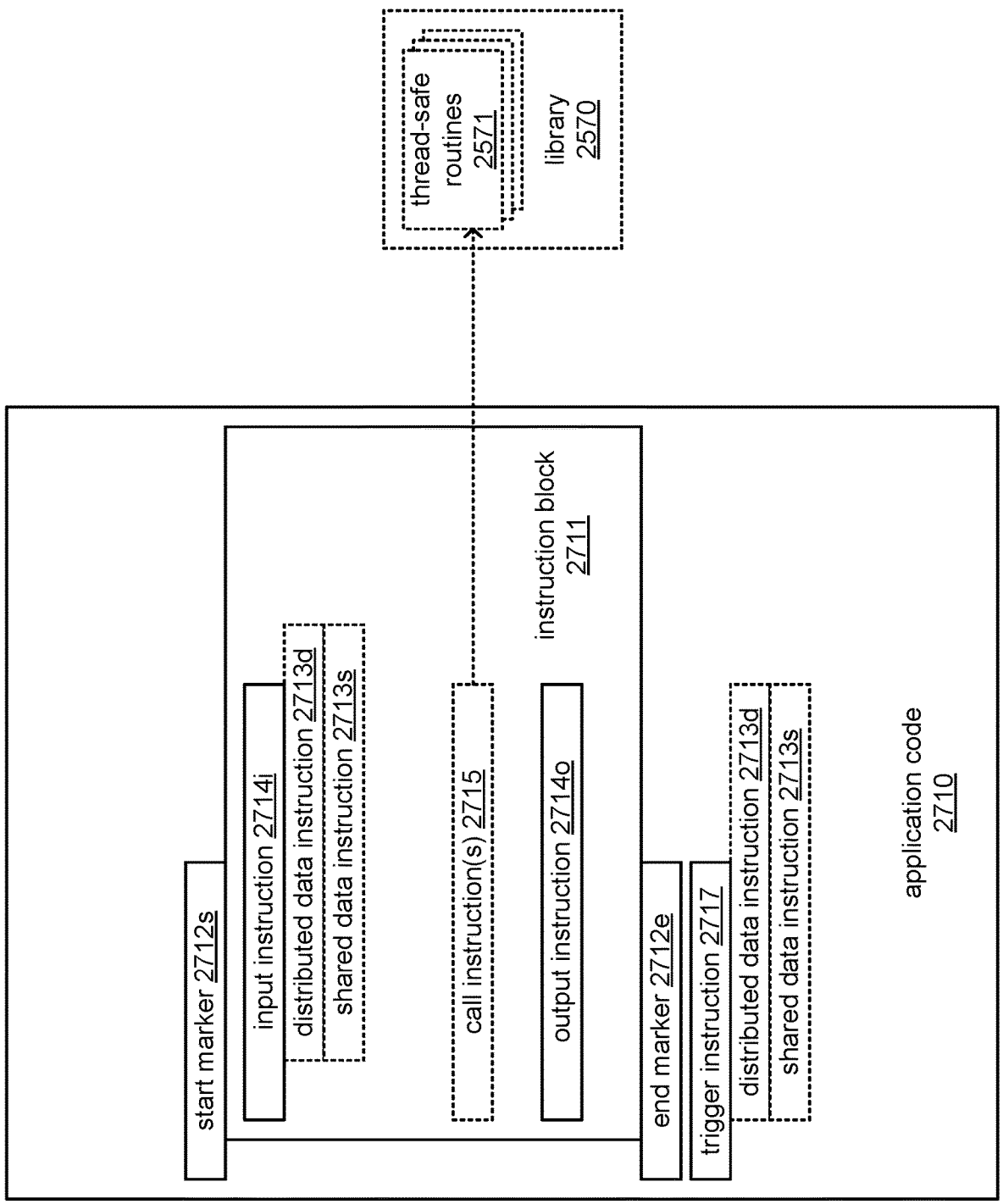
FIGS. 14A and 14B each illustrate an example of application code that includes an instruction block.
Figure 14B:
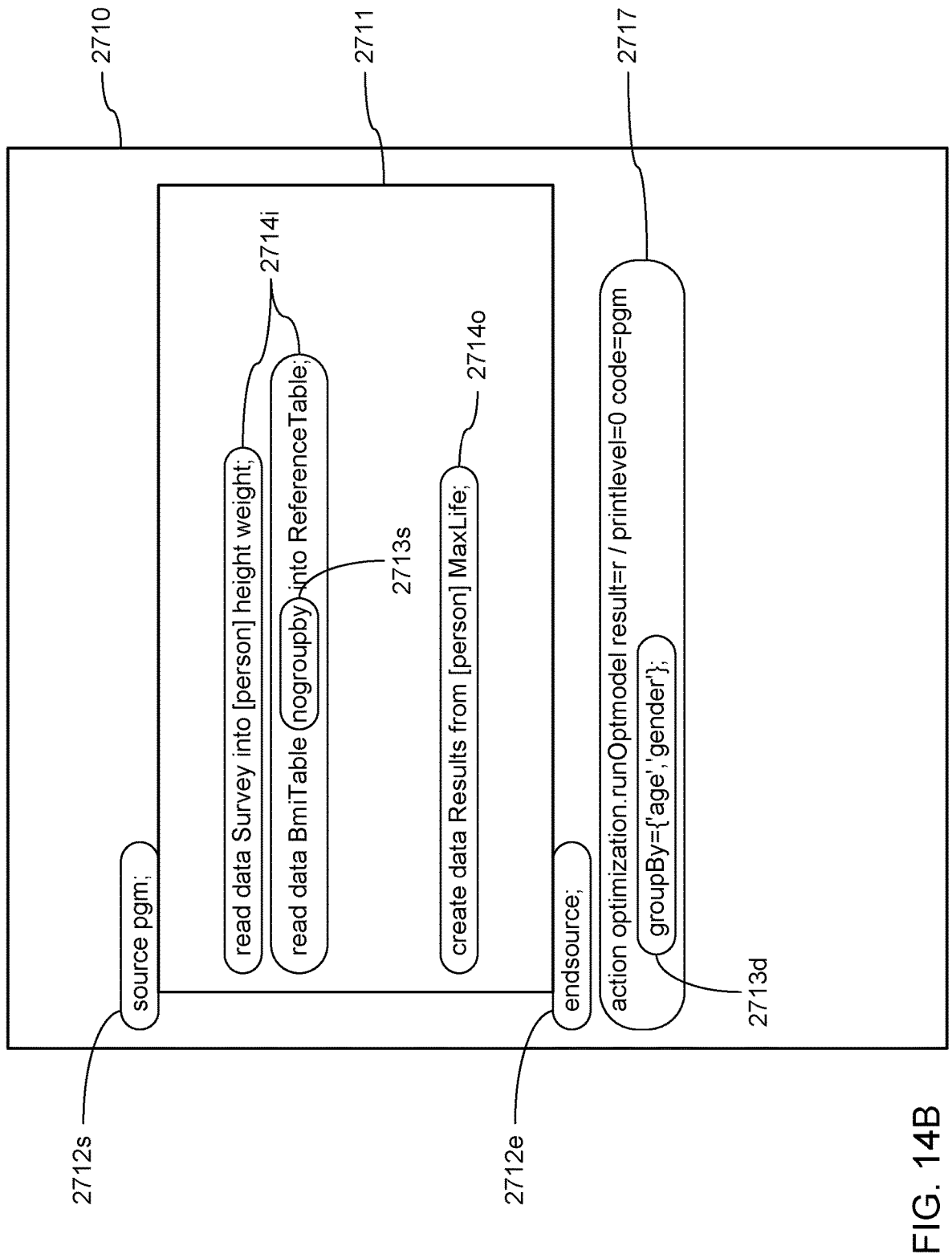

FIGS. 14A and 14B illustrate example embodiments of application code 2710 that includes an instruction block 2711, of which multiple instances are to be executed concurrently and repetitively. FIG. 14A provides a more conceptual example, while FIG. 14B provides a more specific example with portions of code written in the SAS programming language promulgated by SAS Institute of Cary, N.C., USA.

Turning to FIG. 14A, as depicted in this example, and as previously discussed, the application code 2710 may include an instruction block 2711 that includes a set of executable instructions. It should be noted that, for sake of clarity of presentation and ease of understanding, just a selected subset of executable instructions are actually depicted as present within the instruction block 2711 to reduce visual clutter. As also depicted and as previously discussed, the start and end of the instruction block 2711 may be marked by a start marker 2712*s* and an end marker 2712*e*, respectively.

Further, the instruction block 2711 may be accompanied by a trigger instruction 2717 that serves to provide the indication that multiple instances of the instruction block 2711 are to be concurrently executed across multiple processor cores (e.g., multiple processor cores 2555 of the control device 2500) and/or across multiple processing devices (e.g., multiple ones of the node devices 2300). The trigger instruction 2717 also serves to provide the indication that there are no data dependencies among the multiple instances of the instruction block 2711, and that each of the multiple instances of the instruction block 2711 is to be executed repeatedly until all of the rows within a corresponding portion of a data structure have been used as input. However, and as previously discussed, other embodiments are possible in which the trigger instruction 2717 may be located within the instruction block 2711. As also previously discussed, a distributed data instruction 2713d may be incorporated into the trigger instruction 2717 as a component thereof, and may provide the indication that at least one input data structure 2130 is to be a distributed input data structure 2130d divided up into such multiple portions, each of which is to be used to provide separate rows of data values as an input to the multiple iterations of the repetitive execution of a corresponding one of the instances of the instruction block 2711. Alternatively or additionally, a shared data instruction 2713s may be similarly incorporated into the trigger instruction 2717 to provide an indication that at least one other specified input data structure 2130 is to be a shared input data structure 2130s that is to be provided in its entirety to each such instance of the instruction block 2711. In this way, the trigger instruction 2717 may become a single instruction that provides the necessary indications that multiple instances of the instruction block 2711 are to be executed concurrently, that there are no dependencies among those instances, that each instance is to be provided with a portion 2131 of a distributed input data structure, and that each instance is to be repeatedly executed until all of the rows within its corresponding portion 2131 of the distributed input data structure 2130d have been used as an input.

Within the instruction block 2711 may be at least one input instruction 2714i that is to cause the retrieval of either a row of data values from a distributed input data structure 2130d, or at least a specified portion of an entire shared input data structure 2130s. In a manner similar to the trigger instruction 2717, and as also previously discussed, a distributed data instruction 2713d may be incorporated into the input instruction 2714i as a component thereof (instead of being a component of the trigger instruction 2717), and may provide an indication that at least one input data structure 2130 is to be a distributed input data structure 2130d that is to be used to provide a separate row of data values as an input to each iteration of the repetitive execution of each instance of the instruction block 2711. Again, either alternatively or additionally, a shared data instruction 2713s may be similarly incorporated into the input instruction 2714i as a component thereof (again, instead of being a component of the trigger instruction 2717) to provide an indication that at least one other specified input data structure 2130 is to be a shared input data structure 2130s that is to be provided in its entirety to each such instance.

Also within the instruction block 2711 may be at least one call instruction 2715 that makes a call to a thread-safe routine 2571 of the library 2570 of routines. As previously discussed, such routines may include a variety of arithmetic "solver" routines operable to perform various mathematical optimization functions using data values from data structures 2130 as inputs. Again, the thread-safe nature of the thread-safe routines 2571 may enable these routines to be called from concurrently executed instances of such call instructions 2715 without interactions between each of the instances of the thread-safe routines 2571 that are instantiated as a result of those concurrent calls.

Further, within the instruction block 2711 may be at least one output instruction 2714o that is to cause the output of what may be a row of data values into one of multiple portions 2131 of an output data structure 2130 that may be generated from the outputs of multiple iterations of execution as an output data structure portion 2131o. As previously discussed, such output data structure portions 2131o that are separately generated with the outputs of rows of multiple iterations of execution of each instance of the instruction block 2711 may be aggregated in any of a variety of ways to form any of a variety of types of output. In at least some embodiments, such aggregation may entail the concatenation of the multiple output data structure portions 2131o to form a complete output data structure 2130 that may become the results data 2730 and/or from which the results data 2730 may be derived. Again, various aspects of the particular type of aggregation that is performed may depend on the type of instruction used as the output instruction 2714o, and/or on the type of function(s) performed by the various routine(s) that may be called.

Turning to FIG. 14B, again, in this example, the application code 2710 may include an instruction block 2711 that includes a set of executable instructions. In this example, the executable instructions within the instruction block 2711 implement logic to generate predictions of maximum life expectancy "MaxLife" for each person represented with a row of data values in survey results stored in an input data structure "Survey", where such predictions may be based on a table of body mass index statistics in another input data structure "BmiTable". Again, for sake of clarity of presentation and ease of understanding, just a selected subset of executable instructions are actually depicted as present within the instruction block 2711 to reduce visual clutter. Due to the "Survey" input data structure being of relatively large size, it is intended that this data structure is to be divided into portions that each include a relatively large quantity of rows of data values, and that each such portion is to be provided as an input to a different instance of the instruction block 2711, where each of those instances is to be executed concurrently and repeatedly until each instance has independently processed all of the rows within the portion of the "Survey" input data structure that is provided as input.

Again, the start and end of the instruction block 2711 may be marked by a start marker 2712s and an end marker 2712e, respectively. As depicted in this example, the start marker 2712s is in the form of a "source" instruction that includes the identifier "pgm" for the instruction block 2711, such that the instruction block is able to be called using the "pgm" identifier.

Also again, the instruction block 2711 may be followed by a trigger instruction 2717. As depicted in this example, the trigger instruction 2711 includes a reference to the identifier "pgm" that was specified in the start marker 2712s. As also depicted in this example, a distributed data instruction 2713d, in the form of a "groupBy" instruction, is incorporated into the trigger instruction 2717 as a component thereof to provide an indication that the rows of the "Survey" input data structure are to be organized into row groups based on the data values found in the columns for "age" and "gender" therein. Stated differently, the trigger instruction 2717 in this example provides the indication that multiple instances of the instruction block 2711 are to be executed concurrently. Also, with the inclusion of the distributed data instruction 2713d, the trigger instruction 2717 also provides the indication that at least the "Survey" input data structure is to be a distributed input data structure 2130d with its rows organized into row groups, with one or more row groups to be provided per input data structure portion 2131*i* that is provided as an input to each of the instances of the instruction block 2711, and that each of those instances are to be independently executed repeatedly for as many iterations as needed to process each row of the one or more of those row groups within the input data structure portion 2131*i* that is provided to it.

Further, again, the instruction block 2711 may include one or more input instructions 2714*i*, and/or may include one or more output instructions 2714*o*. As depicted in this example, a shared data instruction 2713*s*, in the form of a "nogroupby" instruction, is incorporated into one of the input instructions 2714*i* to provide an indication that the entirety of the "BmiTable" input data structure 2130 is to be provided to each of the instances of the instruction block 2711. Stated differently, this particular input instruction 2714*i* in this example provides the indication that the "BmiTable" input data structure 2130 is to become a shared input data structure 2130*s* where complete copies of this data structure 2130 are to be provided to all of the instances of the instruction block 2711 that are to be executed concurrently and repeatedly so as to allow any of the data values therein to be accessed and used in each iteration of execution thereof.

Figure 15A:
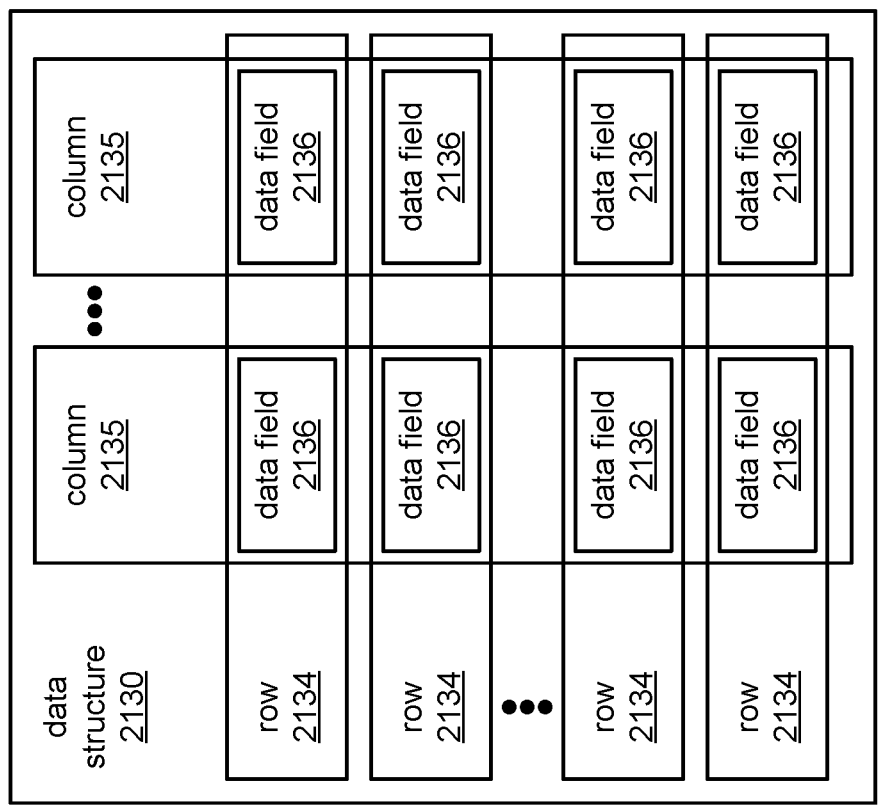
Figure 15D:
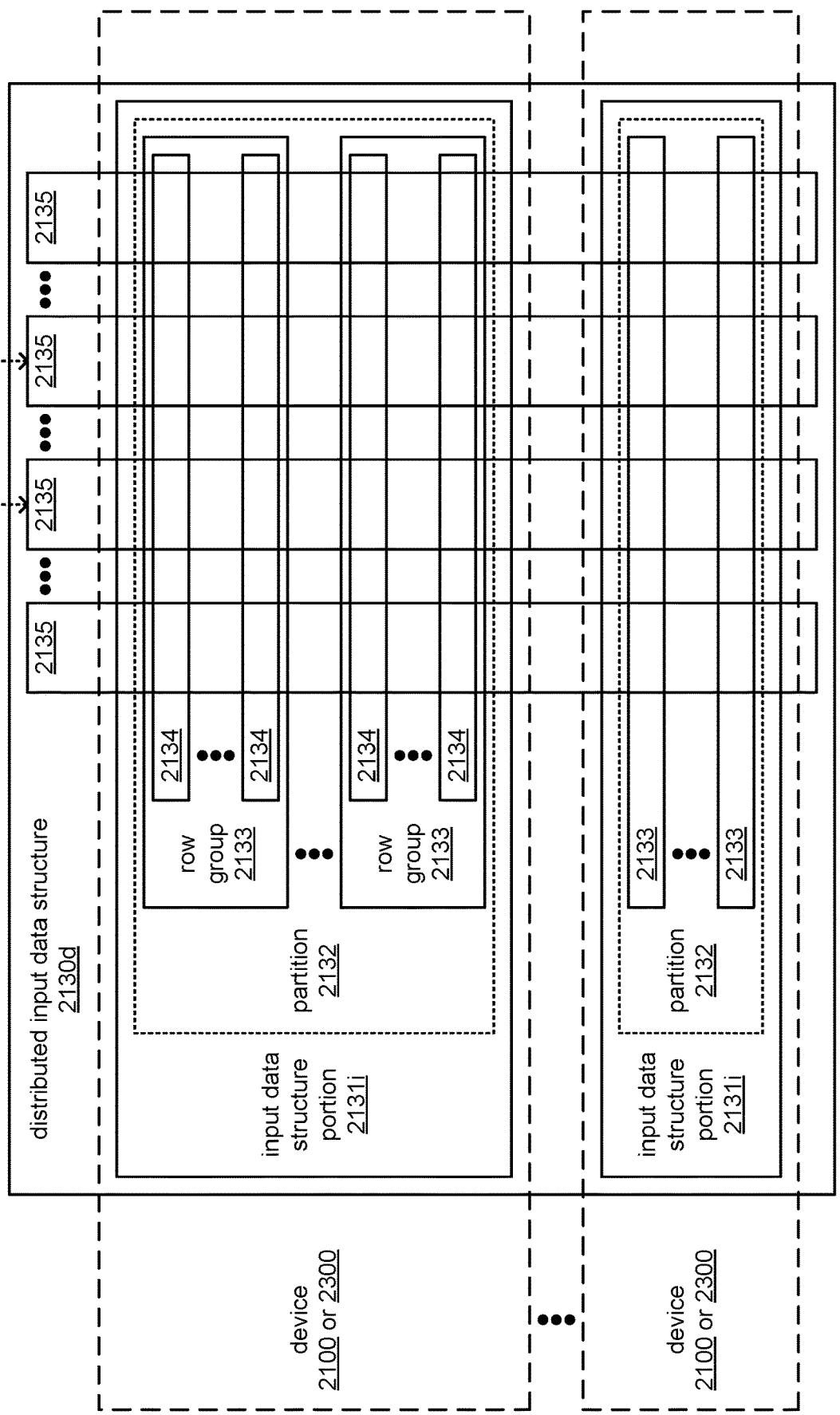

FIGS. 15A, 15B, 15C and 15D illustrate different examples and/or example states of data structures 2130 that are to be used as an input. FIG. 15A provides a view of an example data structure 2130 that may be used as either a shared input data structure 2130*s* or a distributed input data structure 2130*d*. FIG. 15B provides a view of an example data structure being used as a shared input data structure 2130*s*. FIGS. 15C and 15D, taken together, provide a view of the preparation and use of an example data structure 2130 as a distributed input data structure.

Turning to FIG. 15A, as depicted, and as previously discussed, it may be that a data structure 2130 has a two-dimensional row-column organization in which data values are stored in data fields 2136 that are located at each intersection of a row 2134 and a column 2135. The rows 2134 may be organized in no particular order (e.g., randomly), and their order may, instead, be a reflection of the manner in which the data structure 2130 was generated. Also, as has been discussed, it may be that such a data structure 2130 may be stored entirely within a single device (e.g., a single storage device 2100, a single node device 2300, or the control device 2500), or may be stored in a distributed manner with multiple portions 2131 thereof stored across multiple devices (e.g., across multiple storage devices 2100 or across multiple node devices 2300).

Turning to FIG. 15B, as previously discussed, a data structure 2130 may be designated a shared input data structure 2130*s* by a shared data instruction 2713*s*, and is therefore designated to be provided in its entirety to each instance of the instruction block 2711, and for each iteration of execution thereof. As depicted, it is envisioned that a data structure 2130 that is so designated as a shared input data structure 2130*s* is likely to be relatively small in data size such that it is able to be entirely stored within a single device 2100, 2300 or 2500 such that copies of the entirety of such a data structure 2130 are able to be provided to and stored by each of multiple node devices 2300.

FIG. 15C illustrates an example data structure 2130 that is stored in a distributed manner across multiple devices (e.g., across multiple storage devices 2100 as was discussed in reference to FIG. 13A, or across multiple node devices 2300 as was discussed in reference to FIG. 13B) such that each device of the multiple devices stores a portion 2131 of this depicted data structure 2130. As depicted, the rows 2134 may be organized in no particular order (e.g., randomly).

However, and turning to FIG. 15D, in response to such a data structure 2130 being designated a distributed input data structure 2130*d* by a distributed data instruction 2713*d*, the order of the rows 2134 therein may be caused to be reorganized to form row groups 2133 based on the data values present within one or more particular columns 2135 within each of the rows 2134. Stated differently, the rows 2134 that are present within each row group 2133 may have the very same data value or the very same combination of data values within the same column 2135 or within the same combination of columns 2135, respectively. It may be that any column 2135 or combination of columns 2135 may be the ones specified in the distributed data instruction 2713*d*.

As also depicted, and also previously discussed, at least in embodiments in which the concurrent execution of an instruction block 2711 is to occur across multiple processing devices (e.g., across multiple node devices 2300), the row groups 2133 may, themselves, be grouped into partitions 2132 where each partition 2132 is to be provided, in its entirety, to a single device. Where the total quantity of row groups 2133 within a distributed input data structure 2130*d* does not match the quantity of processing devices (e.g., the quantity of node devices 2300), or where the relative sizes of row groups 2133 differs greatly thereamong, then as depicted, the quantity of row groups 2133 within each partition 2132 may differ from one partition 2132 to another.

It should be noted that, for sake of simplicity of explanation and ease of understanding, this view of this example distributed input data structure 2130*d* is deliberately depicted as having relatively few rows 2134, relatively few columns 2135, relatively few row groups 2133 and relatively few partitions 2132. Thus, such depictions of relatively small quantities of each of these components should not be taken as limiting of the scope of what is disclosed or claimed herein. Again, it is envisioned that a distributed input data structure 2130*d* would likely be quite large so as to include a great many rows 2134 and columns 2135, and accordingly, would include numerous row groups 2133 and/or partitions 2132 after grouping is performed.

Also, as depicted in this deliberately simplified example of a distributed input data structure 2130*d*, each input data structure portion 2131*i* thereof that is stored within and/or assigned to a separate device is depicted as including a single partition 2132. It should be noted that, while such a one-to-one correspondence of partitions 2132 to input data structure portions 2131*i* may be possible, other embodiments are possible in which one or more of the input data structure portions 2131*i* may include more than one partition 2132. It should be understood that, while each partition 2132 may be intended to be provided in its entirety to a single device (such that no partition 2132 is to be stored or assigned such that it is split across multiple devices), embodiments are possible in which the partitions 2132 may be defined based on additional factors and/or for additional reasons than simply ensuring that all of the rows 2134 within each partition 2132 is stored within and/or is assigned to a single device.

Figure 16A:
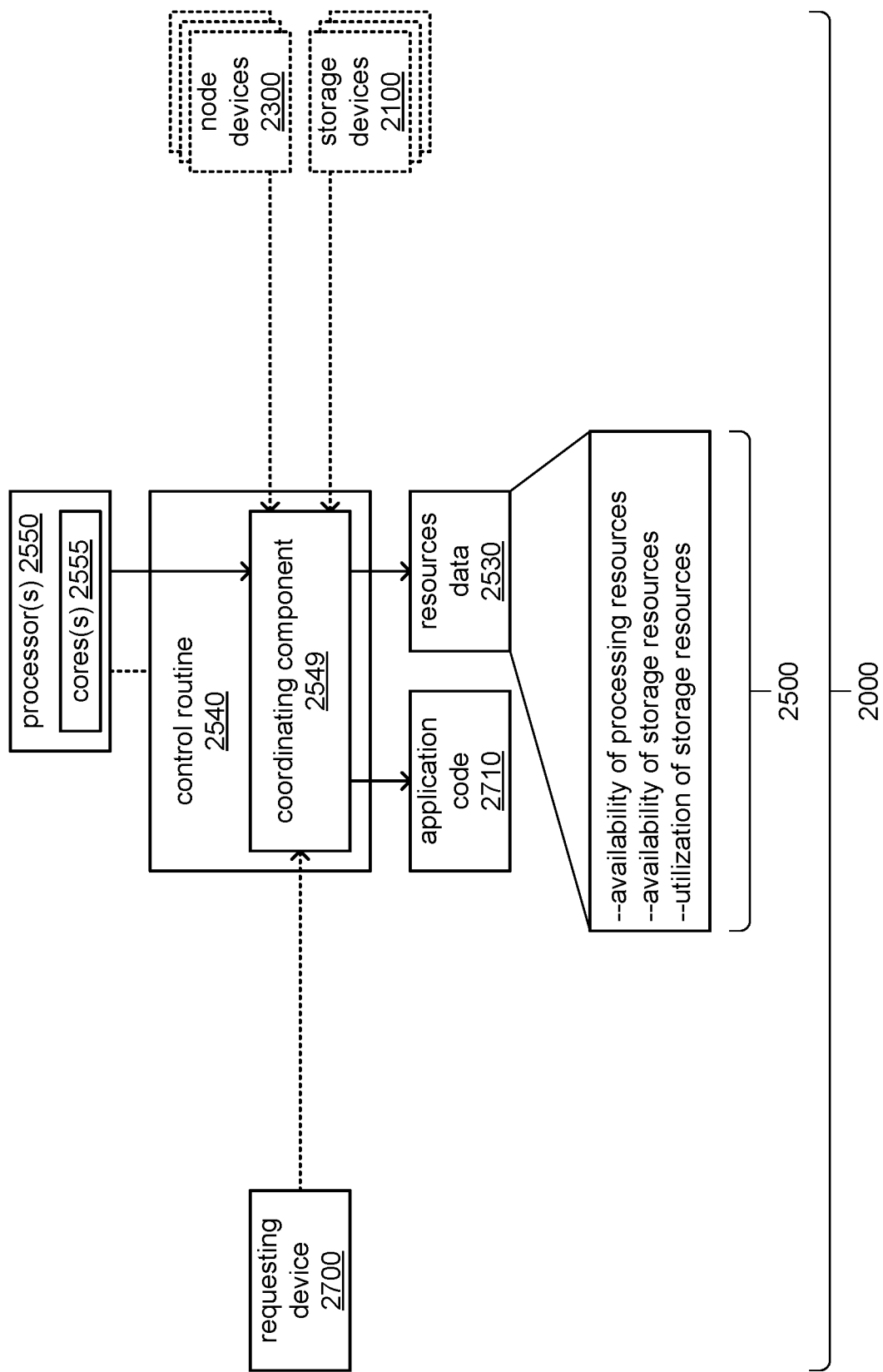
FIGS. 16A, 16B, 16C, 16D, 16E, 16F and 16G, together, illustrate an example of triggering concurrent and repetitive execution of multiple instances of executable instructions of an instruction block.
Figure 16B:
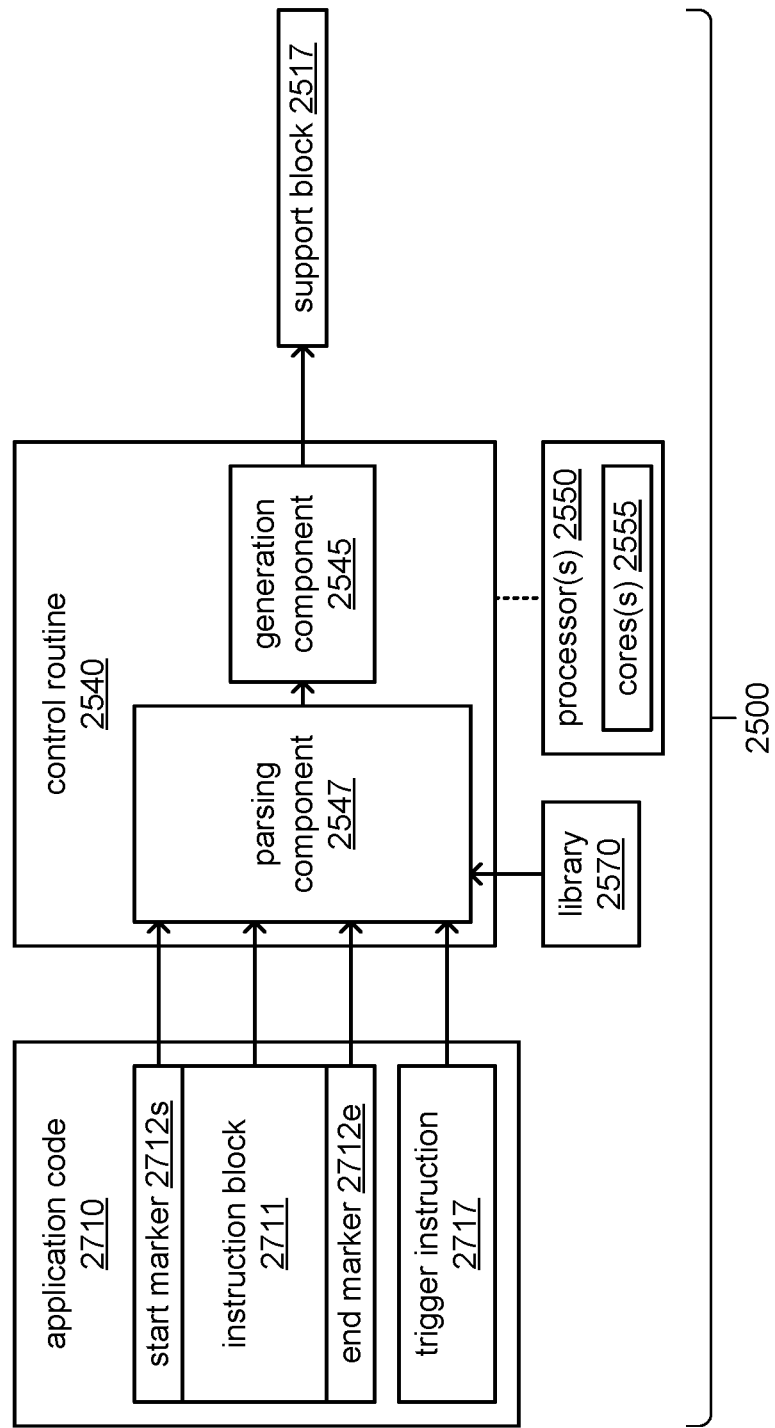
Figure 16C:
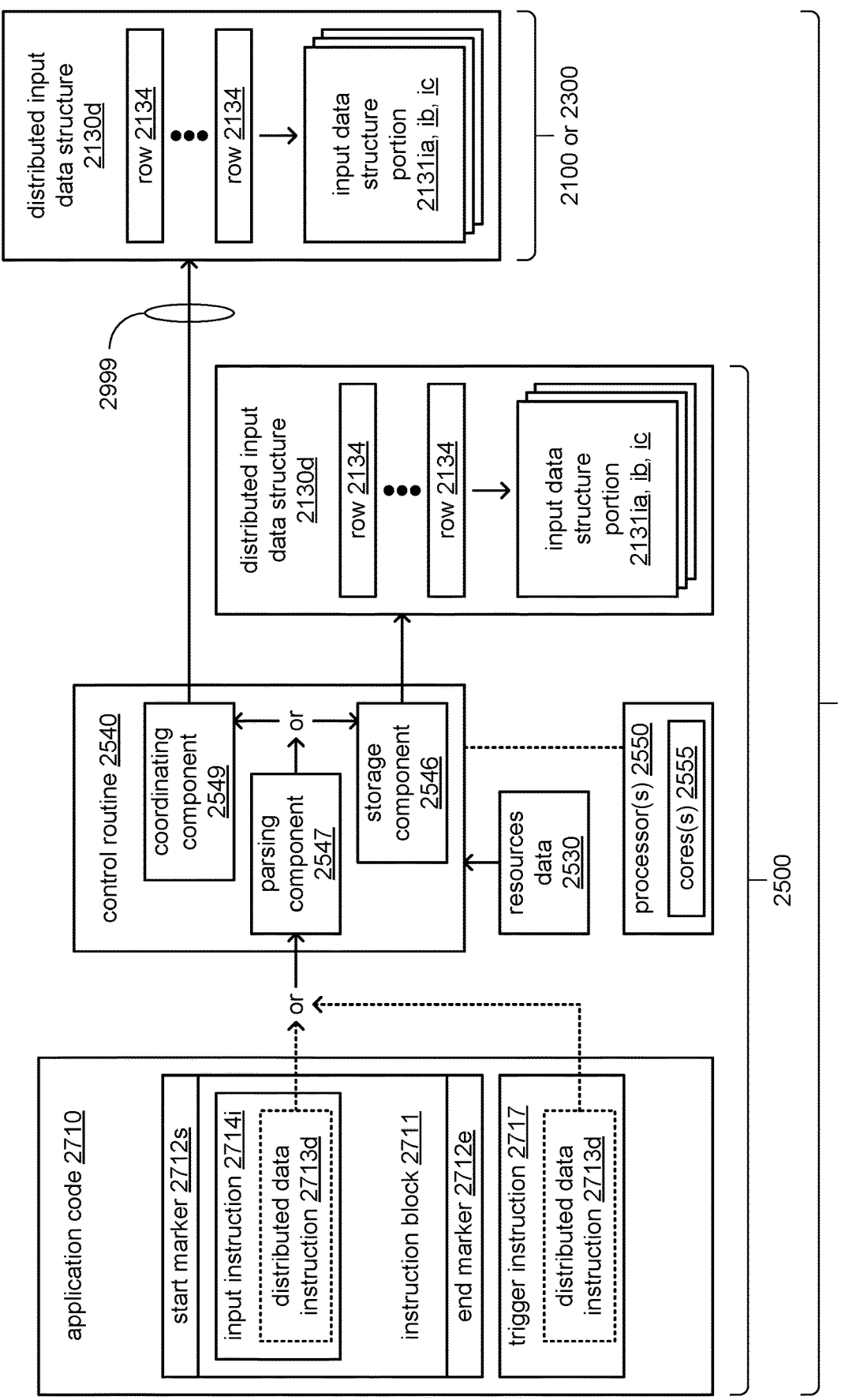
Figure 16D:
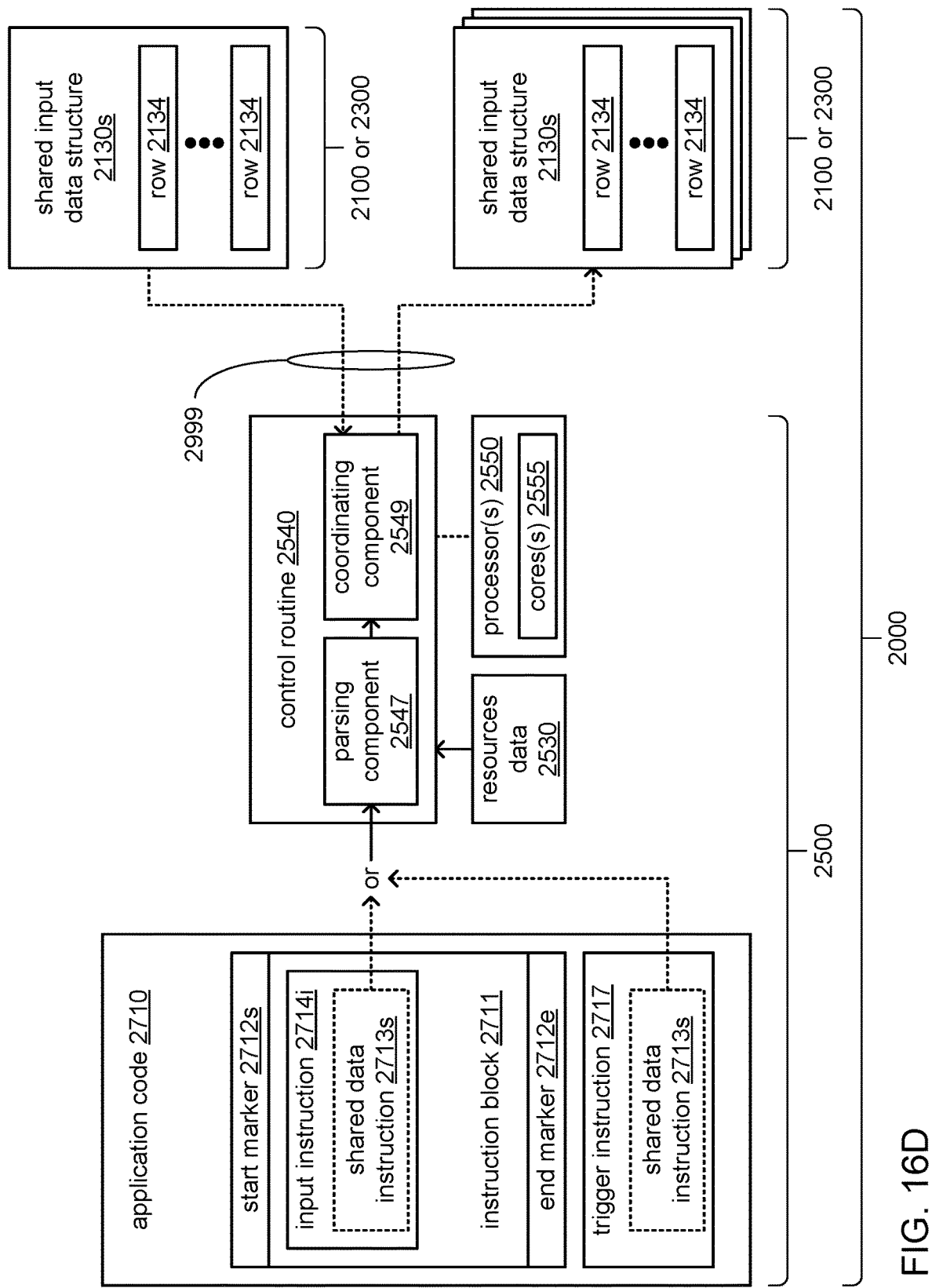
Figure 16E:
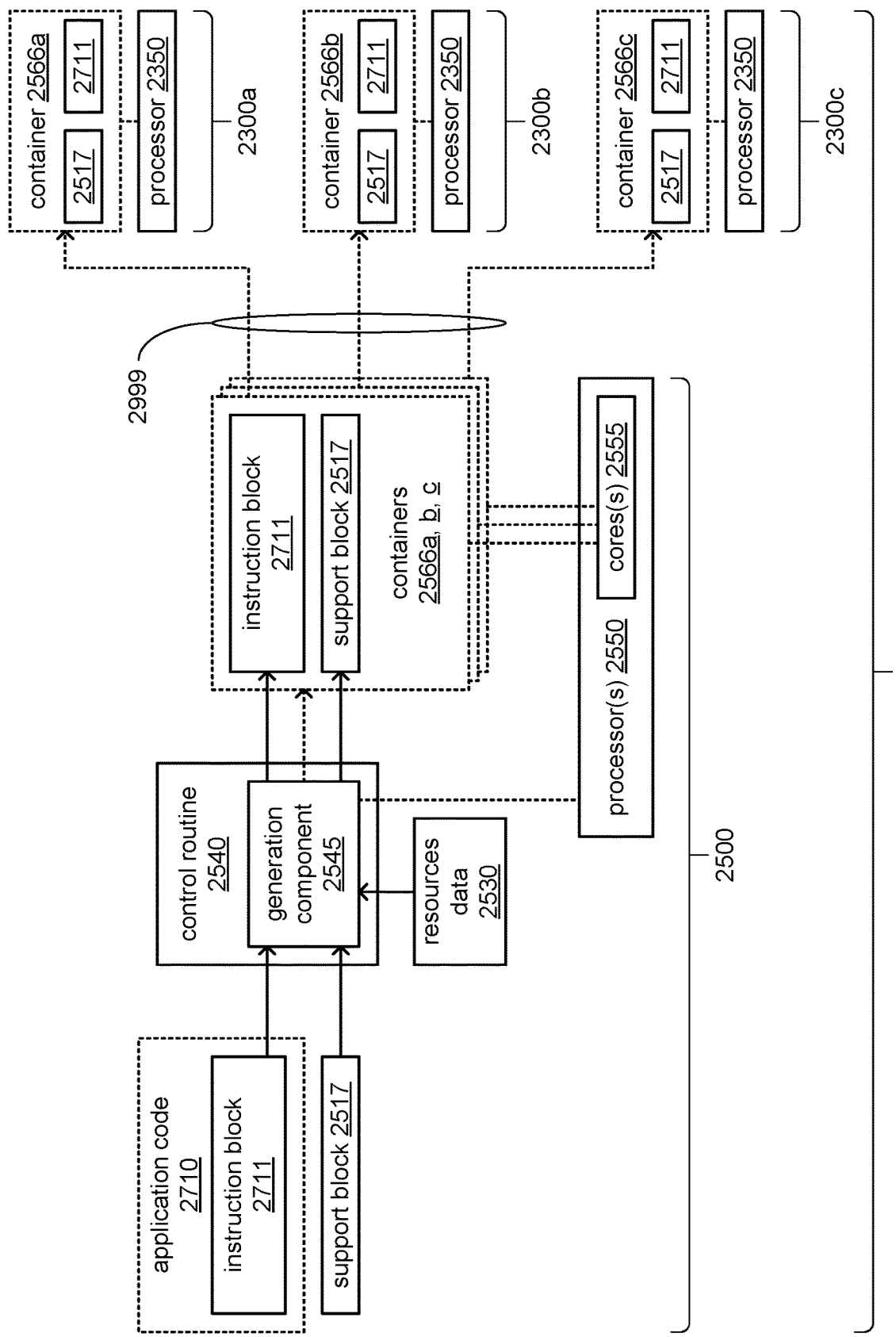
Figure 16F:
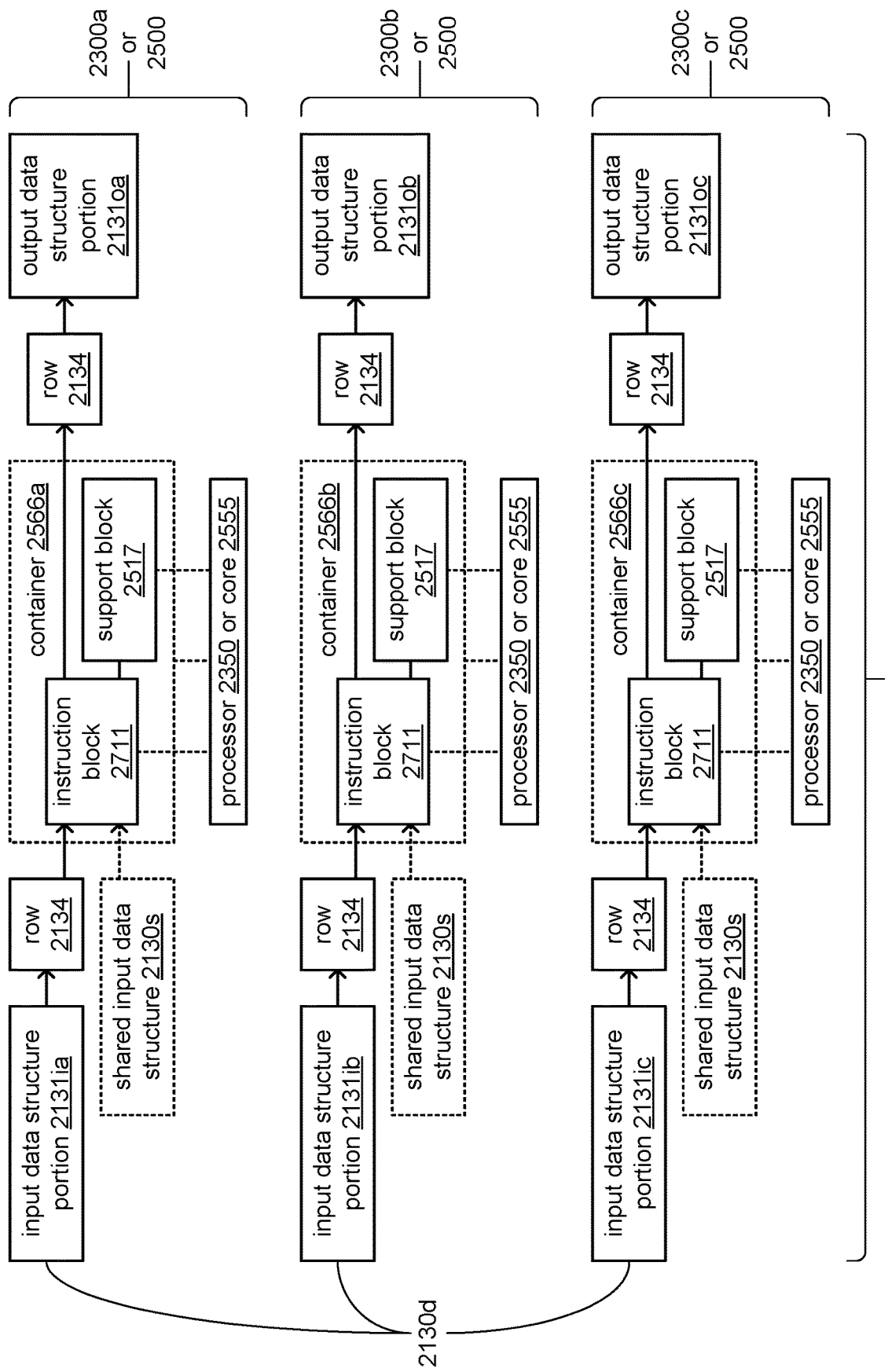
Figure 16G:
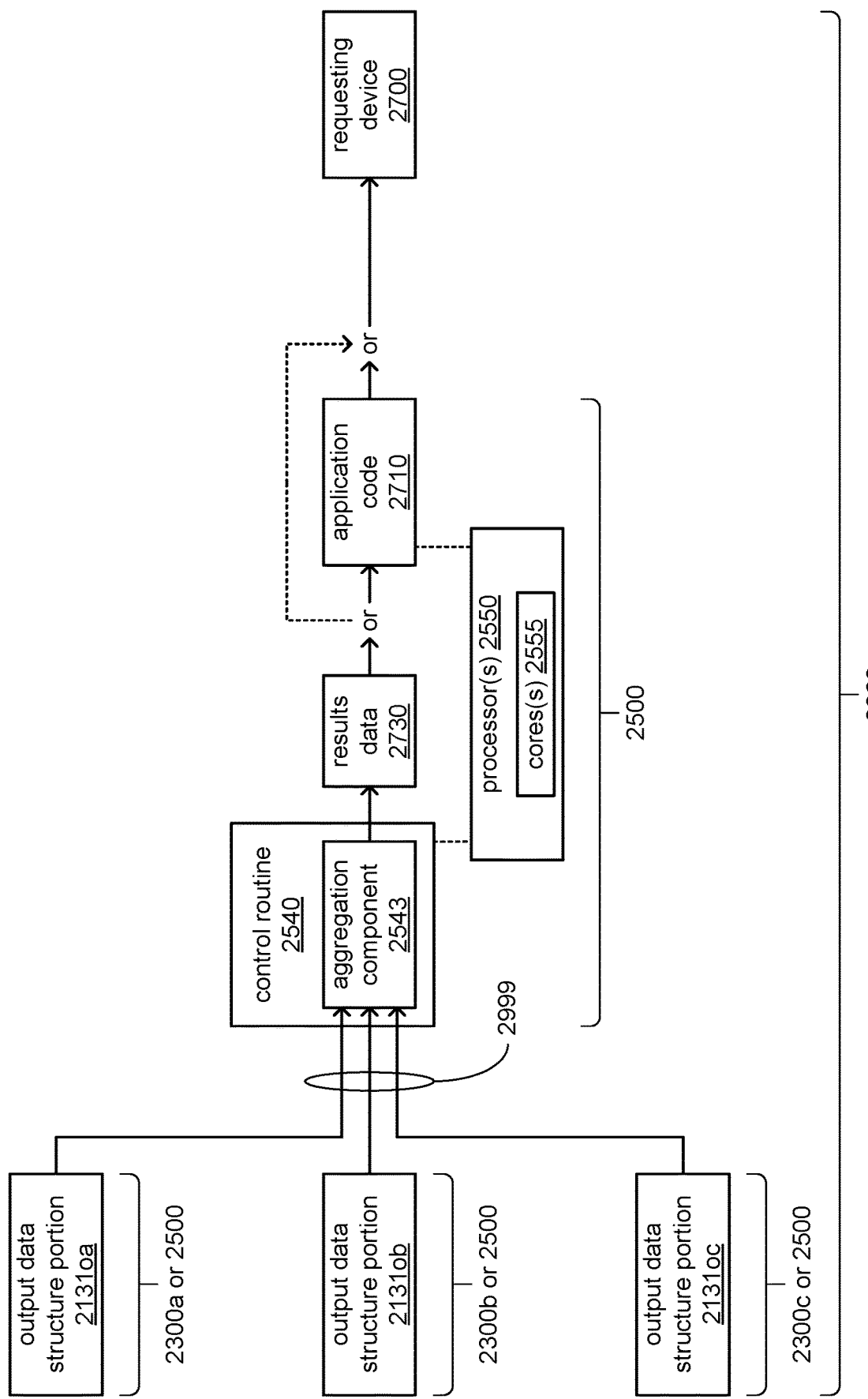
Figure 17A:
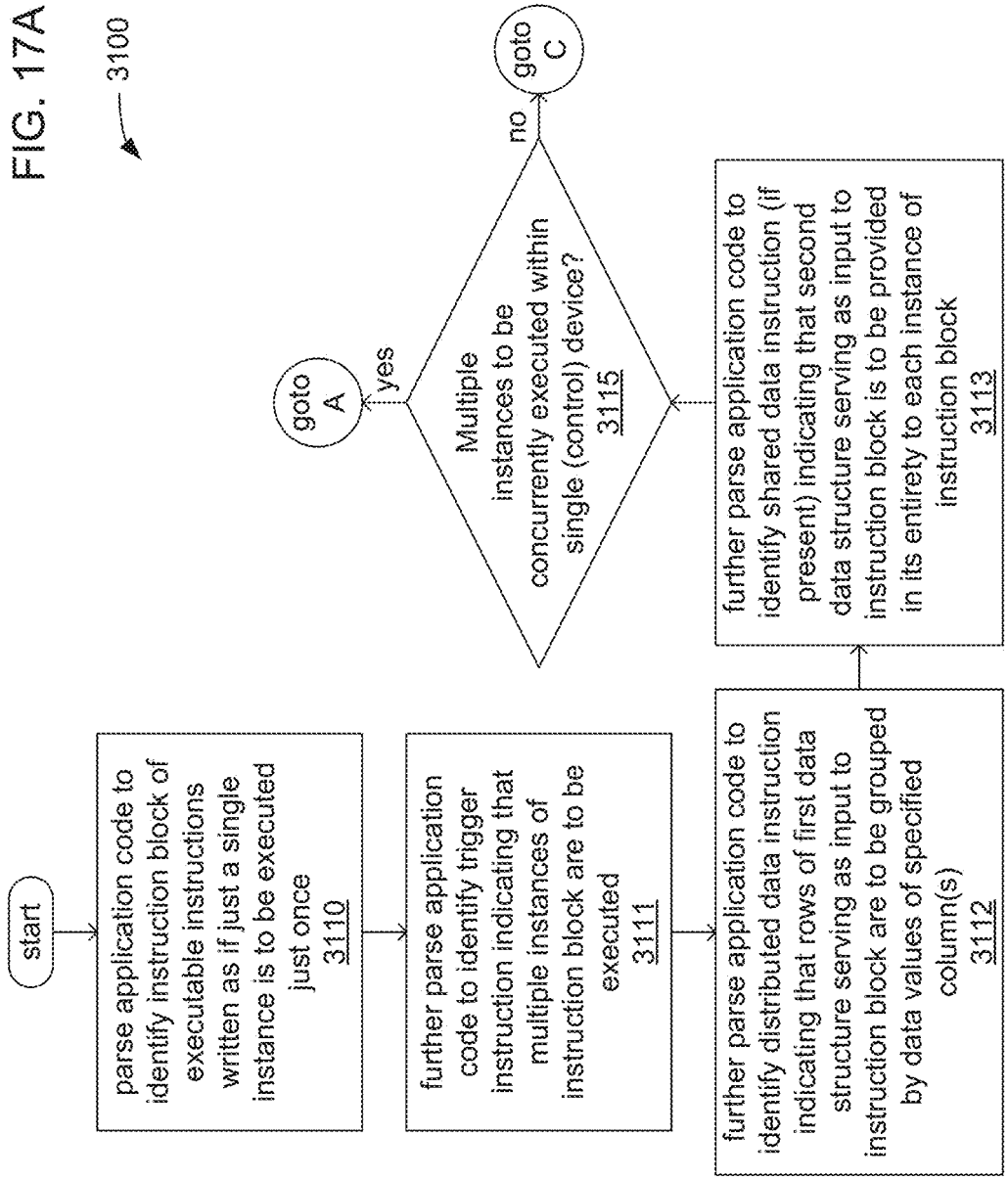
Figure 17B:
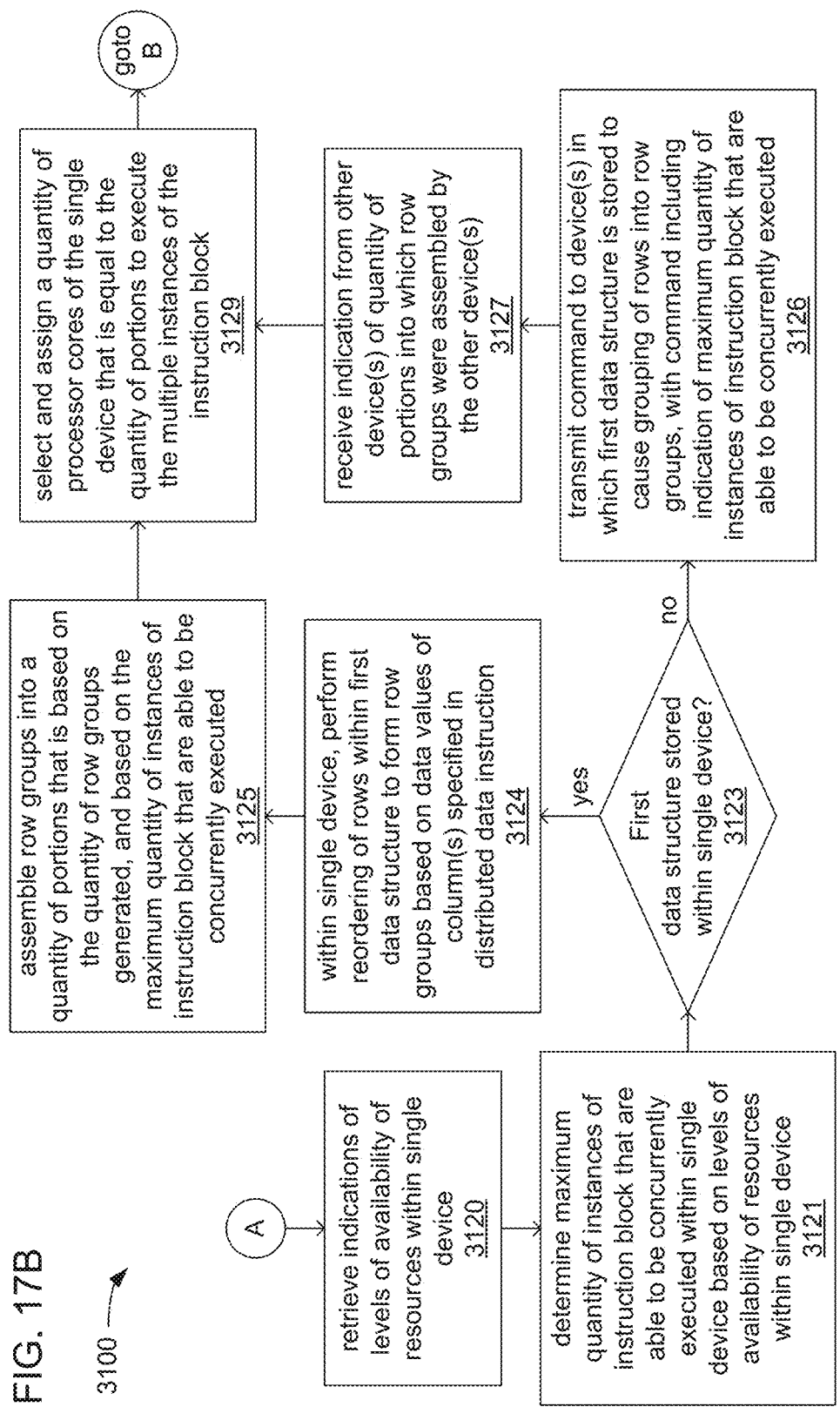
Figure 17C:
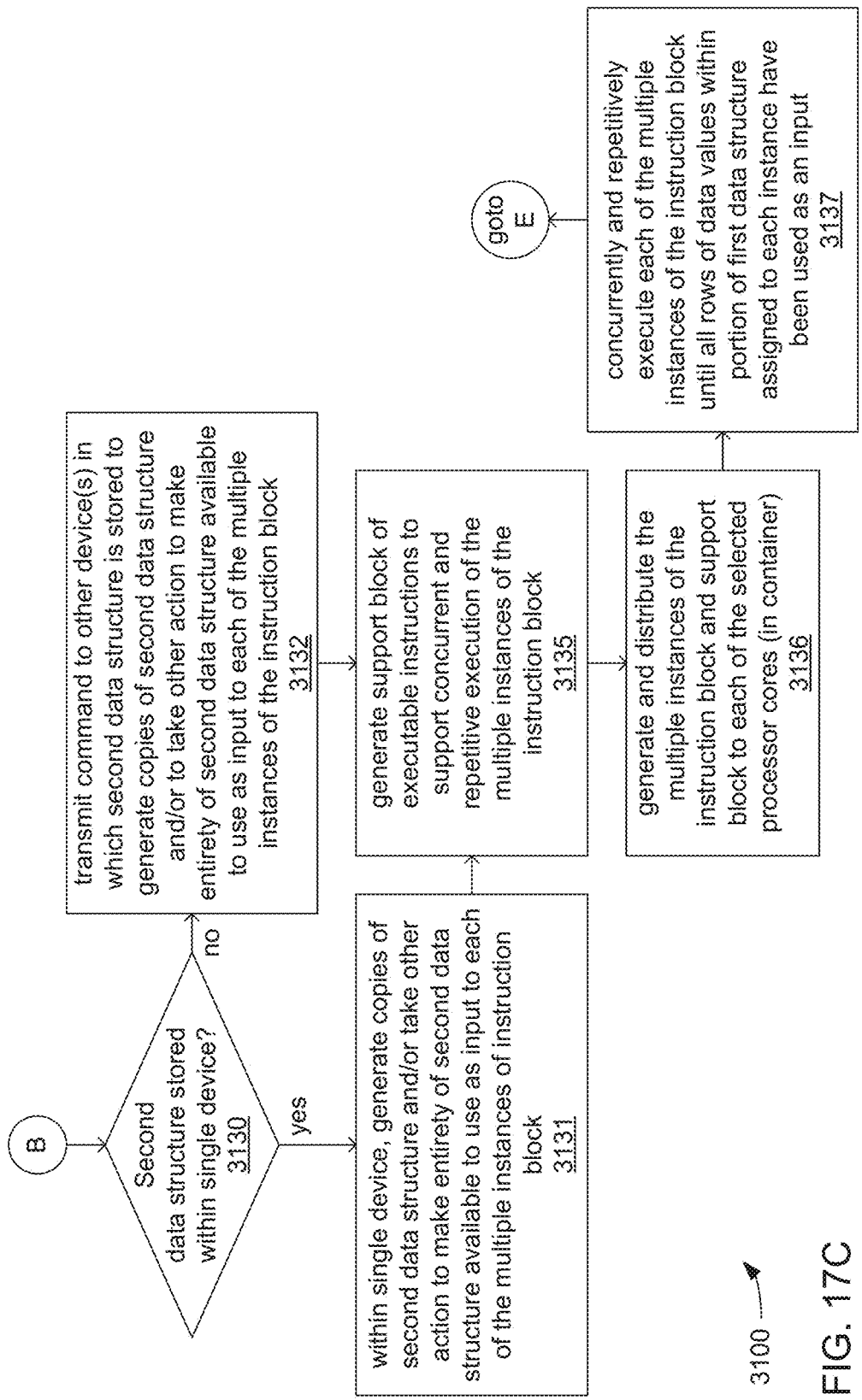

FIGS. 16A through 16G, taken together, illustrate an example of the triggering of concurrent and repetitive execution of multiple instances of the instruction block 2711. FIG. 16A illustrates the reception of the application code 2710, including the instruction block 2711 therein by the control device 2500, as well as the ongoing reception thereat of indications of availability of various resources within other devices involved in the execution of multiple instances of the instruction block 2711. FIG. 16B illustrates the generation of the support block 2517 from the application code 2710. FIG. 16C illustrates an example of the triggering and performance of grouping of rows of a data structure 2130 to form a distributed input data structure 2130$d$. FIG. 16D illustrates an example of the triggering and performance of sharing of another data structure 2130 to become a shared input data structure 2130$s$. FIG. 16E illustrates an example of the generation and distribution of multiple instances of the instruction block 2711 among multiple processor cores 2555 of the control device 2500, or among multiple node devices 2300. FIG. 16F illustrates the concurrent and repetitive execution of the multiple instances of the instruction block 2711 by multiple processor cores 2555, or by multiple node devices 2300. FIG. 16G illustrates the aggregation of the multiple output data structures 2130$o$ as a result of the concurrent and repetitive execution of the multiple instances of the instruction block 2711 in FIG. 16F.

Turning to FIG. 16A, within a control device 2500 of one of the processing systems of FIGS. 13A-C, in executing a coordinating component 2549 of the control routine 2540, the one or more processors 2550 may be caused to receive the application code 2710 from the requesting device 2700 via the network 2999. The processor(s) 2550 may also be caused to receive a request from the requesting device 2700 to execute the executable instructions of the application code 2710.

Ongoing execution of the coordinating component 2549 by the processor(s) 2550 of the control device 2500 may cause the processor(s) 2550 to additionally receive, on an ongoing basis, indications of the current availability of processing and/or storage resources from each of the node device(s) 2300 and/or from each of the storage device(s) 2100 in embodiments of the processing system 2000 that include the node device(s) 2300 and/or the storage device(s) 2100, such as the embodiments depicted in FIGS. 13A-B. Indications of such levels of availability of such resources may be maintained, and recurringly updated, within the resources data 2530. Alternatively or additionally, the processor(s) 2550 may be caused to generate and maintain, within the resources data 2530, indications of levels of availability of processing and/or storage resources within the control device 2500, itself. As has been discussed, some embodiments of the processing system 2000 may include no node devices 2300, and no storage devices 2100, such as the embodiment depicted in FIG. 13C, such that there may be just the processing and storage resources of the control device 2500.

As previously discussed, the application code 2710 may be generated by a programmer operating the requesting device 2700. In some embodiments, the generation of the application code 2710 may be performed largely, if not entirely, using the requesting device 2700. The programmer may then operate the requesting device 2700 to transmit the application code 2710 to the control device 2500 to have it executed. In other embodiments, the generation of the application code 2710 may involve a more cooperative interaction between the requesting device 2700 and the control device 2500 in which the requesting device 2700 may provide a remote user interface in a manner akin to a remote terminal that enables the programmer to generate the application code 2710 within the control device 2500, but remotely through the requesting device 2700.

As will be discussed in greater detail, it may be that the application code 2710 is parsed more than once and/or by multiple devices of the processing system 2000 to obtain a variety of pieces of information therefrom for different purposes. By way of example, in some embodiments, it may be that the application code 2710 is parsed within the requesting device 2700 either before or as it is provided to the control device 2500 via the network 2999. In such parsing within the requesting device 2700, it may be that the instruction block 2711 and/or the trigger instruction 2717 are identified, and that indication(s) of the location(s) of the instruction block 2711 and/or the trigger instruction 2717 within the application code 2710 are provided to the control device 2500, along with the application code 2710. Alternatively, it may be that such parsing of the application code 2710 to identify the instruction block 2711 and/or the trigger instruction 2717 occurs within the control device 2500.

As has been discussed, the identification of the instruction block 2711 may be based on identifying a start marker 2712$s$ and an end marker 2712$e$ that mark the start and end of the instruction block 2711, respectively. Again, in some embodiments, the start marker 2712$s$ may also serve to assign an identifier to the instruction block 2711 that may enable the instruction block 2711 to be called from elsewhere within the application code 2710. The trigger instruction 2717 may be associated with the instruction block 2711 (e.g., through use of the identifier specified by the start marker 2712$s$).

Turning to FIG. 16B, regardless of the exact manner in which the application code 2710 is generated, in response to the request to execute the application code 2710, the processor(s) 2550 of the control device 2500 may be caused by execution of a parsing component 2547 of the control routine 2540 to parse the application code 2710, including the instruction block 2711 and/or the trigger instruction 2717, and to then generate the support block 2517 therefrom. As just discussed, either indication(s) of the location(s) of the instruction block 2711 and/or the trigger instruction 2717 may be received along with the application code 2710, or the processor(s) 2550 of the control device 2500 may be caused to identify the instruction block 2711 and/or the trigger instruction 2717 without such external assistance as part of parsing the application code 2710.

Regardless of the exact manner in which the instruction block 2711 and/or the trigger instruction 2717 are identified, as previously discussed, the executable instructions within the instruction block 2711 are written as if just one instance of the instruction block 2711 is to be executed just once. Again, it is the trigger instruction 2717 that provides the indication that multiple instances of the instruction block 2711 are to be executed concurrently and repeatedly. The support block 2517 may be generated by processor(s) 2550 of the control device to include executable instructions that are operable on the cores 2355 of the processor(s) 2350 of the node devices 2300, and/or operable on the cores 2555 of the processor(s) 2550 of the control device 2500, to enable such concurrent and repetitive execution of each of those multiple instances of the instruction block 2711. In this way, the programmer who writes the application code 2710 is spared the need to write executable instructions to implement logic for causing multiple instances of the instruction block 2711 to be executed across the multiple threads of execution provided by multiple processor cores 2555 within the control device 2500 and/or provided by multiple ones of the node devices 2300.

More precisely, the support block 2517 may be automatically generated to implement the logic needed to cause the execution of an instance of the instruction block 2711 to continue to be repeated through multiple iterations of execution as long as there remains at least one row 2134 of data values within the corresponding portion 2131 of a data structure 2130 that is to be used as input to that instance. In this way, the programmer who writes the application code 2710 is spared the need to write executable instructions to implement such logic for the repetitive execution of each instance of the instruction block 2711.

The support block 2517 may also be automatically generated to provide some degree of coordination in the concurrent and repetitive executions of each of the multiple instances of the instruction block 2711. More precisely, the executable instructions within the support block 2517 may be generated to implement the logic needed to cause the generation and provision of an indication of the status of the repetitive execution of a corresponding instance of the instruction block 2711, thereby allowing the progress of such repetitive executions of each of the multiple instances of the instruction block 2711 to be monitored by a single core 2555 of the processor(s) 2550 of the control device 2500. Alternatively or additionally, the executable instructions within the support block 2517 may be generated to implement the logic needed to coordinate the provision, for each instance of the instruction block 2711, of a portion of an output data structure that is generated by the multiple iterations of execution of a corresponding instance of the instruction block 2711 to at least one core 2555 of the control device 2500 to enable aggregation of the multiple portions of the output data structure to generate the results data 2730. Again, in this way, the programmer who writes the application code 2710 is spared the need to write executable instructions to implement such logic for such a degree of coordination of the concurrent executions of multiple instances of the instruction block 2711.

However, it should be noted that, while there may be some degree of coordination of the concurrent executions of multiple instances of the instruction block 2711, again, there are no dependencies among the multiple instances of the instruction block 2711. Stated differently, there is no data dependency among the multiple instances of the instruction block 2711 that necessitate the exchange of data values thereamong such that a data value has be generated by an iteration of execution of one instance of the instruction block before an iteration of execution of another instruction block can be performed. Also there is no timing or order of execution dependency thereamong such that one or more iterations of execution of one of the instances is required to begin before one or more iterations of execution of another are able to begin, and/or such that the one or more iterations of execution of one of the instances cannot be completed until one or more iterations of another are completed.

Additionally, in embodiments in which one or more of the executable instructions within the instruction block 2711 make call(s) to one or more of the thread-safe routines 2571 within the library 2570, the support block 2517 may be generated to include those one or more thread-safe routines. Stated differently, each instance of the support block 2517 may be generated to include whatever portion of the library 2570 is needed to support such calls being made from within the corresponding instance of the instruction block 2711 during each iteration of execution of that corresponding instance.

With the generation of the support block 2517, the concurrent execution of multiple instances of thereof is more easily enabled by distributing multiple instances of the instruction block 2711 among multiple processor cores (e.g., multiple processor cores 2555) and/or multiple processing devices (e.g., among multiple node devices 2300), as will shortly be explained in greater detail.

It should be noted that, in various different embodiments, the application code 2710 and/or the instruction block 2711 therein may be compiled and/or interpreted within differing ones of the devices of the processing system 2000 at differing times. By way of example, in some embodiments, it may be that the entirety of the application code 2710 is compiled and/or interpreted entirely within the control device 2500. As a result, in such embodiments, it may be that the instances of the instruction block 2711 that are provided to each processor core and/or to each processing device for being repetitively executed may be in a binary coded form selected to be compatible with the instruction set of the particular processor(s) 2350 or 2550 that are to be used to execute it. However, in other embodiments, it may be that at least the instruction block 2711 is not compiled or interpreted within the control device 2500 such that the instances of the instruction block 2711 that are provided to each of the node devices 2300 are to be compiled or interpreted thereat. This approach may be used in embodiments of the processing system 2000 in which there is some variation among the processors 2350 of the node devices 2300 such that it is not possible to generate a single binary coded form of the instruction block 2711 that would be compatible with the instruction sets of all of the different variations of the processors 2350.

Turning to FIG. 16C, in addition to the identification of the trigger instruction 2717 providing the indication of concurrent execution, further parsing of the executable instructions within the application code 2710 may lead to the identification of a distributed data instruction 2713*d*. As previously discussed, the distributed data instruction 2713*d* may be incorporated into another instruction as a component thereof, such as the trigger instruction 2717 or an input instruction 2714*i* within the instruction block 2711. Again, the distributed data instruction 2713*d* may provide the indication that the rows 2134 of data values within at least one data structure 2130 are to be organized into row groups 2133 based on the data values that fall within one or more columns 2135 (see FIGS. 15A-B) specified by the distributed data instruction 2713*d*. As a result, such a data structure 2130 in which the rows 2134 were not organized into row groups 2133 may become a distributed input data structure 2130*d* in which the rows 2134 are so organized into row groups 2133.

As previously discussed, it is envisioned that such a grouping of rows 2134 is likely to be performed within a data structure 2130 that is stored in a distributed manner with multiple portions 2131 across multiple devices, such as across multiple storage devices 2100 that may be accessible to multiple node devices 2300 via the network 2999 (as depicted in the embodiment of the processing system 2000 of FIG. 13A), or more directly across multiple ones of the node devices 2300, themselves (as depicted in the embodiment of the processing system 2000 of FIG. 13B). Again, where such a grouping of the rows 2134 is to be performed within a data structure 2130 that is stored in a distributed manner across multiple devices, there may be an exchange of rows 2134 among those multiple devices. As also previously discussed, it may be that such a grouping of rows 2134 into row groups 2133 may also be accompanied by the formation of partitions 2132 that may each include one or more of the row groups 2133. Regardless of whether partitions 2132 are formed, following such grouping of rows 2134 into row groups 2133, the resulting row groups 2133 may be distributed across multiple devices with a separate input data structure portion 2131*i* being stored within each one of those multiple devices.

In such embodiments in which such a data structure 2130 is stored across multiple storage devices 2100, it may be that those multiple storage devices 2100 cooperate to maintain a distributed file system to enable such distributed storage thereof. A similar approach may be used in embodiments in which such a data structure 2130 is stored across multiple node devices 2300. By way of example, in some of such embodiments, the distributed file system used may be the Distributed Network File System (DNFS) offered as part of Cloud Analytic Services (CAS) offered by SAS Institute of Cary, N.C., USA. Where such support across multiple devices is provided for the storage of large data structures 2130 in a distributed manner, it may be that the processor(s) 2550 of the control device 2500 are caused, by further execution of the coordinating component 2549, to transmit a command to one of those multiple devices (e.g., one of multiple storage devices 2100 or one of multiple node devices 2300) to independently perform such a grouping of the rows 2133 within such a data structure 2130.

In some embodiments in which such a command is transmitted, such a command may include an indication of the quantity of input data structure portions 2131$i$ and/or partitions 2132 that the row groups 2133 are to be organized into. More specifically, in preparation for transmitting such a command, the processor(s) 2550 of the control device 2500 may be caused to refer to current indications of which ones of multiple node devices 2300 currently have sufficient processing and/or storage resources available to support the concurrent execution of one of the multiple instances of the instruction block 2711. Such a quantity may then be specified in such a command to cause the resulting row groups 2133 to, themselves, be grouped into input data structure portions 2131$i$ and/or partitions 2132 of that quantity so as to enable a one-to-one correspondence to the devices.

However, although it may be envisioned that such a grouping of rows 2134 is likely to be performed within a data structure 2130 that is stored in a distributed manner across multiple devices, other embodiments are possible in which such a grouping of rows 2134 is to be performed within a data structure 2130 that is stored entirely within a single device, such as within the control device 2500, itself (as depicted in the embodiment of the processing system 2000 of FIG. 13C). Again, where such a grouping of the rows 2134 is to be performed within a data structure 2130 that is stored entirely within a single device, there would be no exchange of rows 2134 among devices.

In such embodiments in which such a data structure 2130 is stored entirely within the control device 2500, it may be that the processor(s) 2550 of the control device 2500 are caused, by further execution of a storage component 2546, to directly perform the grouping of rows 2134 therein. As previously discussed, in such embodiments, each of the resulting row groups 2133 may each be assigned to serve as an input to one of the instances of the instruction block 2711 that is assigned to be executed by one of the processor cores 2555 of the processor(s) 2550 of the control device 2500. Also, it may be that such a grouping of rows 2134 into row groups 2133 may not also result in the formation of partitions 2132. However, other embodiments may be possible in which partitions 2132 are also generated as a mechanism to organize the assignment of sets of multiple row groups 2133 that are each to be used as an input to one of the instances of the instruction block 2711.

It should be noted that, for the sake of simplicity of discussion and ease of understanding, in FIG. 16C and in subsequent figures, a quantity of three input data structure portions 2131$i$ (designated as input data structure portions 2131$ia$, 2131$ib$ and 2131$ic$) are depicted as being formed as a result of the grouping of rows 2134. Also, such a result is depicted as having occurred, regardless of whether the data structure 2130 is stored in a distributed manner across multiple devices, 2100 or 2300, or is stored entirely within the control device 2500. As will become apparent in the subsequent figures, this selection of a quantity of three input data structure portions 2131$ia$, 2131$ib$ and 2131$ic$ is meant to fit a depiction of the concurrent execution of three instances of the instruction block 2711. Again, the depiction of such a relatively small quantity of three input data structure portions 2131$i$ that are each to be assigned to serve as an input to one of three instances of the instruction block 2711 is for the sake of simplicity of discussion and eases of understanding, and should not be taken as limiting the application of what is disclosed and claimed herein as being applicable for use with just such a small quantity of portions 2131, partitions 2132 and/or instances of an instruction block 2711.

Turning to FIG. 16D, in addition to at least one data structure 2130 being designated by a distributed data instruction 2713$d$ as a distributed input data structure 2130$d$, there may also be at least one data structure 2130 that is designated by a shared data instruction 2713$s$ as a shared input data structure 2130$s$. In embodiments where the multiple instances of the instruction block 2711 are to be concurrently executed across multiple node devices 2300, such a shared input data structure 2130$s$ must be provided to each those node devices 2300 to enable its provision as an input to each of those instances. As with the aforedescribed distributed data instruction 2713$d$, the shared data instruction 2713$s$ may be incorporated as a component into either the trigger instruction 2717 or an input instruction 2714$i$.

In some embodiments, in response to the identification of such a shared data instruction 2713$s$ during parsing of the application code 2710, the processor(s) 2550 of the control device 2500 may be caused to retrieve a single copy of a shared input data structure 2130$s$ via the network 2999 from whichever storage device 2100 or node device 2300 that currently stores the shared input data structure 2130$s$, and to then re-transmit that copy to other storage device(s) 2100 and/or node device(s) 2300 where it will be needed to support the execution of an instance of the instruction block 2711 thereat. In other embodiments, the processor(s) 2550 of the control device 2500 may be caused to transmit a command to whichever storage device 2100 or node device 2300 that currently stores the shared input data structure 2130$s$ to perform the transmission of copies thereof to other storage device(s) 2100 or node device(s) 2300, respectively, where it will be needed to support the execution of an instance of the instruction block 2711 thereat.

Turning to FIG. 16E, in some embodiments, as part of generating and providing multiple instances of the instruction block 2711 to multiple node devices 2300, or to multiple processor cores 2555 of the processor(s) 2550 of the control device 2500, the processor(s) 2550 may be caused, by further execution of the generation component 2545, to generate each of those instances within a container 2566. In so doing, the processor(s) 2550 may also generate, within each container 2566, a corresponding instance of the support block 2517. Again, it should be noted that, for the sake of simplicity of discussion and ease of understanding, the generation of just three containers 2566$a$, 2566$b$ and 2566$c$ is specifically depicted.

As discussed above, the support block 2517 within each container 2566 may include executable instructions that are operable on processor(s) 2350 of the node devices 2300, or operable on the cores 2555 of the processor(s) 2550 of the control device 2500, to enable the execution of the corresponding instance of the instruction block 2711 within the corresponding container 2566. In some embodiments, for each instance of the instruction block 2711, the corresponding instance of the support block 2517 and corresponding container 2566 may cooperate to provide an execution environment in which the instance of the instruction block 2711 is able to be executed.

As depicted, where the multiple instances of the instruction block 2711 are to be executed within the control device 2500 by different ones of the processor cores 2555 of the processor(s) 2550 thereof, the multiple containers 2566 may simply remain stored within the control device 2500 after they and their contents are generated, and may simply be assigned to each of multiple processor cores 2555. Alternatively, and as also depicted, where the multiple instances of the instruction block 2711 are to be executed across multiple node devices 2300, the processor(s) 2550 may be caused to transmit each of the multiple containers 2566 to a corresponding one of the multiple node devices 2300 via the network 2999.

FIG. 16F depicts the concurrent and repetitive execution of each of the three depicted instances of the instruction block 2711, following the generation and assignment of each of those instances to one of the multiple node devices 2300a, 2300b and 2300c, or to one of three processor cores 2555 of the control device 2500. It should again be noted that this deliberately simplified example is presented for sake of clarity and ease of understanding, and should not be taken as limiting.

As has been discussed, and as depicted, each of the instances of the instruction block 2711 is provided with a separate input data structure portion 2131ia, 2131ib or 2131ic of the distributed input data structure 2130d. As depicted, each iteration of execution of each of the three instances of the instruction block 2711 may retrieve and use a single row 2134 of data values taken from its corresponding one of the three input data structure portions 2131ia, 2131ib or 2131ic. As has also been discussed, each of the depicted three instances of the instruction block 2711 may be executed repeatedly until each and every row 2134 of its corresponding one of the three input data structure portions 2131ia, 2131ib or 2131ic has been used as an input for an iteration of such execution. As also depicted, each iteration of execution of each of the three instances of the instruction block 2711 may result in the output of a row 2134 of data values that form one of the three corresponding output data structure portions 2131oa, 2131ob or 2131oc.

As has also been discussed, each of the instances of the instruction block 2711 may also be provided with a shared input data structure 2130s. Again, unlike the distributed input data structure 2130d, the shared input data structure 2130s may be provided to each of the instances of the instruction block 2711 in its entirety, and for each iteration of execution of each of those instances. Thus, during each iteration of execution of each of the instances of the instruction block 2711, all of the data values throughout all rows 2134 of the shared input data structure 2130s are made available as an input to whatever functions may be performed in each of those iterations.

Turning to FIG. 16G, regardless of whether the multiple instances of the instruction block 2711 are executed through multiple iterations by processor cores 2555 of the control device 2500, or by processors 2350 of multiple node devices 2300, the processor(s) 2550 of the control device 2500 may be caused by execution of an aggregation component 2543 of the control routine 2540 to use any of a variety of types of aggregation to combine the resulting multiple output data structure portions 2131oa, 2131ob and 2131oc to generate the results data 2730.

As previously discussed, the actual type of aggregation that may be performed may include, but is not limited to, one of concatenating the rows 2134 of the multiple output data structure portions 2131oa, 2131ob and 2131oc to form a single data structure 2130; summing of selected data values from those rows 2134; averaging of selected data values from those rows 2134; subsampling data values and/or deriving other statistical values that may serve to characterize set(s) of data values within such a data structure 2130; and/or deriving highest value(s), lowest data value(s), mean value(s) and/or median values(s) from selected data values of those rows 2134. As also previously discussed, the exact operations that are performed in such aggregation may be at least partially determined by the exact type of output instruction that is selected for use in the instruction block 2711 from which the instruction block 2711 is derived.

Regardless of the exact nature of the aggregation that is performed to generate the results data 2730, any of a variety of uses may be made of the results data 2730 following its generation. By way of example, and as depicted, the results data 2730 may be provided as an input to another portion of the application code 2710. Alternatively or additionally, and as also depicted, the results data 2730 may represent one of the outputs of executing the application code 2710, and may be transmitted by the processor(s) 2550 of the control device 2500 to the requesting device via the network 2999.

FIGS. 17A, 17B, 17C, 17D, 17E and 17F, together, illustrate an example embodiment of a logic flow 3100. The logic flow 3100 may be representative of some or all of the operations executed by one or more embodiments described herein. More specifically, the logic flow 3100 may illustrate operations performed by core(s) 2555 of the processor(s) 2550 of the control device 2500 in executing the control routine 2540, and/or performed by other component(s) of the control device 2500.

At 3110, a processor(s) of a control device (e.g., the processor(s) 2550 of the control device 2500) and/or a processor of a requesting device (e.g., the processor 2750 of the requesting device 2700) of a processing system (e.g., the processing or distributed processing system 2000) may parse application code to identify an instruction block (e.g., the application code 2710 and instruction block 2711). As has been discussed, the executable instructions within the instruction block may be written as if just a single instance thereof is to be executed just once.

At 3111, the processor(s) of the control or requesting device may further parse the application code to identify a trigger instruction (e.g., the trigger instruction 2717) that provides the indication that multiple instances of the instruction block are actually to be executed.

At 3112, the processor(s) of the control device may further parse the application code to identify a distributed data instruction (e.g., the distributed data instruction 2713d) that indicates that the rows of a first data structure that is to serve as an input to the instruction block are to be reorganized to be grouped by the data values found within one or more columns specified in the instruction, such that the first data structure is to become a distributed input data structure (e.g., a data structure 2130 becoming a distributed input data structure 2130d). As has been discussed, the distributed data instruction may be incorporated into the trigger instruction as a component thereof, thereby creating a trigger instruction that provides a complete set of indications to a compiler or interpreter that executable instructions within the instruction block are to be concurrently executed as multiple instances thereof, and that each such instance is to be executed repetitively until all of the rows in the portion of the distributed input data structure are used as input.

Again, in this way, a programmer is able to avoid grappling with the complexities of having to understand and generate executable instructions that implement such concurrent and repetitive execution. Instead, they are able to write the executable instructions within the instruction block to simply implement the logic of what is to occur when those instructions are executed just once, and it may be such a single trigger instruction incorporating the distributed data instruction that causes a compiler or interpreter to automatically provide the additional logic needed to cause such concurrent and repetitive execution.

At 3113, the processor(s) may further parse the application code to identify a shared data instruction (e.g., the shared data instruction 2713s) that indicates that the entirety of a second data structure is to serve as an input to each instance of the instruction block during each iteration of execution of each of those instances such that the second data structure is to become a shared input data structure (e.g., a data structure 2130 becoming a shared input data structure 2130s). As has been discussed, the shared data instruction may be incorporated into either the trigger instruction or an input instruction among the executable instructions of the instruction block (e.g., an input instruction 2714i).

At 3115, the processor(s) may check whether the multiple instances of the instruction block are to be concurrently executed entirely within a single device—specifically, within the control device. As has been discussed, this may be determined based on whether the control device has access to a set of node devices (e.g., the node devices 2300) such that the concurrent execution of the multiple instances is to occur across multiple node devices. If, at 3115, such concurrent execution is to take place entirely within the single device (e.g., the control device 2500), then at 3120, the processor(s) of the control device may retrieve indications of the levels of availability of processing, storage and/or other resources within the single device.

At 3121, from such retrieved levels of availability, the processor(s) may determine the quantity of instances of the instruction block that are able to be concurrently executed within the single device.

If, at 3123, the first data structure (i.e., the data structure that is to become a distributed input data structure 2130d) is stored entirely within the single device (as exemplified in the embodiment of FIG. 13C), then at 3124, the processor(s) thereof may perform the reorganization of rows within the first data structure to form the row groups based on the data values within the one or more columns specified in the distributed data instruction identified above at 3112.

At 3125, the processor(s) may assemble those row groups into a quantity of portions (e.g., the portions 3121). As previously discussed, the quantity of those portions may be at least partially based on the maximum quantity of instances of the instruction block that are able to be concurrently executed within the single device, as determined at 3121. Alternatively or additionally, the quantity of those portions may be at least partially based on the quantity of row groups that are generated at 3124 (such as in a situation in which there are not enough row groups available for all of the instances of the instruction block that could be concurrently executed).

As previously discussed, in some embodiments, the formation of row groups may also entail the formation of partitions that may each include one or more row groups. Again, in some of such embodiments, the formation of partitions may essentially be the same operation as the formation of the portions of which a single portion is to be provided to each instance of the instruction block, such that each portion is one of the partitions. However, other embodiments are possible in which the formation of partitions may be based on other factors that may cause multiple row groups to be grouped together, and one or more of the portions may actually include multiple partitions. Regardless of the exact basis of the formation of partitions, it may be that, within each partition that does include multiple row groups, those multiple row groups may be organized based on the data values within the same columns that served as the basis for the definition of each row group.

At 3129, the processor(s) may select the processor cores of the single device that are to be used to concurrently execute the multiple instances of the instruction block. As has been discussed, where the quantity of row groups that are generated as a result of the reorganization of rows into row groups at 3124 is less than the quantity of processor cores that are available for performing such concurrent execution, it may be that less than all of those available processor cores are selected to be so utilized.

Returning to 3123, if the first data structure is, instead, not stored within the single device (e.g., stored across one or more of the storage devices 2100 in an embodiment of the processing system 2000 in which the control device 2500 has access to the storage devices 2100), then at 3126, the processor(s) may transmit a command to the one or more other devices in which the first data structure is stored to perform the grouping of rows into row groups. As previously discussed, in embodiments in which there are multiple storage devices that store a data structure in a distributed manner, or in which there are multiple node devices that also serve as storage devices to store a data structure in a distributed manner, those multiple devices may maintain a distributed file system to support such distributed storage of a data structure, and those multiple devices may be capable of cooperating to perform various operations on such a data structure. As also previously discussed, the command that is so transmitted may include an indication of a maximum quantity of instances of the instruction block that are able to be concurrently executed. Such a quantity may be so provided to serve as an indication to the multiple devices of the maximum quantity of portions that the data structure should be divided into once the reorganization of rows into row groups is completed.

At 3127, the single device may receive, from the one or more other devices in which the first data structure is stored, an indication of the quantity of portions into which the first data structure is now divided following the reorganization of rows into row groups. Again, such information may be used in the selection of processor cores to be utilized in the concurrent execution of multiple instances of the instruction block at 3129.

If, at 3130, the second data structure (i.e., the data structure that is to become a shared input data structure 2130s) is stored entirely within the single device (again, as exemplified in the embodiment of FIG. 13C), then at 3131, the processor(s) thereof may generate multiple copies of the entirety of the second data structure, with one of those copies being provided to each of the processor cores that have been selected for use in the concurrent execution of the multiple instances of the instruction block. Alternatively or additionally, the processor(s) may take other actions to provide access to the entirety of the second data structure to each of those concurrent executions by each of those selected processor cores (e.g., provide each with a pointer to the location of the second data structure for use in making read-only accesses thereto).

However, if at 3130, the second data structure is stored within one or more other devices (e.g., one or more of the storage devices 2100), then at 3132, the processor(s) may transmit a command to the other device(s) in which the second data structure is stored to generate multiple copies of the entirety of the second data structure, with one of those copies being provided to each of the selected processor cores, and/or to take other actions to provide access to the entirety of the second data structure.

At 3135, the processor(s) may generate a support block that includes additional executable instructions that support the concurrent and repetitive execution of each of the multiple instances of the instruction block. Again, the executable instructions of the support block may implement the additional logic needed to cause multiple instances of the instruction block to be concurrently executed, and to cause those concurrent executions to be repeated with as many iterations as are needed for each of those instances to utilize all of the rows of data values within its corresponding portion of the first data structure.

At 3136, the processor(s) may generate the multiple instances of the instruction block and corresponding multiple instances of the support block. The processor(s) may then distribute those multiple instances of the instruction block and accompanying support block to each of the selected processor cores. As has been discussed, it may be that such distribution of instances of the instruction block and accompanying support block may be within individual containers that are provided to each of the selected processor cores, and this may be done as an approach to providing an execution environment within which each of the pairs of instances of the instruction block and corresponding support block may be executed.

At 3137, the selected processor cores may perform the concurrent and repetitive executions of the multiple instances of the instruction block. Again, for the execution of each instance may be repeated for the number of iterations needed to cause all of the rows of data values within its corresponding portion of the first data structure to be used as input.

At 3160, the processor(s) may aggregate the portions of an output data structure that are each generated by the repetitive execution of one of the instances of the instruction block to derive a results data (e.g., the results data 2730).

At 3161, the processor(s) may transmit the results data as an output of the execution of the application code to a requesting device from which a request for such execution may have been received, and/or may provide the results data as an input to another part of the application code that is being executed.

Returning to 3115, if such concurrent execution is, instead, to be take place across at least a subset of multiple node devices (e.g., across multiple ones of the node devices 2300), then at 3140, the processor(s) of the control device may receive indications of the levels of availability of processing, storage and/or other resources within each of those node devices.

At 3141, from such received indications of such levels of availability, the processor(s) may determine the quantity of instances of the instruction block that are able to be concurrently executed across the multiple node devices.

At 3146, the processor(s) may transmit a command to the one or more other devices in which the first data structure is stored to perform the grouping of rows into row groups (e.g., one or more of the multiple node devices 2300, or one or more of the storage devices 2100). Again, the command that is so transmitted may include an indication of a maximum quantity of instances of the instruction block that are able to be concurrently executed to provide an indication of the maximum quantity of portions that the data structure should be divided into once the reorganization of rows into row groups is completed.

At 3147, the single device may receive, from the one or more other devices in which the first data structure is stored, an indication of the quantity of portions into which the first data structure is now divided following the reorganization of rows into row groups.

At 3149, the processor(s) may select the node devices of the multiple node devices that are to be used to concurrently execute the multiple instances of the instruction block. Again, where the quantity of row groups that are generated as a result of the reorganization of rows into row groups at 3146 is less than the quantity of node devices that are available for performing such concurrent execution, it may be that less than all of those node devices are selected to be so utilized.

At 3152, the processor(s) may transmit a command to the other device(s) in which the second data structure is stored to generate multiple copies of the entirety of the second data structure, with one of those copies being provided to each of the selected node devices, and/or to take other actions to provide access to the entirety of the second data structure.

At 3155, the processor(s) may generate a support block that includes additional executable instructions that support the concurrent and repetitive execution of each of the multiple instances of the instruction block.

At 3156, the processor(s) may generate the multiple instances of the instruction block and corresponding multiple instances of the support block. The processor(s) may then distribute those multiple instances of the instruction block and accompanying support block to each of the selected node devices. Again, it may be that such distribution of instances of the instruction block and accompanying support block may be within individual containers that are provided to each of the selected node devices, and this may be done as an approach to providing an execution environment within which each of the pairs of instances of the instruction block and corresponding support block may be executed.

At 3157, the selected node devices may perform the concurrent and repetitive executions of the multiple instances of the instruction block. Again, for the execution of each instance may be repeated for the number of iterations needed to cause all of the rows of data values within its corresponding portion of the first data structure to be used as input. The processor(s) of the control device may stay in communication with the selected node devices to at least monitor the progress of those concurrent and repetitive executions.

At 3158, the control device may receive the portions of an output data structure that are each generated by the repetitive execution of one of the instances of the instruction block to thereby enable the aggregation of those portions at 3160.

In various embodiments, each of the processors 2350 and 2550 may include any of a wide variety of commercially available processors. Further, one or more of these processors may include multiple processors, a multi-threaded processor, a multi-core processor (whether the multiple cores coexist on the same or separate dies), and/or a multiprocessor architecture of some other variety by which multiple physically separate processors are linked.

In various embodiments, each of the control routines 2340 and 2540, including the components of which each is composed, may be selected to be operative on whatever type of processor or processors that are selected to implement applicable ones of the processors 2350 and/or 2550 within each one of the devices 2300 and/or 2500, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2350 and/or 2550. Where one or more device drivers are included, those device drivers may provide support for any of a variety of other components, whether hardware or software components, of the devices 2300 and/or 2500.

In various embodiments, each of the storages 2360 and 2560 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the input device 2720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, the display 2780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2780 may each be a touchscreen display such that the input device 2720 may be incorporated therein as a touch-sensitive component thereof.

In various embodiments, each of the network interfaces 2390 and 2590 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a first processor core and a storage to store instructions that, when executed by the first processor core, cause the first processor core to perform operations comprising:
    receiving a request to execute executable instructions of application code that comprises an instruction block and a trigger instruction, wherein:
        the instruction block comprises executable instructions operable to cause a second processor core to perform operations comprising:
            reading a single row of data values from a first data structure; and outputting at least one data value generated by a performance of a function using the single row as an input;

the first data structure is divided into multiple portions that each comprise multiple rows; and the trigger instruction serves to provide an indication that:

multiple instances of the instruction block that correspond to the multiple portions of the first data structure are to be executed concurrently; and each instance of the instruction block is to be executed repetitively until all rows of the corresponding portion of the first data structure are used as input to the function, wherein the repetitive execution of each instance commences independently of the other instances and completes independently of the other instances; and in response to the request, and in response to identification of the instruction block and the trigger instruction as present within the application code, performing operations comprising:

generating multiple instances of a support block corresponding to the multiple instances of the instruction block, wherein each instance of the support block comprises executable instructions operable to cause the second processor core to execute a corresponding instance of the instruction block repetitively until all rows of the corresponding portion of the first data structure are used as input to the function;

assigning each instance of the instruction block and corresponding support block to be executed by a processor core of a set of processor cores, wherein the set of processor cores comprises the second processor core; and providing each instance of the instruction block with access to the corresponding portion of the first data structure.

2. The apparatus of claim 1, wherein:

the first data structure is stored within at least one storage device accessible via a network; and the first processor core is caused to perform operations comprising:

parsing the executable instructions of the application code to identify a distributed data instruction within the application code, wherein the distributed data instruction serves to indicate that the rows of the first data structure are to be grouped by data values present within at least one column within each of the rows; and in response to identifying the distributed data instruction within the application code, transmitting a command to the at least one storage device to reorganize the rows of the first data structure into multiple row groups based on the data values present within the at least one column within each of the rows, wherein the multiple row groups are distributed among the multiple portions of the first data structure.

3. The apparatus of claim 2, wherein:

the trigger instruction comprises the distributed data instruction such that the trigger instruction serves to also indicate that the rows of the first data structure are to be grouped by data values present within the at least one column; and the first processor core is caused to parse the executable instructions of the application code to identify the trigger instruction to thereby identify the distributed data instruction.

4. The apparatus of claim 1, further comprising a set of node devices accessible to a control device via a network, wherein:

the control device comprises the first processor core;

each node device of the set of node devices comprises one of the processor cores of the set of processor cores; and the first processor core is caused to perform operations comprising:

receiving, from the set of node devices via the network, indications of availability of each processor core of the set of processor cores;

determining a quantity of processor cores of the set of processor cores that are available to execute the multiple instances of the instruction block;

selecting a subset of the set of node devices among which to distribute the multiple instances of the instruction block and the multiple instances of the support block based at least on the quantity of available processor cores; and distributing the multiple instances of the instruction block and the multiple instances of the support block among the subset of the set of node devices.

5. The apparatus of claim 1, wherein:

a second data structure is stored within at least one storage device accessible via a network; and the first processor core is caused to perform operations comprising:

parsing the executable instructions of the application code to identify a shared data instruction within the application code, wherein the shared data instruction serves to indicate that the second data structure is to be provided in its entirety as another input to each of the multiple instances of the instruction block; and in response to identifying the shared data instruction within the application code, transmitting a command to the at least one storage device to generate multiple copies of the second data structure for distribution among the multiple instances of the instruction block.

6. The apparatus of claim 5, wherein an input instruction that is executable to read at least a portion of the second data structure comprises the shared data instruction such that the input instruction serves to indicate that the second data structure is to be provided in its entirety as another input to each of the multiple instances of the instruction block.

7. The apparatus of claim 1, wherein:

for each instance of the instruction block, during each iteration of execution, the at least one data value that is output is added to a portion of multiple portions of an output data structure; and the first processor core is caused to perform operations comprising:

aggregating the multiple portions of the output data structure to generate a results data; and providing the results data as an input to another function that is associated with the application code and that the first processor core executes, or transmitting the results data, via a network, to a requesting device from which the request was received.

8. The apparatus of claim 1, comprising a control device that comprises the set of processor cores, wherein:

the first data structure is stored within the control device; and the first processor core is caused to perform operations comprising:
monitoring a level of availability of each processor core of the set of processor cores;
determining a quantity of processor cores of the set of processor cores that are available to execute the multiple instances of the instruction block;
parsing the executable instructions of the application code to identify a distributed data instruction within the application code, wherein the distributed data instruction serves to indicate that the rows of the first data structure are to be grouped by data values present within at least one column within each of the rows; and
in response to identifying the distributed data instruction within the application code, perform operations comprising:
reorganizing the rows of the first data structure into multiple row groups based on the data values present within the at least one column within each of the rows;
selecting a quantity of the multiple portions of the first data structure, the multiple instances of the instruction block and the multiple instances of the support block to match the quantity of available processor cores; and
organizing the row groups into the multiple portions of the first data structure.

9. The apparatus of claim 8, wherein:
a second data structure is stored within the control device; and
the first processor core is caused to perform operations comprising:
parsing the executable instructions of the application code to identify a shared data instruction within the application code, wherein the shared data instruction serves to indicate that the second data structure is to be provided in its entirety as another input to each of the multiple instances of the instruction block; and
in response to identifying the shared data instruction within the application code, generating multiple copies of the second data structure for distribution among the multiple instances of the instruction block.

10. The apparatus of claim 1, wherein:
the instruction block is marked within the application code by at least a start marker that marks a start of the instruction block;
the start marker serves to provide the instruction block with an identifier;
the trigger instruction comprises the identifier to refer to the instruction block; and
the first processor core is caused to perform operations comprising:
parsing the application code to identify the instruction block via the start marker; and
using the identifier to associate the trigger instruction with the instruction block.

11. A computer-program product tangibly embodied in a non-transitory machine-readable storage medium, the computer-program product including instructions operable to cause a first processor core to perform operations comprising:
receiving a request to execute executable instructions of application code that comprises an instruction block and a trigger instruction, wherein:
the instruction block comprises executable instructions operable to cause a second processor core to perform operations comprising:
reading a single row of data values from a first data structure; and
outputting at least one data value generated by a performance of a function using the single row as an input;
the first data structure is divided into multiple portions that each comprise multiple rows; and
the trigger instruction serves to provide an indication that:
multiple instances of the instruction block that correspond to the multiple portions of the first data structure are to be executed concurrently; and
each instance of the instruction block is to be executed repetitively until all rows of the corresponding portion of the first data structure are used as input to the function, wherein the repetitive execution of each instance commences independently of the other instances and completes independently of the other instances; and
in response to the request, and in response to identification of the instruction block and the trigger instruction as present within the application code, performing operations comprising:
generating multiple instances of a support block corresponding to the multiple instances of the instruction block, wherein each instance of the support block comprises executable instructions operable to cause the second processor core to execute a corresponding instance of the instruction block repetitively until all rows of the corresponding portion of the first data structure are used as input to the function;
assigning each instance of the instruction block and corresponding support block to be executed by a processor core of a set of processor cores, wherein the set of processor cores comprises the second processor core; and
providing each instance of the instruction block with access to the corresponding portion of the first data structure.

12. The computer-program product of claim 11, wherein:
the first data structure is stored within at least one storage device accessible via a network; and
the instructions of the computer-program product are operable to cause the first processor core to perform operations comprising:
parsing the executable instructions of the application code to identify a distributed data instruction within the application code, wherein the distributed data instruction serves to indicate that the rows of the first data structure are to be grouped by data values present within at least one column within each of the rows; and
in response to identifying the distributed data instruction within the application code, transmitting a command to the at least one storage device to reorganize the rows of the first data structure into multiple row groups based on the data values present within the at least one column within each of the rows, wherein the multiple row groups are distributed among the multiple portions of the first data structure.

13. The computer-program product of claim 12, wherein:
the trigger instruction comprises the distributed data instruction such that the trigger instruction serves to also indicate that the rows of the first data structure are to be grouped by data values present within the at least one column; and the instructions of the computer-program product are operable to cause the first processor core to parse the executable instructions of the application code to identify the trigger instruction to thereby identify the distributed data instruction.

14. The computer-program product of claim 11, wherein:
each node device of a set of node devices comprises one of the processor cores of the set of processor cores; and
the instructions of the computer-program product are operable to cause the first processor core to perform operations comprising:
  receiving, from the set of node devices via a network, indications of availability of each processor core of the set of processor cores;
  determining a quantity of processor cores of the set of processor cores that are available to execute the multiple instances of the instruction block;
  selecting a subset of the set of node devices among which to distribute the multiple instances of the instruction block and the multiple instances of the support block based at least on the quantity of available processor cores; and
  distributing the multiple instances of the instruction block and the multiple instances of the support block among the subset of the set of node devices.

15. The computer-program product of claim 11, wherein:
a second data structure is stored within at least one storage device accessible via a network; and
the instructions of the computer-program product are operable to cause the first processor core to perform operations comprising:
  parsing the executable instructions of the application code to identify a shared data instruction within the application code, wherein the shared data instruction serves to indicate that the second data structure is to be provided in its entirety as another input to each of the multiple instances of the instruction block; and
  in response to identifying the shared data instruction within the application code, transmitting a command to the at least one storage device to generate multiple copies of the second data structure for distribution among the multiple instances of the instruction block.

16. The computer-program product of claim 15, wherein an input instruction that is executable to read at least a portion of the second data structure comprises the shared data instruction such that the input instruction serves to indicate that the second data structure is to be provided in its entirety as another input to each of the multiple instances of the instruction block.

17. The computer-program product of claim 11, wherein:
for each instance of the instruction block, during each iteration of execution, the at least one data value that is output is added to a portion of multiple portions of an output data structure; and
the instructions of the computer-program product are operable to cause the first processor core to perform operations comprising:
  aggregating the multiple portions of the output data structure to generate a results data; and
  providing the results data as an input to another function that is associated with the application code and that the first processor core executes, or transmitting the results data, via a network, to a requesting device from which the request was received.

18. The computer-program product of claim 11, wherein:
the first data structure is stored within a control device that comprises the set of processor cores; and
the instructions of the computer-program product are operable to cause the first processor core to perform operations comprising:
  monitoring a level of availability of each processor core of the set of processor cores;
  determining a quantity of processor cores of the set of processor cores that are available to execute the multiple instances of the instruction block;
  parsing the executable instructions of the application code to identify a distributed data instruction within the application code, wherein the distributed data instruction serves to indicate that the rows of the first data structure are to be grouped by data values present within at least one column within each of the rows; and
  in response to identifying the distributed data instruction within the application code, perform operations comprising:
    reorganizing the rows of the first data structure into multiple row groups based on the data values present within the at least one column within each of the rows;
    selecting a quantity of the multiple portions of the first data structure, the multiple instances of the instruction block and the multiple instances of the support block to match the quantity of available processor cores; and
    organizing the row groups into the multiple portions of the first data structure.

19. The computer-program product of claim 18, wherein:
a second data structure is stored within the control device; and
the instructions of the computer-program product are operable to cause the first processor core to perform operations comprising:
  parsing the executable instructions of the application code to identify a shared data instruction within the application code, wherein the shared data instruction serves to indicate that the second data structure is to be provided in its entirety as another input to each of the multiple instances of the instruction block; and
  in response to identifying the shared data instruction within the application code, generating multiple copies of the second data structure for distribution among the multiple instances of the instruction block.

20. The computer-program product of claim 11, wherein:
the instruction block is marked within the application code by at least a start marker that marks a start of the instruction block;
the start marker serves to provide the instruction block with an identifier;
the trigger instruction comprises the identifier to refer to the instruction block; and
the instructions of the computer-program product are operable to cause the first processor core to perform operations comprising:
  parsing the application code to identify the instruction block via the start marker; and
  using the identifier to associate the trigger instruction with the instruction block.

21. A computer-implemented method comprising:
receiving, by a first processor core, a request to execute executable instructions of application code that comprises an instruction block and a trigger instruction, wherein:
the instruction block comprises executable instructions operable to cause a second processor core to perform operations comprising:
reading a single row of data values from a first data structure; and
outputting at least one data value generated by a performance of a function using the single row as an input;
the first data structure is divided into multiple portions that each comprise multiple rows; and
the trigger instruction serves to provide an indication that:
multiple instances of the instruction block that correspond to the multiple portions of the first data structure are to be executed concurrently; and
each instance of the instruction block is to be executed repetitively until all rows of the corresponding portion of the first data structure are used as input to the function, wherein the repetitive execution of each instance commences independently of the other instances and completes independently of the other instances; and
in response to the request, and in response to identification of the instruction block and the trigger instruction as present within the application code, performing operations comprising:
generating, by the first processor core, multiple instances of a support block corresponding to the multiple instances of the instruction block, wherein each instance of the support block comprises executable instructions operable to cause the second processor core to execute a corresponding instance of the instruction block repetitively until all rows of the corresponding portion of the first data structure are used as input to the function;
assigning, by the first processor core, each instance of the instruction block and corresponding support block to be executed by a processor core of a set of processor cores, wherein the set of processor cores comprises the second processor core; and
providing, by the first processor core, each instance of the instruction block with access to the corresponding portion of the first data structure.

22. The computer-implemented method of claim 21, wherein:
the first data structure is stored within at least one storage device accessible via a network; and
the computer-implemented method comprises:
parsing the executable instructions of the application code to identify a distributed data instruction within the application code, wherein the distributed data instruction serves to indicate that the rows of the first data structure are to be grouped by data values present within at least one column within each of the rows; and
in response to identifying the distributed data instruction within the application code, transmitting a command to the at least one storage device to reorganize the rows of the first data structure into multiple row groups based on the data values present within the at least one column within each of the rows, wherein the multiple row groups are distributed among the multiple portions of the first data structure.

23. The computer-implemented method of claim 22, wherein:
the trigger instruction comprises the distributed data instruction such that the trigger instruction serves to also indicate that the rows of the first data structure are to be grouped by data values present within the at least one column; and
the computer-implemented method comprises parsing the executable instructions of the application code to identify the trigger instruction to thereby identify the distributed data instruction.

24. The computer-implemented method of claim 21, comprising:
receiving, from a set of node devices via a network, indications of availability of each processor core of the set of processor cores;
determining a quantity of processor cores of the set of processor cores that are available to execute the multiple instances of the instruction block;
selecting a subset of the set of node devices among which to distribute the multiple instances of the instruction block and the multiple instances of the support block based at least on the quantity of available processor cores; and
distributing the multiple instances of the instruction block and the multiple instances of the support block among the subset of the set of node devices.

25. The computer-implemented method of claim 21, wherein:
a second data structure is stored within at least one storage device accessible via a network; and
the computer-implemented method comprises:
parsing the executable instructions of the application code to identify a shared data instruction within the application code, wherein the shared data instruction serves to indicate that the second data structure is to be provided in its entirety as another input to each of the multiple instances of the instruction block; and
in response to identifying the shared data instruction within the application code, transmitting a command to the at least one storage device to generate multiple copies of the second data structure for distribution among the multiple instances of the instruction block.

26. The computer-implemented method of claim 25, wherein an input instruction that is executable to read at least a portion of the second data structure comprises the shared data instruction such that the input instruction serves to indicate that the second data structure is to be provided in its entirety as another input to each of the multiple instances of the instruction block.

27. The computer-implemented method of claim 21, wherein:
for each instance of the instruction block, during each iteration of execution, the at least one data value that is output is added to a portion of multiple portions of an output data structure; and
the computer-implemented method comprises:
aggregating the multiple portions of the output data structure to generate a results data; and
providing the results data as an input to another function that is associated with the application code and that the first processor core executes, or transmitting the results data, via a network, to a requesting device from which the request was received.

28. The computer-implemented method of claim 21, wherein:
- the first data structure is stored within a control device that comprises the set of processor cores; and
- the computer-implemented method comprises:
  - monitoring a level of availability of each processor core of the set of processor cores;
  - determining a quantity of processor cores of the set of processor cores that are available to execute the multiple instances of the instruction block;
  - parsing the executable instructions of the application code to identify a distributed data instruction within the application code, wherein the distributed data instruction serves to indicate that the rows of the first data structure are to be grouped by data values present within at least one column within each of the rows; and
  - in response to identifying the distributed data instruction within the application code, performing operations comprising:
    - reorganizing the rows of the first data structure into multiple row groups based on the data values present within the at least one column within each of the rows;
    - selecting a quantity of the multiple portions of the first data structure, the multiple instances of the instruction block and the multiple instances of the support block to match the quantity of available processor cores; and
    - organizing the row groups into the multiple portions of the first data structure.

29. The computer-implemented method of claim 28, wherein:
- a second data structure is stored within the control device; and
- the computer-implemented method comprises:
  - parsing the executable instructions of the application code to identify a shared data instruction within the application code, wherein the shared data instruction serves to indicate that the second data structure is to be provided in its entirety as another input to each of the multiple instances of the instruction block; and
  - in response to identifying the shared data instruction within the application code, generating multiple copies of the second data structure for distribution among the multiple instances of the instruction block.

30. The computer-implemented method of claim 21, wherein:
- the instruction block is marked within the application code by at least a start marker that marks a start of the instruction block;
- the start marker serves to provide the instruction block with an identifier;
- the trigger instruction comprises the identifier to refer to the instruction block; and
- the computer-implemented method comprises:
  - parsing the application code to identify the instruction block via the start marker; and
  - using the identifier to associate the trigger instruction with the instruction block.

* * * * *